(12) United States Patent
Cabrales et al.

(10) Patent No.: US 8,641,263 B2
(45) Date of Patent: Feb. 4, 2014

(54) METHOD AND APPARATUS FOR CONTINUOUS PROCESSING OF WHOLE MUSCLE MEAT PRODUCTS

(75) Inventors: Lynda Cabrales, Madison, WI (US); Maurine Anne MacBride, Oregon, WI (US); Jeremy Alan Thuerk, Brookfield, WI (US); Paul Gerard Morin, Madison, WI (US)

(73) Assignee: Kraft Foods Group Brands LLC, Northfield, IL (US)

( * ) Notice: Subject to any disclaimer, the term of this patent is extended or adjusted under 35 U.S.C. 154(b) by 889 days.

(21) Appl. No.: 12/277,141

(22) Filed: Nov. 24, 2008

(65) Prior Publication Data
US 2010/0129520 A1 May 27, 2010

(51) Int. Cl.
*B01F 7/02* (2006.01)

(52) U.S. Cl.
USPC .......................... 366/82; 366/297; 366/325.1

(58) Field of Classification Search
USPC ........... 366/301, 297, 89, 292, 293, 298, 299, 366/300, 80, 81, 82, 325.1, 325.2
See application file for complete search history.

(56) References Cited

U.S. PATENT DOCUMENTS

| | | |
|---|---|---|
| 377,546 A | 2/1888 | Crane |
| 858,017 A | 6/1907 | Pence |
| 1,452,098 A | 4/1923 | Short |
| 2,538,891 A | 1/1951 | Zimmerman et al. |
| 2,607,077 A * | 8/1952 | Dulmage ..................... 366/82 |
| 2,744,287 A | 5/1956 | Parshall et al. |
| 2,991,870 A | 7/1961 | Griffith et al. |
| 3,014,437 A | 12/1961 | Dutchess |
| 3,050,399 A | 8/1962 | Kielsmeier et al. |
| 3,216,375 A | 11/1965 | Ernst |
| 3,326,534 A | 6/1967 | Pryde |
| 3,360,824 A * | 1/1968 | Schippers ................... 366/76.92 |

(Continued)

FOREIGN PATENT DOCUMENTS

| | | |
|---|---|---|
| AU | 9924991 | 11/1999 |
| CA | 2478152 | 8/2004 |

(Continued)

OTHER PUBLICATIONS

U.S. Appl. No. 12/277,154, Titled Method and Apparatus for Continuous Processing of Whole Muscle Meat Products, filed Nov. 24, 2008.

(Continued)

*Primary Examiner* — Tony G Soohoo
(74) *Attorney, Agent, or Firm* — Fitch, Even, Tabin & Flannery LLP

(57) ABSTRACT

A continuous method and system for processing whole muscle meat employs a mixer housing having a pair of parallel rotating shafts located therein. The parallel rotating shafts have a plurality of mixing elements thereon, such as frustoconical elements, blocking elements, or ellipsoid elements. The mixer housing has an input end to receive the meat ingredients, such as meat pieces, salt solution, water, preservatives, and other additives such as spices. The mixer housing has an output, which is separated a distance from the input, such that the output discharges the whole muscle meat product. As the ingredients including the meat move from the input to the output along the shafts, the mixing elements work the meat with the other ingredients thereby increasing ingredient incorporation including diffusion of the salt solution into the whole muscle meat pieces.

19 Claims, 29 Drawing Sheets

(56) References Cited

U.S. PATENT DOCUMENTS

| | | | |
|---|---|---|---|
| 3,377,000 A | 4/1968 | Mason | |
| 3,423,074 A | 1/1969 | Loomans | |
| 3,425,640 A | 2/1969 | Kletschke et al. | |
| 3,446,485 A * | 5/1969 | Fischer | 366/103 |
| 3,450,179 A | 6/1969 | Golding | |
| 3,530,534 A * | 9/1970 | Pomper | 425/209 |
| 3,548,903 A | 12/1970 | Holly | |
| 3,552,978 A | 1/1971 | Inklaar | |
| 3,565,637 A | 2/1971 | Artar | |
| 3,572,646 A * | 3/1971 | Kocher | 366/89 |
| 3,576,675 A * | 4/1971 | Abramson et al. | 252/182.1 |
| 3,599,687 A | 8/1971 | Tschantz | |
| 3,612,130 A | 10/1971 | Ponka et al. | |
| 3,618,902 A * | 11/1971 | Brennan, Jr. | 366/301 |
| 3,647,190 A | 3/1972 | Iozzelli | |
| 3,649,300 A | 3/1972 | Olson et al. | |
| 3,653,637 A * | 4/1972 | Eckhardt | 425/209 |
| 3,680,844 A * | 8/1972 | Menges et al. | 366/89 |
| 3,684,252 A * | 8/1972 | Nissle et al. | 366/172.1 |
| 3,690,623 A | 9/1972 | Boyne | |
| 3,737,151 A * | 6/1973 | Schaeffer et al. | 366/75 |
| 3,749,369 A | 7/1973 | Landsberger | |
| 3,759,105 A | 9/1973 | Wallace et al. | |
| 3,762,693 A * | 10/1973 | DeBoo et al. | 366/81 |
| 3,799,459 A | 3/1974 | Bakewell | |
| 3,814,779 A * | 6/1974 | Wiley | 264/53 |
| 3,825,231 A | 7/1974 | McFarland | |
| 3,879,150 A | 4/1975 | Brown et al. | |
| 3,881,708 A * | 5/1975 | Carle | 366/82 |
| 3,885,665 A | 5/1975 | Fisher | |
| 3,897,723 A | 8/1975 | Lucy, Jr. et al. | |
| 3,901,483 A | 8/1975 | Lasar | |
| 3,917,507 A * | 11/1975 | Skidmore | 159/2.2 |
| 3,920,223 A | 11/1975 | Krueger | |
| 3,924,836 A | 12/1975 | Bruning et al. | |
| 3,942,768 A | 3/1976 | Hughes | |
| 3,971,514 A | 7/1976 | Martinelli et al. | |
| 3,981,658 A * | 9/1976 | Briggs | 425/205 |
| 3,992,985 A | 11/1976 | McFarland | |
| 4,007,545 A * | 2/1977 | Briggs | 34/397 |
| 4,013,234 A | 3/1977 | Fay | |
| 4,029,300 A * | 6/1977 | Morishima et al. | 366/75 |
| 4,032,049 A | 6/1977 | Roberts | |
| 4,036,477 A | 7/1977 | Sieradzki et al. | |
| 4,085,482 A | 4/1978 | Charron | |
| 4,124,306 A * | 11/1978 | Bredeson et al. | 366/75 |
| 4,168,431 A | 9/1979 | Henriksen | |
| 4,171,164 A | 10/1979 | Groves et al. | |
| 4,175,871 A | 11/1979 | Suh et al. | |
| 4,185,060 A * | 1/1980 | Ladney, Jr. | 264/54 |
| 4,201,484 A | 5/1980 | Sasiela et al. | |
| 4,226,540 A | 10/1980 | Barten et al. | |
| 4,264,631 A | 4/1981 | Rose | |
| 4,269,582 A | 5/1981 | Mella | |
| 4,314,451 A | 2/1982 | Leeds et al. | |
| 4,332,823 A | 6/1982 | Buemi | |
| 4,334,789 A | 6/1982 | Eusterbarkey | |
| 4,356,206 A | 10/1982 | Boldt | |
| 4,361,081 A | 11/1982 | Howard | |
| 4,382,404 A | 5/1983 | Hawley et al. | |
| 4,409,165 A * | 10/1983 | Kim | 264/53 |
| 4,409,704 A | 10/1983 | Seiffhart | |
| 4,423,960 A * | 1/1984 | Anders | 366/75 |
| 4,429,836 A | 2/1984 | Goransson | |
| 4,441,231 A | 4/1984 | Baccetti | |
| 4,443,109 A | 4/1984 | Watts | |
| 4,462,691 A * | 7/1984 | Boguslawski | 366/80 |
| 4,473,299 A | 9/1984 | Guibert | |
| 4,476,686 A | 10/1984 | Madsen et al. | |
| 4,500,558 A | 2/1985 | Fulger et al. | |
| 4,508,454 A | 4/1985 | Anders | |
| 4,508,545 A | 4/1985 | DeLoach | |
| 4,518,262 A | 5/1985 | Bornemann et al. | |
| 4,519,712 A | 5/1985 | Barr | |
| 4,523,520 A | 6/1985 | Hofmann et al. | |
| 4,534,652 A * | 8/1985 | Stade | 366/85 |
| 4,539,210 A | 9/1985 | O'Connell et al. | |
| 4,544,279 A | 10/1985 | Rudolph | |
| 4,548,507 A | 10/1985 | Mathis et al. | |
| 4,556,324 A | 12/1985 | Tynan | |
| 4,573,799 A * | 3/1986 | Anders | 366/89 |
| 4,606,647 A | 8/1986 | Frye | |
| 4,606,648 A | 8/1986 | Coyle et al. | |
| 4,652,138 A * | 3/1987 | Inoue et al. | 366/89 |
| 4,659,230 A * | 4/1987 | Son et al. | 366/343 |
| 4,659,300 A * | 4/1987 | Schwarz | 425/113 |
| 4,674,887 A | 6/1987 | Lucke et al. | |
| 4,708,268 A | 11/1987 | Wurtz | |
| 4,708,623 A * | 11/1987 | Aoki et al. | 425/202 |
| 4,729,666 A * | 3/1988 | Takubo | 366/343 |
| 4,733,607 A | 3/1988 | Star et al. | |
| 4,744,669 A * | 5/1988 | Kowalczyk et al. | 366/77 |
| 4,747,342 A | 5/1988 | Schack et al. | |
| 4,813,860 A | 3/1989 | Jonsson et al. | |
| 4,844,619 A | 7/1989 | Lesar et al. | |
| 4,863,363 A * | 9/1989 | Haring | 425/204 |
| 4,867,927 A * | 9/1989 | Funaki et al. | 264/180 |
| 4,875,847 A | 10/1989 | Wenger et al. | |
| 4,890,996 A * | 1/1990 | Shimizu | 425/145 |
| 4,904,496 A | 2/1990 | Izzo et al. | |
| 4,908,234 A | 3/1990 | Daussan et al. | |
| 4,927,661 A | 5/1990 | Bradshaw et al. | |
| 4,944,657 A | 7/1990 | Mowli | |
| 4,987,850 A | 1/1991 | McCracken | |
| 5,044,757 A * | 9/1991 | Dienst | 366/76.6 |
| 5,080,922 A | 1/1992 | Hosokawa | |
| 5,083,506 A | 1/1992 | Horn et al. | |
| 5,089,193 A * | 2/1992 | Behrens et al. | 264/50 |
| 5,100,067 A | 3/1992 | Konig et al. | |
| 5,110,275 A * | 5/1992 | Scheuring | 425/113 |
| 5,127,741 A * | 7/1992 | Capelle et al. | 366/80 |
| 5,141,426 A * | 8/1992 | Capelle | 425/203 |
| 5,147,198 A * | 9/1992 | Capelle | 425/205 |
| RE34,172 E | 2/1993 | Gwinn et al. | |
| 5,217,303 A * | 6/1993 | Geyer | 366/88 |
| 5,234,656 A * | 8/1993 | Kniss | 264/328.18 |
| 5,240,324 A | 8/1993 | Phillips et al. | |
| 5,286,514 A | 2/1994 | Webb et al. | |
| 5,292,186 A | 3/1994 | Kubo et al. | |
| 5,318,358 A | 6/1994 | Wobbe et al. | |
| 5,323,694 A | 6/1994 | Higashimoto | |
| 5,324,108 A | 6/1994 | Baumgarten | |
| 5,332,308 A | 7/1994 | Scheuring | |
| 5,358,327 A * | 10/1994 | Derezinski et al. | 366/79 |
| 5,358,693 A | 10/1994 | Brinkmann et al. | |
| 5,382,444 A | 1/1995 | Roehrig et al. | |
| 5,384,149 A | 1/1995 | Lin | |
| 5,393,547 A | 2/1995 | Balaban et al. | |
| 5,401,402 A | 3/1995 | Christy et al. | |
| 5,407,268 A | 4/1995 | Henrich | |
| 5,433,968 A | 7/1995 | Zarraga et al. | |
| 5,439,286 A * | 8/1995 | Kowalczyk et al. | 366/97 |
| RE35,048 E | 10/1995 | Rudibaugh | |
| 5,458,901 A | 10/1995 | Engler et al. | |
| 5,490,725 A * | 2/1996 | Behrens et al. | 366/76.9 |
| 5,492,499 A | 2/1996 | Van Haren et al. | |
| 5,494,351 A | 2/1996 | Hakasalo | |
| 5,505,542 A | 4/1996 | Braeker et al. | |
| 5,516,205 A * | 5/1996 | Oda et al. | 366/75 |
| 5,527,107 A | 6/1996 | Weibel et al. | |
| 5,564,332 A | 10/1996 | Ludwig | |
| 5,597,236 A | 1/1997 | Fasano | |
| 5,599,096 A * | 2/1997 | Rog | 366/78 |
| 5,613,774 A | 3/1997 | Chandra et al. | |
| 5,628,560 A | 5/1997 | Eigruber | |
| 5,641,227 A * | 6/1997 | Geyer | 366/78 |
| 5,652,007 A | 7/1997 | Pleva | |
| 5,657,687 A | 8/1997 | Callebaut et al. | |
| 5,673,564 A | 10/1997 | Fradin | |
| 5,698,255 A | 12/1997 | Roehrig et al. | |
| 5,707,145 A | 1/1998 | Lucke et al. | |
| 5,773,070 A | 6/1998 | Kazemzadeh | |
| 5,775,986 A | 7/1998 | Law et al. | |
| 5,800,055 A | 9/1998 | Sato | |

(56) References Cited

U.S. PATENT DOCUMENTS

| | | | |
|---|---|---|---|
| 5,820,041 A | 10/1998 | Moessmer et al. | |
| 5,894,999 A | 4/1999 | Moessmer et al. | |
| 5,912,039 A | 6/1999 | Browne | |
| 5,913,602 A | 6/1999 | Steele | |
| 5,925,400 A | 7/1999 | Gundlach et al. | |
| 5,939,112 A | 8/1999 | Katayama et al. | |
| 5,953,984 A | 9/1999 | Moessmer et al. | |
| 5,965,173 A * | 10/1999 | Goldup | 425/205 |
| 5,972,398 A | 10/1999 | Ludwig et al. | |
| 5,981,269 A | 11/1999 | Park | |
| 6,043,444 A | 3/2000 | Nutt et al. | |
| 6,048,088 A * | 4/2000 | Haring et al. | 366/85 |
| 6,090,418 A | 7/2000 | Gundlach et al. | |
| 6,099,159 A | 8/2000 | Yoshida et al. | |
| 6,106,146 A | 8/2000 | Langecker et al. | |
| 6,116,770 A | 9/2000 | Kiani et al. | |
| 6,170,975 B1 | 1/2001 | Andersen | |
| 6,220,745 B1 * | 4/2001 | Kobayashi et al. | 366/83 |
| 6,224,930 B1 | 5/2001 | Inglis et al. | |
| 6,265,006 B1 | 7/2001 | Inglis et al. | |
| 6,287,188 B1 | 9/2001 | Righele et al. | |
| 6,322,244 B1 | 11/2001 | Marchesini et al. | |
| 6,387,306 B1 | 5/2002 | Morohashi et al. | |
| 6,513,963 B2 * | 2/2003 | Derezinski | 366/89 |
| 6,550,959 B2 | 4/2003 | Huber et al. | |
| 6,582,744 B1 | 6/2003 | Babacan | |
| 6,588,926 B2 | 7/2003 | Huber et al. | |
| 6,588,928 B2 | 7/2003 | Huber et al. | |
| 6,616,320 B2 | 9/2003 | Huber et al. | |
| 6,635,301 B1 | 10/2003 | Howsam | |
| 6,648,501 B2 * | 11/2003 | Huber et al. | 366/301 |
| 6,688,217 B2 | 2/2004 | Hauck et al. | |
| 6,827,005 B2 | 12/2004 | Babacan | |
| 6,846,103 B2 | 1/2005 | Okamoto et al. | |
| 7,070,495 B2 | 7/2006 | Kindermann | |
| 7,123,685 B2 | 10/2006 | Ostergaard et al. | |
| 7,169,421 B2 | 1/2007 | Tomey et al. | |
| 7,282,235 B2 | 10/2007 | Lombard et al. | |
| 7,448,795 B2 | 11/2008 | Wenger et al. | |
| 7,488,502 B2 | 2/2009 | Morin et al. | |
| 7,521,076 B1 | 4/2009 | Wenger et al. | |
| 7,607,597 B2 | 10/2009 | Linn et al. | |
| 7,731,998 B2 | 6/2010 | Morin et al. | |
| 7,871,655 B2 * | 1/2011 | Morin et al. | 426/274 |
| 2001/0007690 A1 | 7/2001 | Girsh | |
| 2002/0075754 A1 | 6/2002 | Huber et al. | |
| 2002/0075755 A1 | 6/2002 | Huber et al. | |
| 2002/0093118 A1 | 7/2002 | Inoue et al. | |
| 2002/0134317 A1 | 9/2002 | Shane et al. | |
| 2002/0176318 A1 | 11/2002 | Huber et al. | |
| 2002/0176319 A1 | 11/2002 | Huber et al. | |
| 2002/0181321 A1 | 12/2002 | Huber et al. | |
| 2002/0181324 A1 | 12/2002 | Huber et al. | |
| 2003/0091708 A1 | 5/2003 | Garwood | |
| 2003/0124221 A1 | 7/2003 | Garwood | |
| 2003/0152679 A1 | 8/2003 | Garwood | |
| 2003/0165602 A1 | 9/2003 | Garwood | |
| 2003/0170357 A1 | 9/2003 | Garwood | |
| 2003/0170359 A1 | 9/2003 | Garwood | |
| 2003/0175392 A1 | 9/2003 | Garwood | |
| 2003/0185937 A1 | 10/2003 | Garwood | |
| 2003/0185948 A1 | 10/2003 | Garwood | |
| 2003/0207006 A1 | 11/2003 | Jurgensen et al. | |
| 2004/0081729 A1 | 4/2004 | Garwood | |
| 2004/0136261 A1 | 7/2004 | Huber et al. | |
| 2004/0146602 A1 | 7/2004 | Garwood | |
| 2004/0185152 A1 | 9/2004 | Garwood | |
| 2004/0185154 A1 | 9/2004 | Garwood | |
| 2004/0185155 A1 | 9/2004 | Garwood | |
| 2004/0185156 A1 | 9/2004 | Garwood | |
| 2005/0042361 A1 | 2/2005 | Tomey et al. | |
| 2005/0208188 A1 | 9/2005 | Garwood | |
| 2005/0249862 A1 | 11/2005 | Morin et al. | |
| 2005/0249863 A1 | 11/2005 | Morin et al. | |
| 2005/0249864 A1 | 11/2005 | Morin et al. | |
| 2005/0255207 A1 | 11/2005 | Morin et al. | |
| 2005/0255221 A1 | 11/2005 | Morin et al. | |
| 2005/0255222 A1 | 11/2005 | Morin et al. | |
| 2005/0255223 A1 | 11/2005 | Morin et al. | |
| 2005/0255224 A1 | 11/2005 | Morin et al. | |
| 2005/0260311 A1 | 11/2005 | Garwood | |
| 2005/0276903 A1 | 12/2005 | Morin et al. | |
| 2007/0292559 A1 | 12/2007 | Garwood | |
| 2008/0095910 A1 | 4/2008 | Wenger et al. | |
| 2008/0159875 A1 | 7/2008 | Wilke | |
| 2008/0223223 A1 | 9/2008 | Wenger et al. | |

FOREIGN PATENT DOCUMENTS

| | | |
|---|---|---|
| DE | 2536074 | 8/1975 |
| DE | 7540167 | 8/1976 |
| DE | 2628858 | 12/1977 |
| EP | 0325315 | 7/1989 |
| EP | 0356165 | 2/1990 |
| EP | 0391492 | 4/1990 |
| EP | 0380706 | 8/1990 |
| EP | 0479447 | 9/1991 |
| EP | 0674539 | 10/1995 |
| EP | 0700639 | 3/1996 |
| EP | 0700725 | 3/1996 |
| EP | 0870431 | 10/1998 |
| EP | 0962149 | 12/1999 |
| EP | 1100346 | 5/2001 |
| EP | 1295529 | 12/2001 |
| EP | 1269853 | 1/2003 |
| EP | 1402782 | 3/2004 |
| IE | 970904 | 3/1998 |
| JP | 358212740 | 12/1983 |
| JP | 63209549 | 8/1988 |
| JP | 63222656 | 9/1988 |
| JP | 1-128764 | 5/1989 |
| JP | 02303806 | 12/1990 |
| JP | 3-127966 | 5/1991 |
| JP | 4-104774 | 4/1992 |
| JP | 4-206030 | 7/1992 |
| RU | 2115319 | 7/1998 |
| RU | 2166854 | 5/2001 |
| RU | 2166858 | 5/2001 |
| RU | 2204917 | 5/2003 |
| SU | 1669522 | 8/1991 |
| WO | 79/00345 | 6/1979 |
| WO | 8100956 | 4/1981 |
| WO | 87/00733 | 2/1987 |
| WO | 90/01267 | 2/1990 |
| WO | 92/15393 | 9/1992 |
| WO | 93/08695 | 5/1993 |
| WO | 95/19710 | 7/1995 |
| WO | 98/05217 | 2/1998 |
| WO | 9825984 | 6/1998 |
| WO | 01/33974 | 5/2001 |
| WO | 01/62096 | 8/2001 |
| WO | 0162096 | 8/2001 |
| WO | 02/49748 | 6/2002 |
| WO | 0244026 | 6/2002 |
| WO | 02/065860 | 8/2002 |
| WO | 02/081922 | 10/2002 |
| WO | 02/094025 | 11/2002 |
| WO | 02/094513 | 11/2002 |
| WO | 03/061400 | 7/2003 |
| WO | 03/092389 | 11/2003 |
| WO | 03/101210 | 12/2003 |
| WO | 2004/016097 | 2/2004 |
| WO | 2004/082403 | 9/2004 |
| WO | 2006078991 | 7/2006 |
| WO | 2006135229 | 12/2006 |

OTHER PUBLICATIONS

U.S. Appl. No. 12/277,159, Titled Method and Apparatus for Continuous Processing of Whole Muscle Meat Products, filed Nov. 24, 2008.

Extended European Search Report dated Mar. 31, 2010, from related European Patent Application No. 09252603.

(56) References Cited

OTHER PUBLICATIONS

Irvin F. Snider, Mixing and More: The Continuous Co-Rotating Overlapping Twin-Screw Mixer, Powder and Bulk Engineering Magazine, Jan. 1999, USA, reproduced at http://www.readco.com/Mixing_and More.pdf (last visted Aug. 19, 2009) (4 pages).
Processing Meat Products, Processing Techniques for Meat Products, http://www.ansci.uiuc.edu/meatscience/Library/processing%20meat%20products.htm (last visited Apr. 24, 2003) (4 pages).
Sausage Manufacturing, Sausage Manufacturing, http://savell-j.tamu.edu/sausage.html (last visited Apr. 24, 2003) (8 pages).
C. Lynn Knipe, Phosphates as Meat Emulsion Stabilizers, from Phosphates as Emulsifiers, Encyclopaedia of Food Science, Food Technology, and Nutrition, 1992, Academic Press Limited, London, reproduced at OSU Meat Science: Phosphates as Meat Emulsion Stabilizers, http://www.ag.ohio-state.edu/~meatsci/archive/phoschap.html (last visited Apr. 24, 2003) (5 pages).
Weiler and Company, Inc., GMS In-Line Analysis System, Product Brochure, Feb. 2001 (12 pages).
ESE Inc., ESE Analytical, Product Brochure, Marshfield, Wisconsin (3 pages).
Gerald Offer & John Trinick, On the Mechanism of Water Holding in Meat: The Swelling and Shrinking of Myofibrils, Meat Science, 1983, pp. 245-281, vol. 8, Applied Science Publishers Ltd., Great Britain (37 pages).
Alan Sharp & Gerald Offer, The Mechanism of Formation of Gels from Mysoin Molecules, Science Food Agriculture, 1992, pp. 63-73, vol. 1 (11 pages).
Amendment, filed Aug. 10, 2011, in related U.S. Appl. No. 12/277,159, (15 pages).
United States Patent and Trademark Office, Non-Final Office Action mailed May 10, 2011, in related U.S. Appl. No. 12/277,159, (13 pages).
United States Patent and Trademark Office, Final Office Action mailed Sep. 7, 2011, in related U.S. Appl. No. 12/277,159, (8 pages).
Canadian Patent Office, Office Action dated Oct. 26, 2011, in corresponding Canadian Patent App. No. 2,686,044, 3 pages.
Response dated May 23, 2011, in related European Patent App. No. 09252603.7, 8 pages.
Search of Non-Patent Literature conducted before Nov. 24, 2008, 3 pages.
Excerpt from Meat Processing book, published before Nov. 24, 2008, 1 page.
Excerpt from J.R. Claus, J.W. Colby G.J. Flick, Processed Meats/Poultry/Seafood, 1994, In: Muscle Foods: Meat, Poultry and Seafood Technology, New York: Chapman & Hall, pp. 106-162.

\* cited by examiner

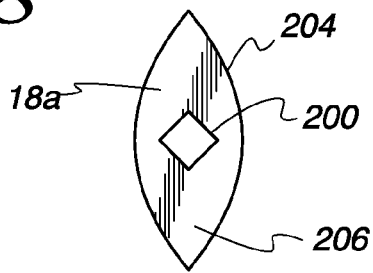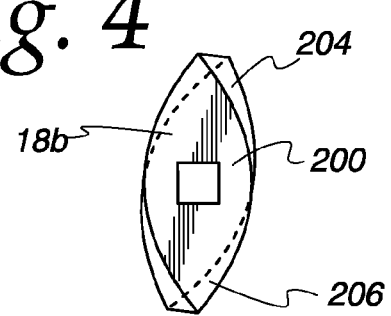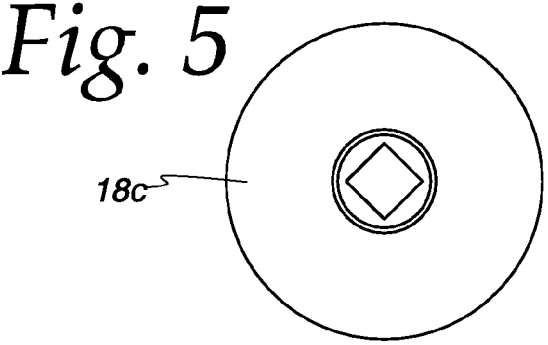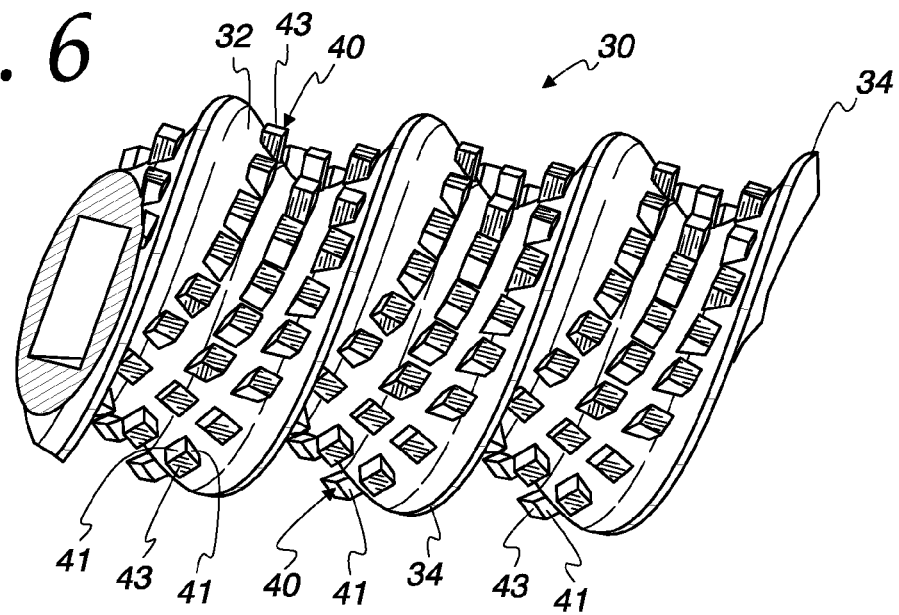

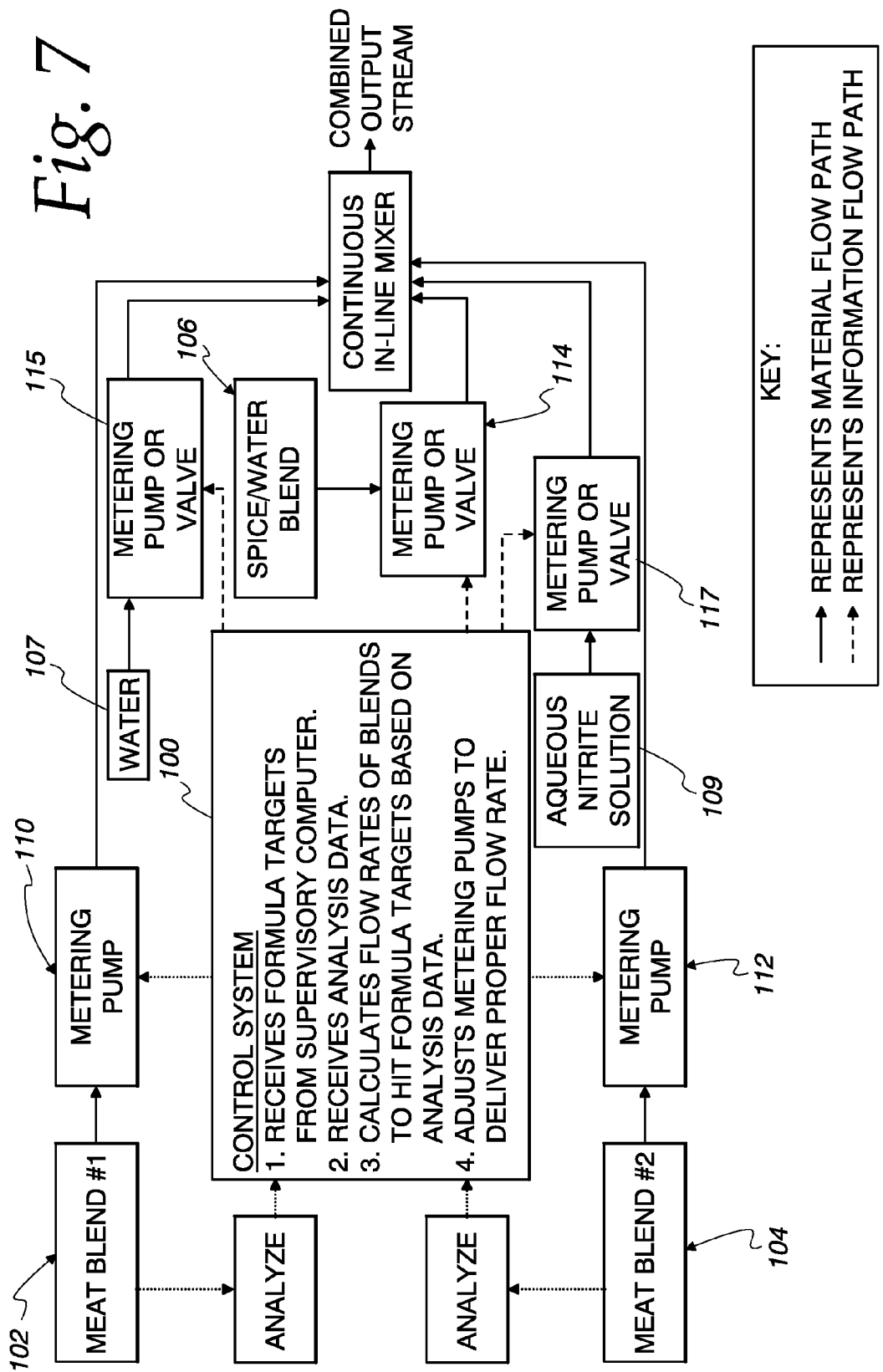

Fig. 13

| CONDITION | PADDLE CONFIG. | MIX STEPS | RPM | OPENING | FLOWRATE LBS/MIN | BATTER TEMPERATURES° F MIXED | BATTER TEMPERATURES° F EMULSIFIED | BATTER TEMPERATURES° F DELTA T | CIB STABILITY FAT COOKOUT > 2mL/100g (MIN) |
|---|---|---|---|---|---|---|---|---|---|
| 1 | MIXER 400 | 1 | 100 | 3/4" | 50.0 | 46 | 72-78 | 26-32 | 5 |
| 2 | MIXER 400 | 1 | 100 | 1/4" | 50.0 | 46 | 76-78 | 30-32 | 5 |
| 3 | MIXER 300 | 2 | 100 | 3/4" | 50.0 | 46-47 | 75-77 | 28-31 | 3 |
| 4 | MIXER 300 | 2 | 100 | 1/4" | 50.0 | 46 | 76-77 | 30-31 | 4 |
| 5 | CONTROL | 2 | 50 | N/A | N/A | 48 | 67-86 | 19-38 | >6 |
| 6 | MIXER 500 | 1 | 360 | 5/16" | 50.0 | 49-51 | 80 | 29-31 | >6 |
| 7 | MIXER 500 | 1 | 360 | 2" | 50.0 | 48 | 78-79 | 30-31 | 6 |
| 8 | MIXER 500 | 1 | 100 | 1/4" | 50.0 | 46 | 76 | 30 | 5 |
| 9 | MIXER 600 | 1 | 360 | 1/4" | 50.0 | 50-51 | 79 | 28-29 | 7 |
| 10 | MIXER 200 | 1 | 360 | 1/4" | 50.0 | 47-48 | 76-79 | 28-32 | 6 |
| 11 | MIXER 200 | 2 | 360 | 1/4" | 50.0 | 46 | 76-84 | 30-38 | 7 |
| 12 | MIXER 200 | 1 | 360 | 1/4" | 50.0 | 46 | 76 | 30 | 4 |
| 13 | MIXER 600 | 1 | 360 | 1/4" | 50.0 | 50 | 80 | 30 | 8 |
| 14 | MIXER 600 | 1 | 360 | 1/4" | 25.0 | 56 | 79-80 | 23-24 | >8 |
| 15 | MIXER 600 | 2 | 360 | 1/4" | 50.0 | 50 | 80 | 30 | 6 |
| 16 | CONTROL | 2 | 50 | N/A | N/A | 47 | 77 | 30 | 8 |
| 17 | MIXER 700 | 1 | 360 | 1/4" | 50.0 | 51-52 | 79 | 27-28 | 8 |
| 18 | MIXER 700 | 1 | 360 | 1/4" | 37.5 | 52-53 | 80 | 27-28 | 8 |
| 19 | MIXER 700 | 1 | 360 | 1/4" | 25 | 57-58 | 79-80 | 21-23 | 8 |
| 20 | MIXER 700 | 1 | 360 | 1/4" | 15 | 67 | BOWL CHOPPED | | |

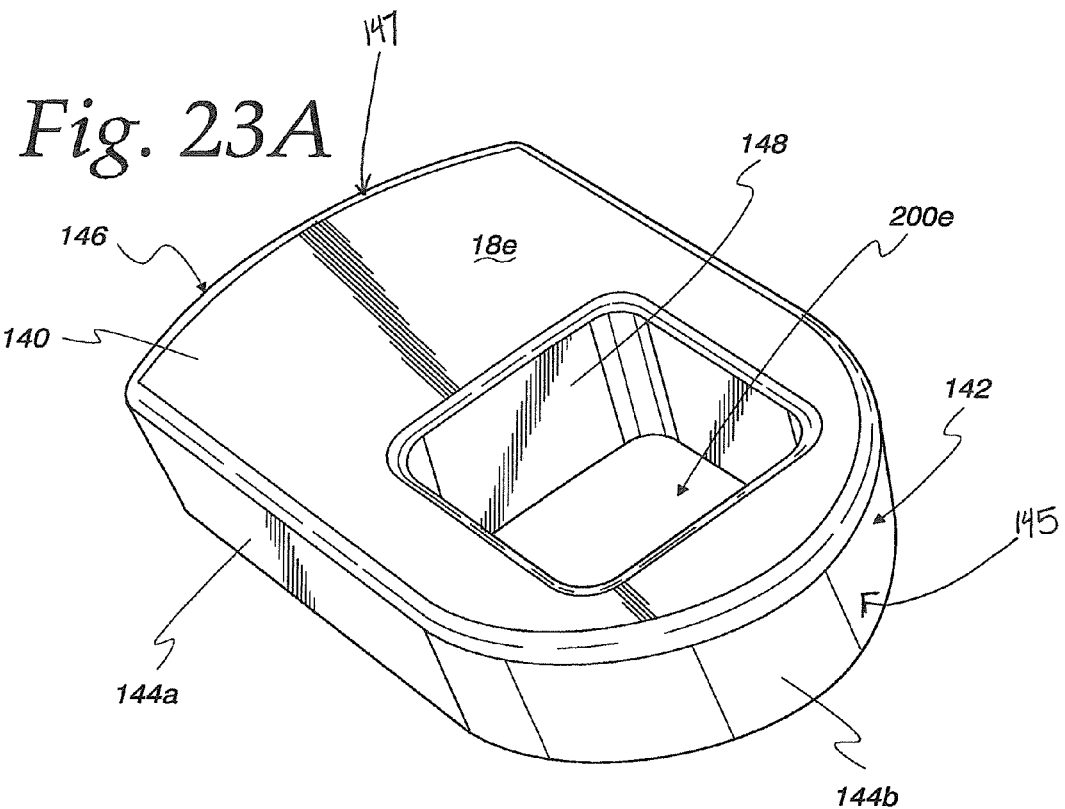
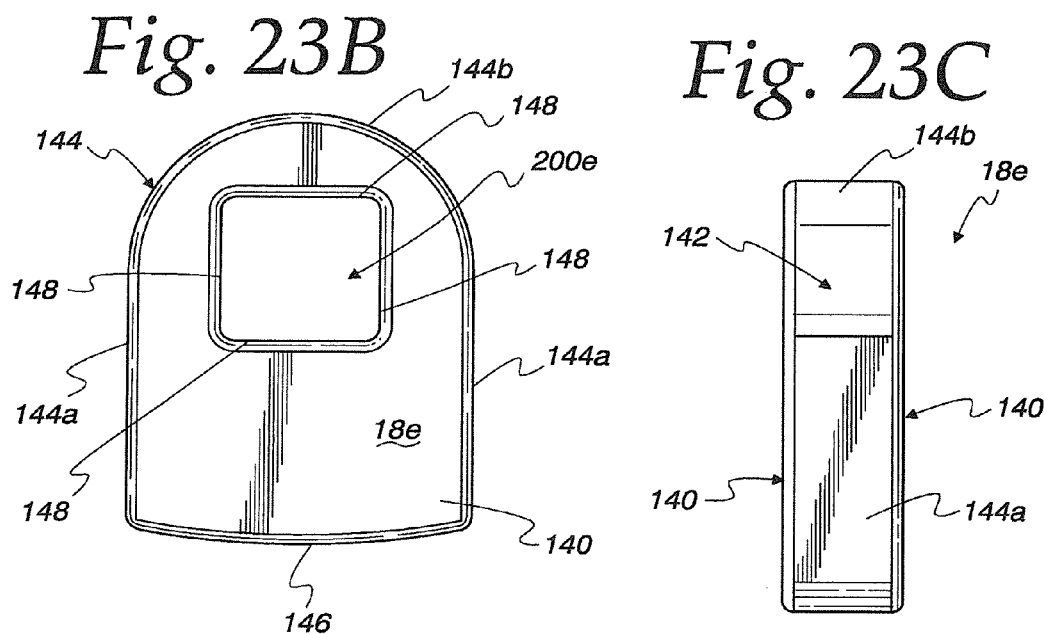

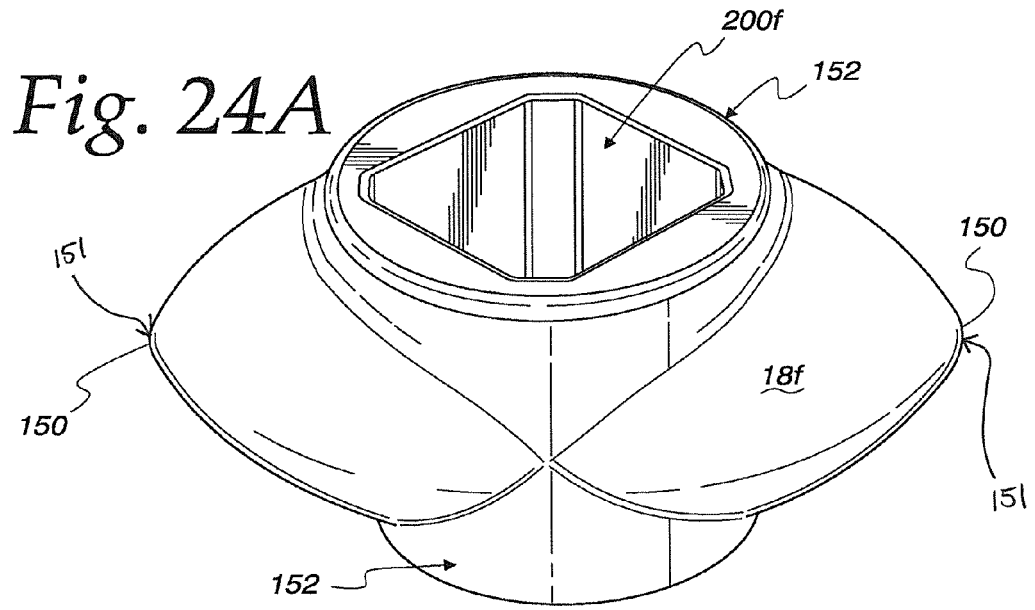
Fig. 24A
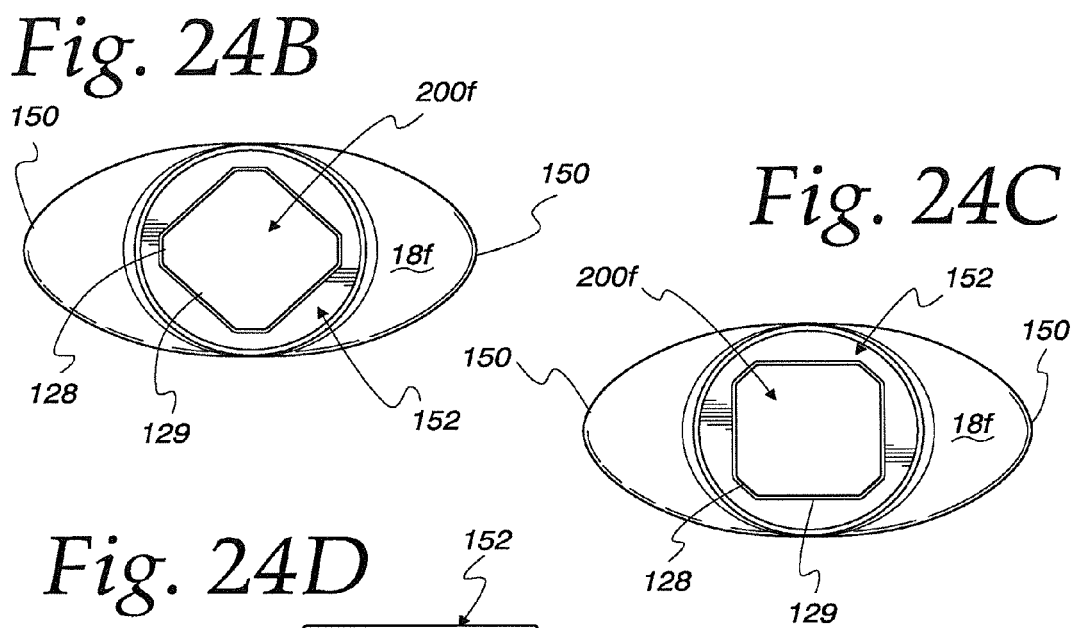
Fig. 24B
Fig. 24C
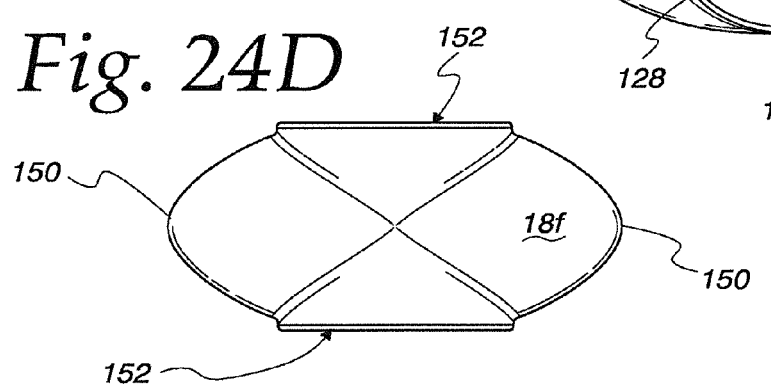
Fig. 24D

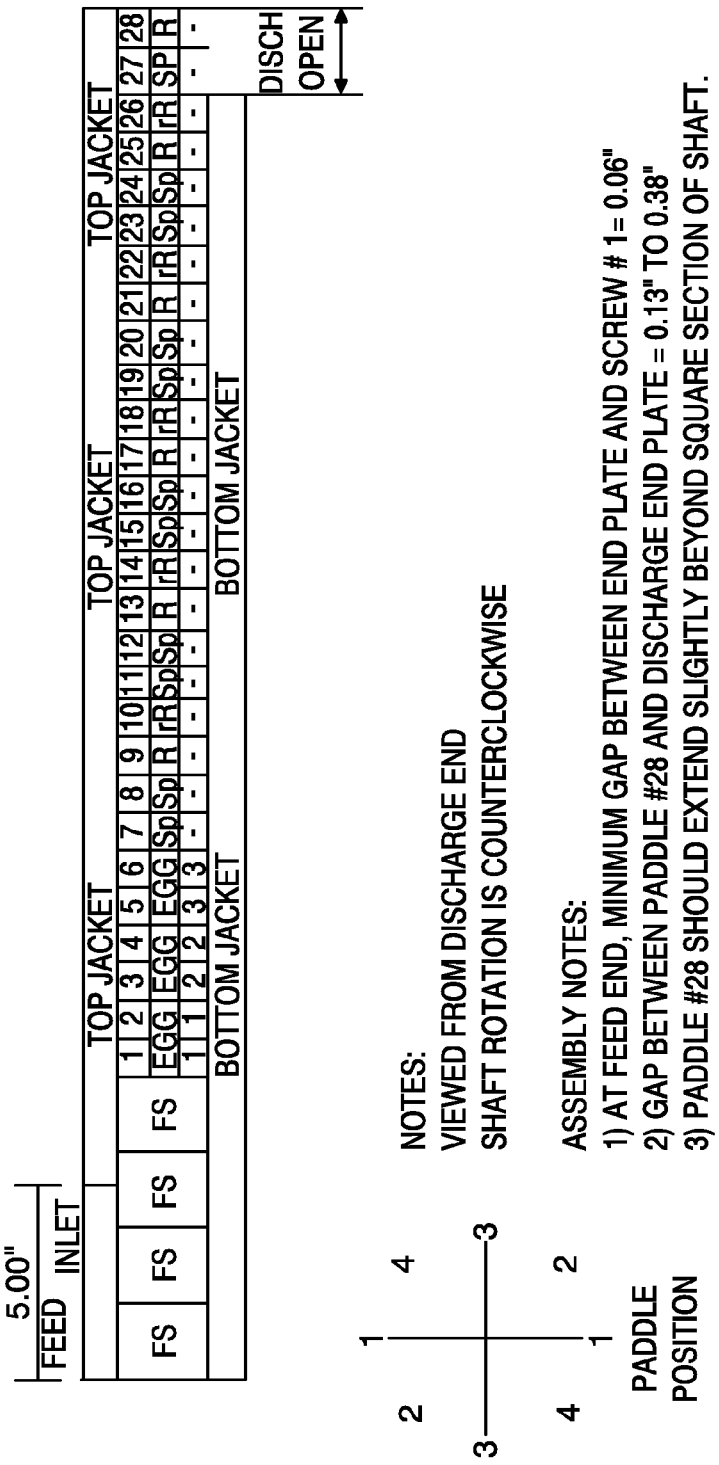

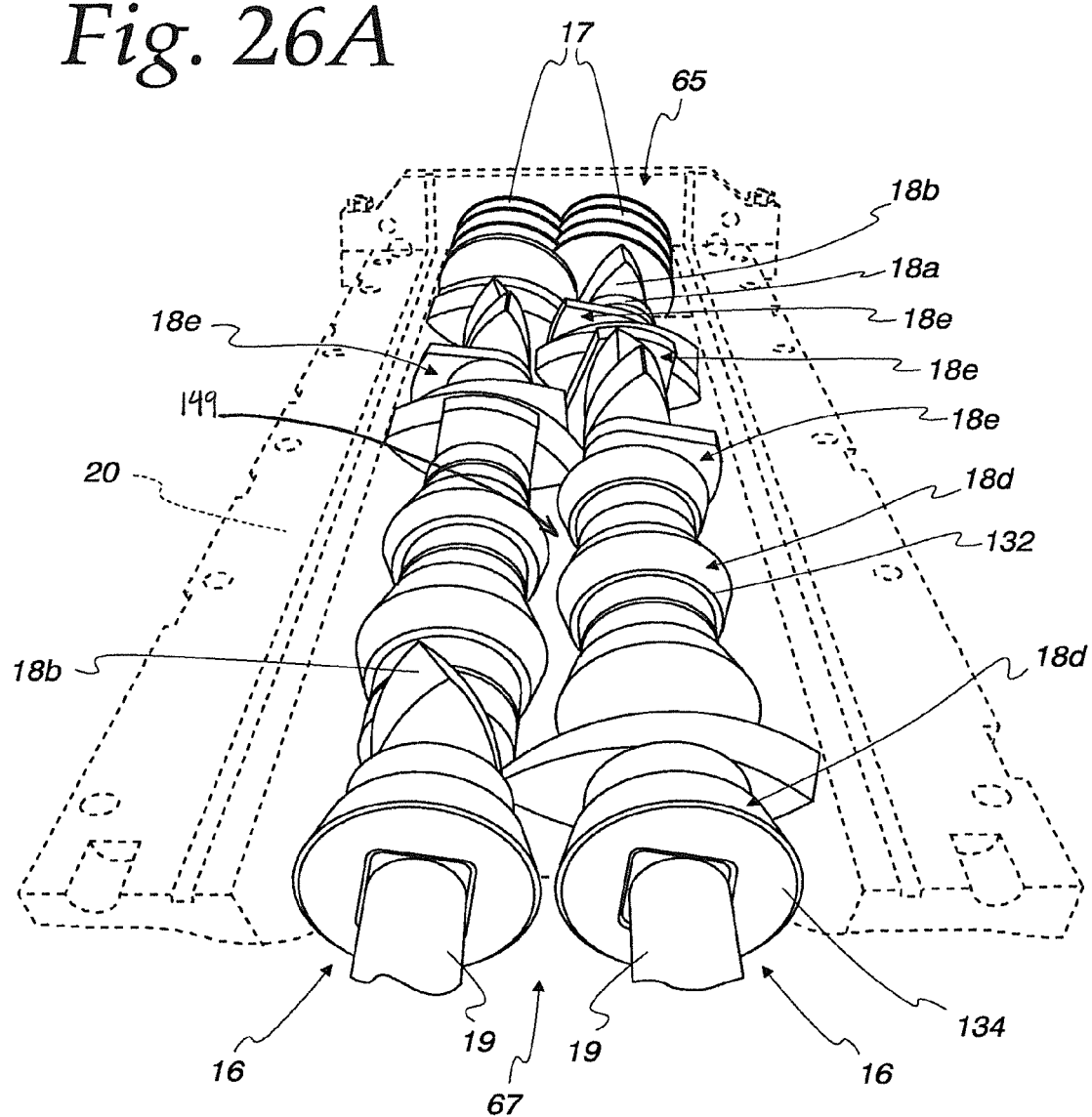

Fig. 26B

FS = FEED SCREW 17
Sp = CIRCULAR SHAPED MIXING ELEMENT 18C
rR = FRUSTO CONICAL MIXING ELEMENT 18F WITH DECREASING DIAMETER
R = FRUSTO CONICAL MIXING ELEMENT 18F WITH INCREASING DIAMETER
F = SHARP EDGED OVATE MIXING ELEMENT 18a
H = HELICAL SHARP EDGED OVATE MIXING ELEMENT 18b
Bl = BLOCKING MIXING ELEMENT 18e

| 5.00" | | | TOP JACKET | | | | | | | | | | | | | | | | | | | | | | | | | | | | DISCH OPEN |
|---|---|---|---|---|---|---|---|---|---|---|---|---|---|---|---|---|---|---|---|---|---|---|---|---|---|---|---|---|---|---|---|
| FEED INLET | | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | |
| FS | FS | FS | H | F | F | Bl | Sp | H | F | F | Sp | Bl | H | F | F | Bl | Sp | R | B | Sp | rR | Sp | R | rR | Sp | R | rR | H | Sp | R | |
| | | | 1 | 1 | 3 | - | 3 | 3 | 3 | - | 1 | 1 | 3 | - | - | - | - | - | - | - | - | - | - | - | - | - | - | - | - | - | |
| | | | BOTTOM JACKET | | | | | | | | | | | | | | | | | | | | | | | | | | | | |

NOTES:
VIEWED FROM DISCHARGE END
SHAFT ROTATION IS COUNTERCLOCKWISE

ASSEMBLY NOTES:
1) AT FEED END, MINIMUM GAP BETWEEN END PLATE AND SCREW # 1 = 0.06"
2) GAP BETWEEN PADDLE #28 AND DISCHARGE END PLATE = 0.13" TO 0.38"
3) PADDLE #28 SHOULD EXTEND SLIGHTLY BEYOND SQUARE SECTION OF SHAFT.

PADDLE POSITION

```
      3
   4  |  2
      |
 ─────1─────
      |
   2  |  4
      3
```

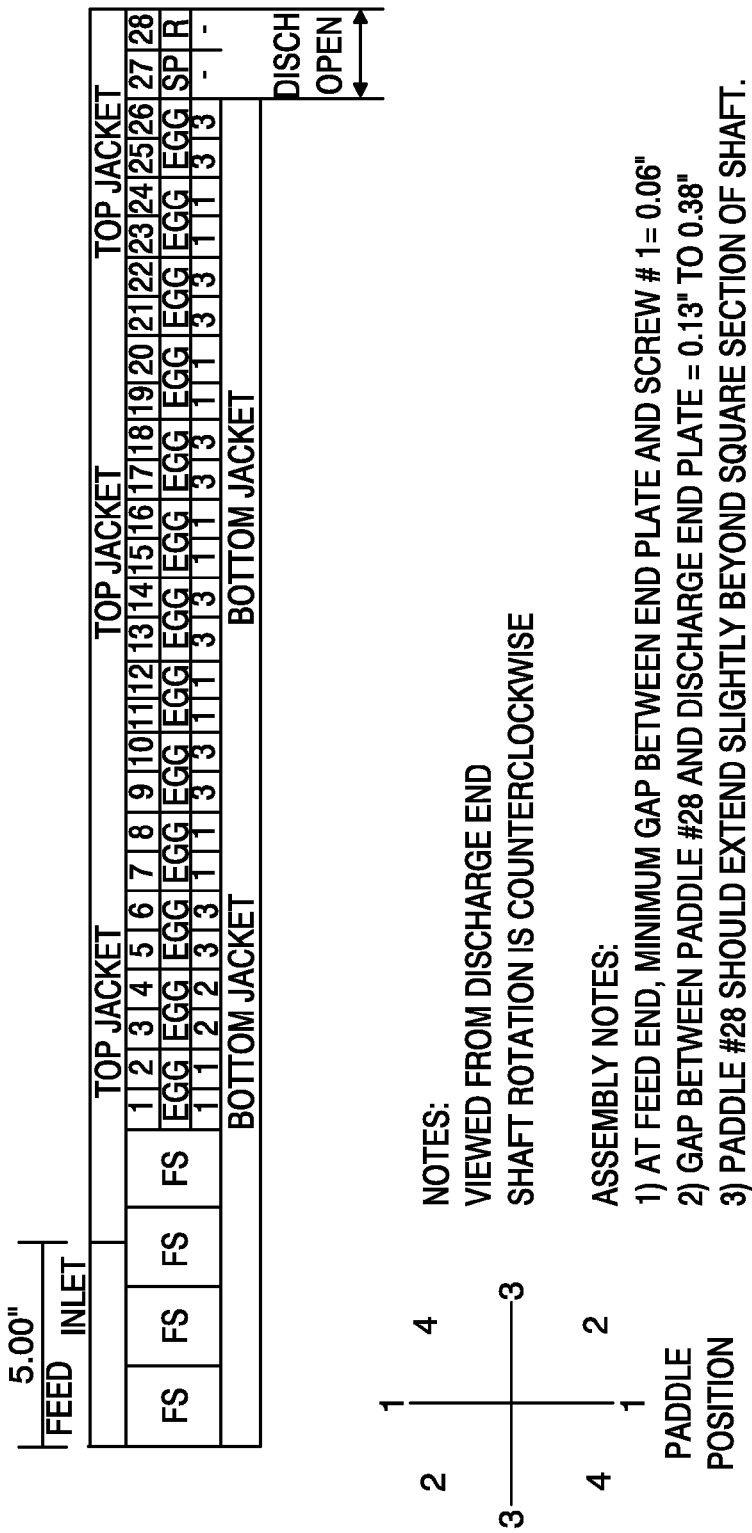

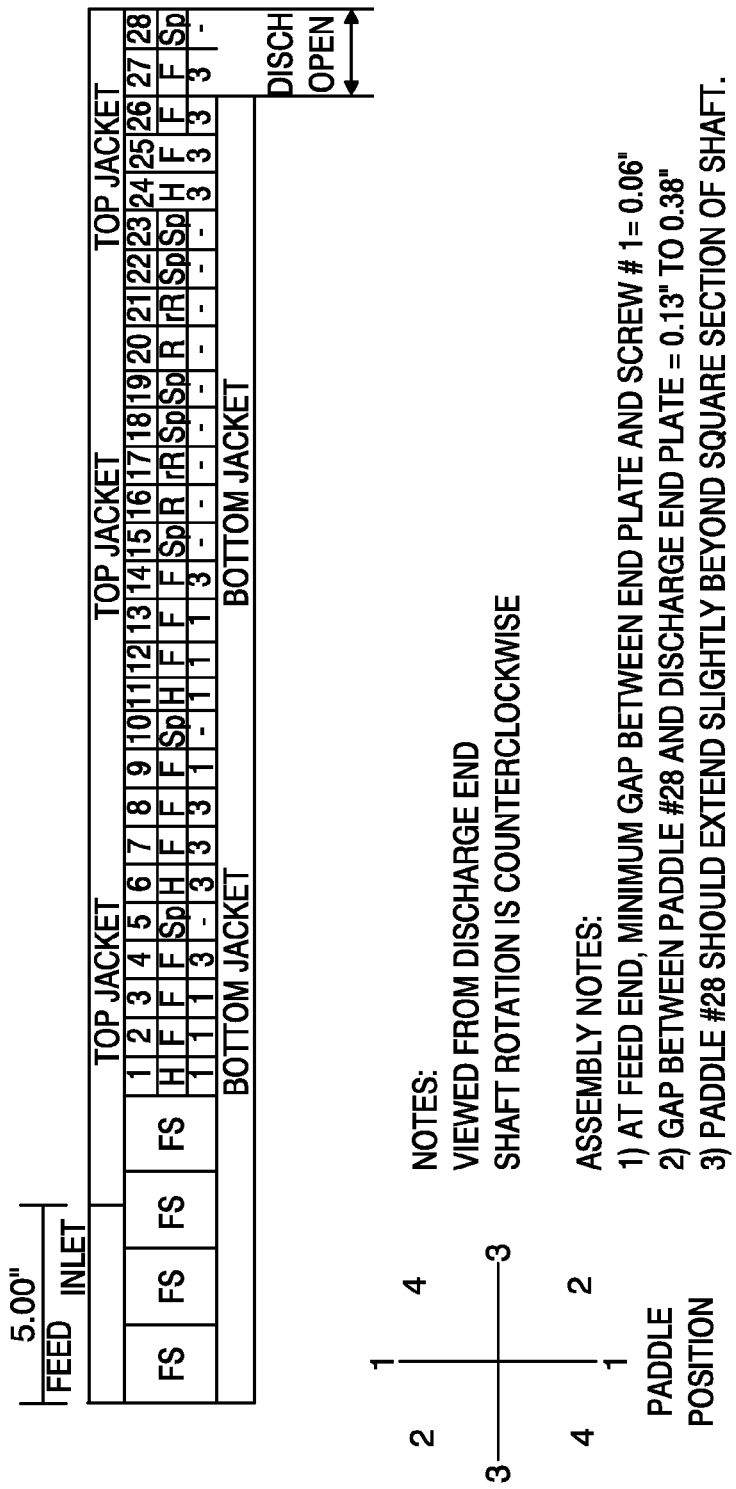

Fig. 29

| WEIGHT % | UNINJECTED - FIG. 28 CONFIGURATION | INJECTED - FIG. 26 CONFIGURATION | FIG. 27 CONFIGURATION | FIG. 27 CONFIGURATION 2 PASSES | FIG. 25 CONFIGURATION | CONVENTIONAL BATCH PROCESSING |
|---|---|---|---|---|---|---|
| BITS | - | - | - | - | - | - |
| SAMLL | 21.5% | 16.88% | 2.16% | 4.57% | 1.13% | 8.29% |
| MEDIUM | 27.8% | 25.41% | 2.74% | 4.01% | 2.46% | 6.21% |
| LARGE | 27.1% | 30.51% | 8.67% | 13.04% | 9.50% | 11.49% |
|  | 23.6% | 27.21% | 86.43% | 78.37% | 86.90% | 74.01% |

FIRST CONFIGURATION — FINAL CONFIGURATION — KIRKSVILLE — CLOSEST

METHOD AND APPARATUS FOR CONTINUOUS PROCESSING OF WHOLE MUSCLE MEAT PRODUCTS

TECHNICAL FIELD

This invention relates generally to a method and apparatus for processing meat and, in particular, to processing meat in a continuous processes.

BACKGROUND

Processed meat products, such as bologna, hot dogs, sausages, and whole muscle products including ham and turkey, among many others, are convenient and popular food items. A variety of commercial systems are available for making certain processed meats. In one type of commercial system used for making processed meat products including bologna and hot dogs, raw meat in the form of chunks or pieces and other ingredients such as spices are ground, chopped and/or otherwise blended with one or more salt solutions or brine to provide a mixture that can subsequently be formed into a stable meat emulsion or protein matrix. Similar steps of grinding, chopping and/or otherwise working are also employed in making coarse ground products such as sausages, whole muscle products such as processed ham and processed turkey and other processed meats. In each case, proteins form a matrix to hold or bond the separate meat pieces together.

A stable protein matrix requires the protein bonds to suspend or bond with fat and water. Creation of protein bonds in this context requires a process commonly known as protein extraction. In this process, salt soluble or salt extractable, heat coagulable proteins such as myosin, actomyosin, and actin bind water, swell and become tacky as a result of working or blending of the meat in the presence of a salt or a salt solution. The proteins are subsequently set when heated to create a bond. Other myofibrillar proteins, as well as sarcoplasmic or water soluble or extractable proteins, may also play a role in bonding. Salt solutions that may be used in protein extraction include, but are not limited to, sodium chloride, sodium pyrophosphate or diphosphate, potassium chloride, sodium lactate, and potassium lactate. In protein extraction as described herein, the mechanism believed to be primary responsible for the creation of the bonds involves binding proteins, salts, fats, and/or water and subsequent swelling of the proteins, rather than solution of the proteins. More precisely, it is believed that the salt solution frees bonding sites on the proteins for bonding with each other, as well as with water and fat.

Batch processes for blending meat and other ingredients and extracting protein are well known. A known method for achieving protein extraction and ingredient blending for certain products such as whole muscle meats including processed turkey and processed ham involves puncturing the whole muscle meat with hypodermic-type needles, injecting brine or salt solution through the needles, and using a batch processor or mixer to work the meat for approximately 45 minutes under vacuum conditions to remove air, as discussed below. For other products such as coarse ground meat including sausages and emulsified products, meat is ground and added to a batch processor with water, salt solution, spices, and/or other ingredients and worked with or without a vacuum for up to an hour, or in one approach, for 15 to 45 minutes.

A large batch mixer may process approximately 6,000 to 12,000 pounds per hour. The meat product constituents including the meats and the additives are combined in the low shear batch mixer for whole muscle products. This mixing stage typically requires 30 to 60 minutes of being mixed. It is during this time that the constituents are transformed into a mixture that will form a stable protein matrix.

A stable protein matrix is formed when mixtures for whole muscle products, coarse ground products, and emulsified products allow the salt solution to reach the salt-extractable protein. The time it takes for the salt to reach the salt-extractable protein may vary and it is desirable to decrease the time it takes for the process to occur. This process, known as curing, achieves the protein extraction. For whole muscle products, delivery of the brine solution through injection of the hypodermic-type needles inserted into the meat chunks is a relatively imprecise method for attempting to reduce the distance through which the salt solution must diffuse. The curing stage typically requires 24-48 hours for satisfactory diffusion, and the batches are stored in vats and placed into coolers for the cure time. Once the protein extraction has occurred, the mixture may then be further processed.

With respect to the processing equipment, while such mixers have been used commercially for many years, they have significant drawbacks with respect to their space requirements and cost due to their large size, as well as the length of time required for processing each batch, and the time and expense associated with cleaning of the apparatus.

As for the process, conventional batch processing is a lengthy process requiring a number of discrete steps. Initially, various meats are provided by a vendor with specified contents. More specifically, the meats are provided with a specified protein, fat, and/or water content, typically a percentage by weight. A batch sheet is provided to processing plant personnel indicating what mixture of meats, water, and additives are to be combined for one of a variety of meat products. In addition, the batch sheet often needs to be adjusted or more precisely indicated after the batch of meat has arrived at the plant. Based on the formula desired for the final meat product, the plant personnel often have to adjust the meats selected for processing in a particular batch. The final product mixture is carefully controlled. If a particular meat is utilized where the fat content is greater than what the batch sheet calls for, the final product may have an excessive amount of fat. To avoid this, the plant personnel would increase the protein provided by other meats to balance the fat content.

Unfortunately, this is not necessarily a sufficiently precise approach. Each meat, as well as each chunk in a batch of meat, may vary significantly from a sample taken and assumed to be average. Once the water and other additives are mixed in with the batch, it may be difficult to alter the balance. At times, the resulting batch is determined to be inaccurately mixed, and remedial procedures must be taken such as mixing the batch in with additional correction materials. In order to reduce the likelihood of an imprecise batch, relatively large quantities of meat are provided for a single batch in hopes of minimizing or driving to a mean the composition deviation resulting from a meat portion with an aberrational content. A typical amount of a particular meat for a batch is approximately 2000 lbs.

Input constituents are calculated to result in a specific quantity of cooked product. If excessive water or fat is lost post-mix such as during the cook stage, the carefully regulated water, fat, and meat ratios will be off-target. If fat is lost prior to the cook stage, it often remains in the machinery or piping through which the mixture is processed. This can result in down time for the machinery, likelihood of damaged machinery, and greater labor in cleaning the machinery. Furthermore, cooked emulsified products rely, to some degree, on non-protein or non-bound materials to provide the proper texture. The proteins bind to form a matrix with each other and, in the absence of sufficient fat or water, these bonds may form a larger, stronger matrix, which leads the product to become somewhat rubbery. Conversely, if there is too much water, the cooked product may be too soft, and may lack integrity.

As used herein, the term additives may refer broadly to brine solution, water without salt, a spice slurry, nitrite, or other additives. Though the brine solution and the meats themselves each include water, the balance for the final product is typically adjusted with a quantity of water. The spice slurry provides, for instance, flavorings and water. One additive is typically nitrite which is used as a preservative and to provide a desired color. Other inert additives, such as corn starch or non-functional proteins, may also be included.

As the mixture constituents are churned in the mixer for up to an hour, contact with air may produce a froth on the surface of the meat pieces. A final product having visible air may be unacceptable. In some cases, the product must be reprocessed and mixed in with subsequent batches. Air in the product may appear as surface bubbles, or as surface holes. Entrapped air may also lead to product swelling during cooking or may lead to the product having visible air bubbles within its interior.

Air affects the product in other ways as well. For instance, some proteins are denatured by the presence of air, which reduces the functionality of the meat for binding fat and water. The air can also react with the nitrite to retard the development of the proper color. The resulting color may then be undesirable or objectionable to consumers.

To avoid being stirred into the mixture, vacuum pressure may be applied during the mixing process. This requires an extensive set up including the vacuum itself and seals to maintain the pressure. The vacuum system and seals require maintenance, and occasionally leak which results in downgraded product.

While such mixers have been used commercially for many years, they have significant drawbacks. For example, one of the problems is that air may undesirably be drawn into the product. Other drawbacks for the mixers include their space requirements and cost due to their large size, labor costs, the length of time required for processing each batch, vat handling and transfer yield loss, and the time and expense associated with cleaning of the apparatus.

In addition to the problems encountered with batch mixers for both whole muscle products and emulsified products, there are additional constraints for mixers that process whole muscle products. For example, in reducing the time required for processing and accelerating the formation of a stable meat mixture, the meat chunks introduced into the mixer may be subject to increased shear forces. However, high shear forces may not only distort the shape of size of the meat pieces but also impact the texture, mouth feel, and appearance of the meat after processing. Thus, in an effort to speed-up the processing of whole meat products, the processes cannot subject the whole meat to excessive shear force.

SUMMARY

The illustrated method and apparatus comprise improved methods and apparatus for use in making processed meat products including whole muscle meat products by providing significant advantages with respect to the size of the apparatus, the time required for processing, the control of the process, and/or other aspects of the manufacturing process.

In one embodiment, the method and apparatus provides for making processed whole muscle meat product in a meat mixer with a housing having an input and an output a distance away. The housing having a pair of parallel rotating shafts with mixing elements located thereon. A plurality of constituents including whole muscle meat and salt solution are input into the meat mixer for processing. By one approach, one of the mixing elements has a generally frustoconical shaped body. The frustoconical mixing element may have a generally circular cross section of increasing diameter or a generally circular cross section with decreasing diameter. In another example, the frustoconical mixing element includes both, a section with an increasing diameter and a section with a decreasing diameter. The frustoconical mixing element may be employed in a working zone to increase diffusion of the salt solution into the whole muscle meat and otherwise assist with processing of the meat. By another approach, one of the mixing elements has a generally ellipsoidal-shaped body. A mixing element with the generally ellipsoidal surface may be employed in a massaging zone to increase diffusion of the salt solution and otherwise assist with processing of the meat. By yet another approach, one of the mixing elements impedes the flow of the plurality of constituents within the meat mixer. A mixing element with a blocking configuration may impede the flow of the constituents to increase the work done on the constituents at a point upstream of the blocking mixing element.

BRIEF DESCRIPTION OF THE DRAWINGS

The above needs are at least partially met through provision of the Method and Apparatus for Meat Processing With Expansion and Compression Elements described in the following detailed description, particularly when studied in conjunction with the drawings, wherein:

FIG. 3 comprises a front elevational view of another component of the apparatus of FIG. 2 as configured in accordance with various embodiments of the invention;

FIG. 4 comprises a front elevational view of another component of the apparatus of FIG. 2 as configured in accordance with various embodiments of the invention;

FIG. 5 comprises a front elevational view of another component of the apparatus of FIG. 2 as configured in accordance with various embodiments of the invention;

FIG. 6 comprises a fragmentary side view of a segment of a rotational element as configured in accordance with various embodiments of the invention;

FIG. 7 comprises a flow diagram representing a process as configured in accordance with various embodiments of the invention;

FIG. 13 comprises a table listing configurations of rotational elements for the apparatus as described herein and data relevant thereto;

FIG. 23A to 23C comprise various views of an element of the mixing apparatus as configured in accordance with various embodiments of the invention;

FIG. 24A to 24D comprise various views of an element of the mixing apparatus as configured in accordance with various embodiments of the invention;

FIG. 25B comprises schematic representation of the configuration of FIG. 25A;

FIG. 26A comprises perspective view of a mixing apparatus as configured in accordance with various embodiments of the invention;

FIG. 26B comprises schematic representation of the configuration of FIG. 26A;

FIG. 27B comprises schematic representation of the configuration of FIG. 27A;

FIG. 28B comprises schematic representation of the configuration of FIG. 28A;

FIG. 29 comprises a table illustrating results from mixing element configuration as configured in accordance with various embodiments of the invention.

Figure 1:
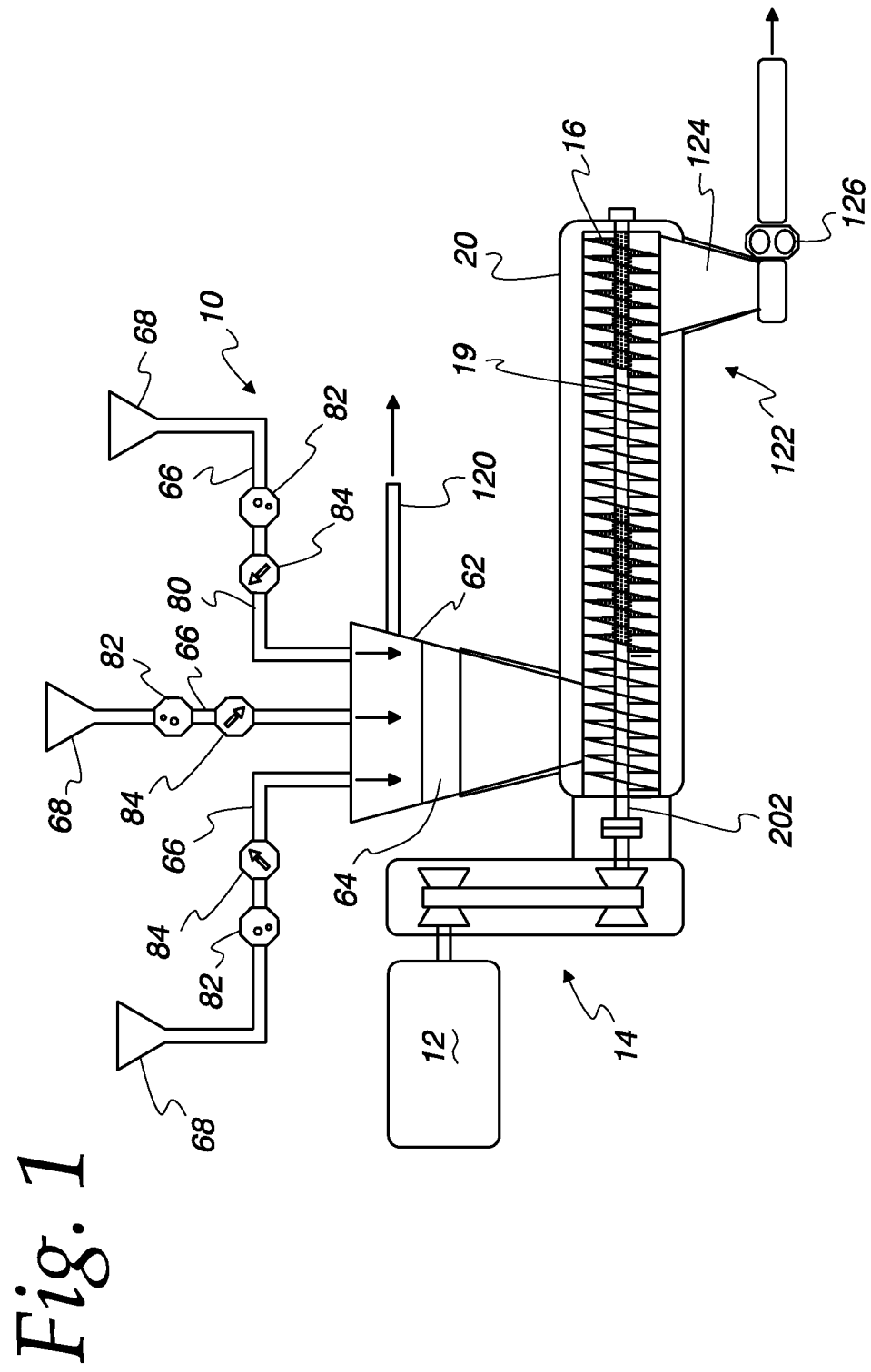
FIG. 1 comprises a schematic representation of a continuous mixing processor as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, a continuous method and system for processing whole muscle meat is illustrated in FIG. 1 and FIGS. 22A through 28B. The system for continuous production of a whole muscle meat product includes a housing, such as housing 20, having a pair of parallel rotating shafts 19 with a plurality of mixing elements 18, such a frustoconical elements 18d, blocking element 18e, or ellipsoid element 18f, mounted thereon. The mixer housing 20 has an input to receive the meat ingredients, such as whole muscle meat, a salt solution, water, preservatives, and other additives such as spices. The mixer housing 20 also has an output, which is separated a distance from the input, such that the output discharges the whole muscle meat product after the ingredients have traveled from the input to the output along the rotating shafts. As the whole muscle meat moves from the input to the output, the mixing elements 18 work the meat along with the other ingredients thereby increasing ingredient incorporation including diffusion of the salt solution into the whole muscle meat pieces. By working the whole muscle meat and the ingredients with the mixing elements 18d having a frustoconical body, the salt solution and other ingredients quickly diffuse into the whole muscle meat without excessively macerating or tearing the whole muscle meat. The blocking element 18e when used as a mixing element 18 along the shaft 19 increases the residence time of the ingredients at a portion of the rotating shafts 19 just upstream from the blocking element 18e. Increasing the residence time at that portion of the shaft, subjects the ingredients to the action of the upstream mixing element for a longer period of time. By employing the ellipsoid element 18f, the whole muscle meat undergoes a moderate amount of tenderizing or massaging thereby increasing diffusion of the other ingredients such as the salt solution or spices.

To preserve the integrity of the whole muscle meat, whole muscle meat processing requires slightly more gentle techniques than the high shear forces used for other meat products. While high shear processing provides maceration and tenderization thereby increasing ingredient contact and incorporation, such high shear forces typically disrupt the structure of the whole muscle meat to such an extent that the integrity of the whole muscle structure is nearly completely destroyed. Thus, it is desirable to employ a moderate approach that sufficiently works the whole muscle meat to disrupt enough of the structure to quickly provide for increased ingredient incorporation without excessively destroying the integrity of the whole muscle meat. Whole muscle meat that retains its integrity retains the desired texture, mouthfeel, and coloring, among other characteristics.

To accommodate the more moderate ingredient incorporation techniques, the whole muscle pieces may require additional time to be worked or manipulated by those mixing elements 18 delivering the working or massaging. However, it is still desirable to accomplish the processing quickly, even though more moderate forces are used to process whole muscle meat.

To balance the desire to quickly diffuse the salt solution into the meat and the desire for the whole muscle meat to keep its whole muscle characteristics, a number of mixing elements 18 may be used including the frustoconical element 18d, the blocking element 18e, and the ellipsoidal element 18f. Working the whole muscle meat and other ingredients with mixing elements 18 having a frustoconical body diffuses the other ingredients into the whole muscle meat without excessively macerating or tearing the whole muscle meat thereby retaining the integrity of the meat. The frustoconical mixing element 18d does not have sharp cutting surfaces that would slice or cut the meat. A process employing the frustoconical mixing elements 18d works and gently tenderizes the whole muscle meat, thereby increasing ingredient incorporation without significant particle size reduction of the whole muscle meat pieces.

To provide additional dwell time for the ingredient to undergo additional processing in the mixer housing, the blocking mixing element 18e may be employed. As mentioned, due to the more moderate forces, additional working or manipulation time may be needed to provide sufficient ingredient incorporation. The blocking element 18e, works with surrounding elements to slow the flow of the ingredients and to allow the mixing elements upstream from the blocking element 18e to have a slightly longer exposure to the ingredients.

In one illustrative example, massaging the whole muscle meat and the ingredients with ellipsoidal mixing elements 18f stimulates ingredient incorporation without subjecting the whole muscle meat to excessive shear forces that may bruise, tear, abrade or mince the whole muscle meat. As discussed above, while high shear processing provides maceration and tenderization that increases ingredient incorporation, the same high shear forces also may greatly disrupt the structure of the whole muscle meat to an extent that the integrity of the whole muscle structure is nearly completely destroyed. By employing an ellipsoid element 18f, the whole muscle meat may be massaged or worked to increase ingredient incorporation without excessive damage to the whole muscle meat pieces. The ellipsoid elements 18f do not have edges that can cut or slice the meat pieces and therefore can massage or gently pound the meat without negatively affecting the integrity of the whole muscle meat.

In addition to the ability of the system having capabilities of working the whole muscle meat, the system is flexible such that alternative elements 18 may be positioned on the twin shafts 16 to provide for different processing characteristics. By one approach, some of the mixing elements 18 used along the shaft 19 have sharper edges. By another approach, input lines may introduce ingredients into the housing mixer at slower or faster rates to alter dwell time or mixer-residence time. This flexibility lets the user alter the processing depending on the desired final meat product.

These and other benefits may become clearer upon making a thorough review and study of the following detailed description. Referring now to the drawings, and in particular to FIG. 1, an illustrative apparatus that is compatible with many of these teachings will now be presented. The apparatus, shown diagrammatically at 10, is capable of making processed meat products as outlined herein. The illustrated apparatus comprises a motor 12 and a belt drive 14 transmitting power to one or more mixing devices 16 located in a housing 20. Ingredients such as chunks or pieces of meat, one or more salt solutions, water, flavorings such as spices, and preservatives are input through input lines, including pumps 84 directly into the housing 20. The input line pumps 84 and mixing devices advance the mixture through the housing while the mixing device applies a high shear rate, in one embodiment, to the mixture to achieve rapid protein extraction from the meat components. The mixing devices, in one example, are made of stainless steel or another material that is wear resistant and suitable for contact with food product components.

Figure 2:
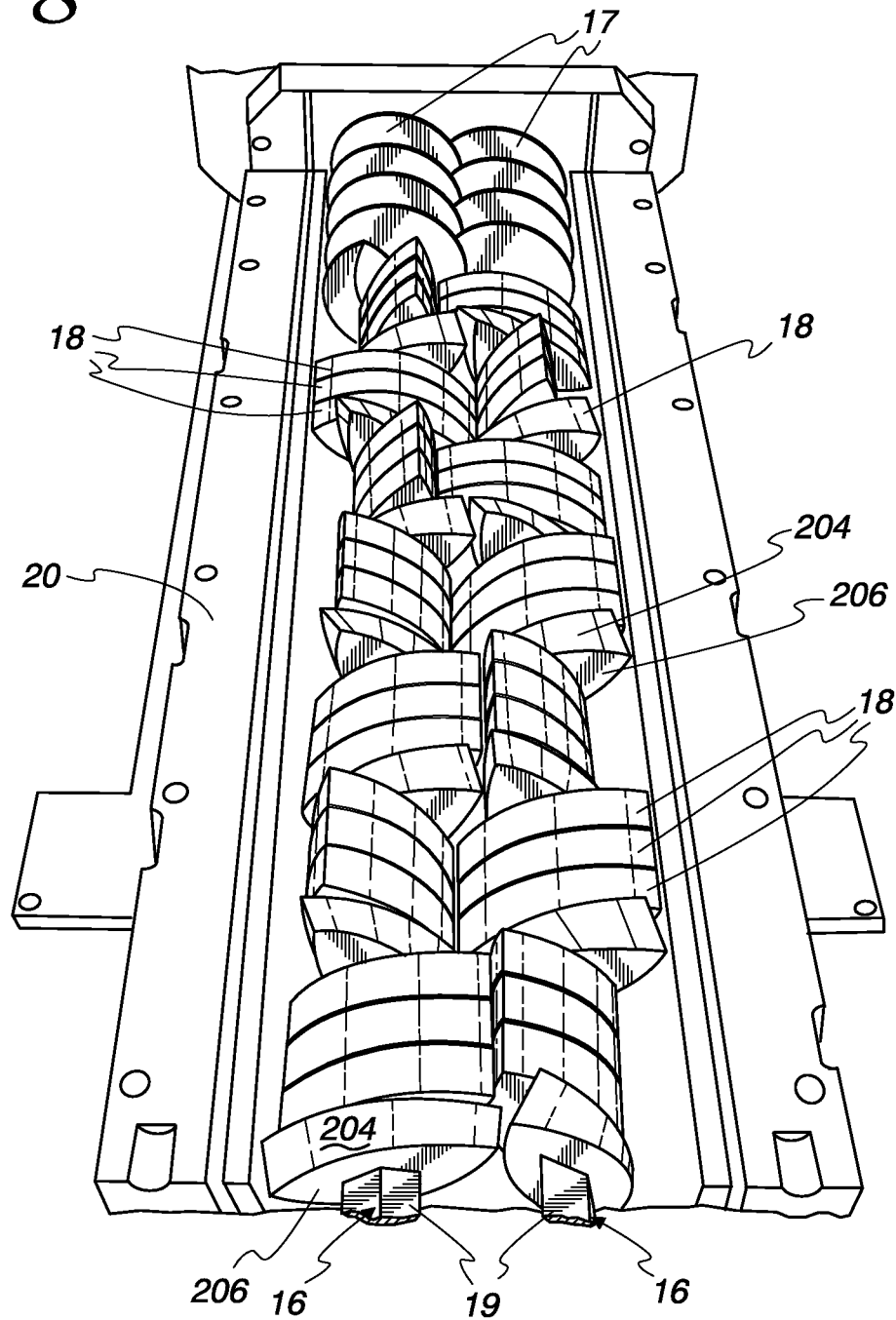
FIG. 2 comprises a perspective view of a mixing apparatus as configured in accordance with various embodiments of the invention.
Figure 8:
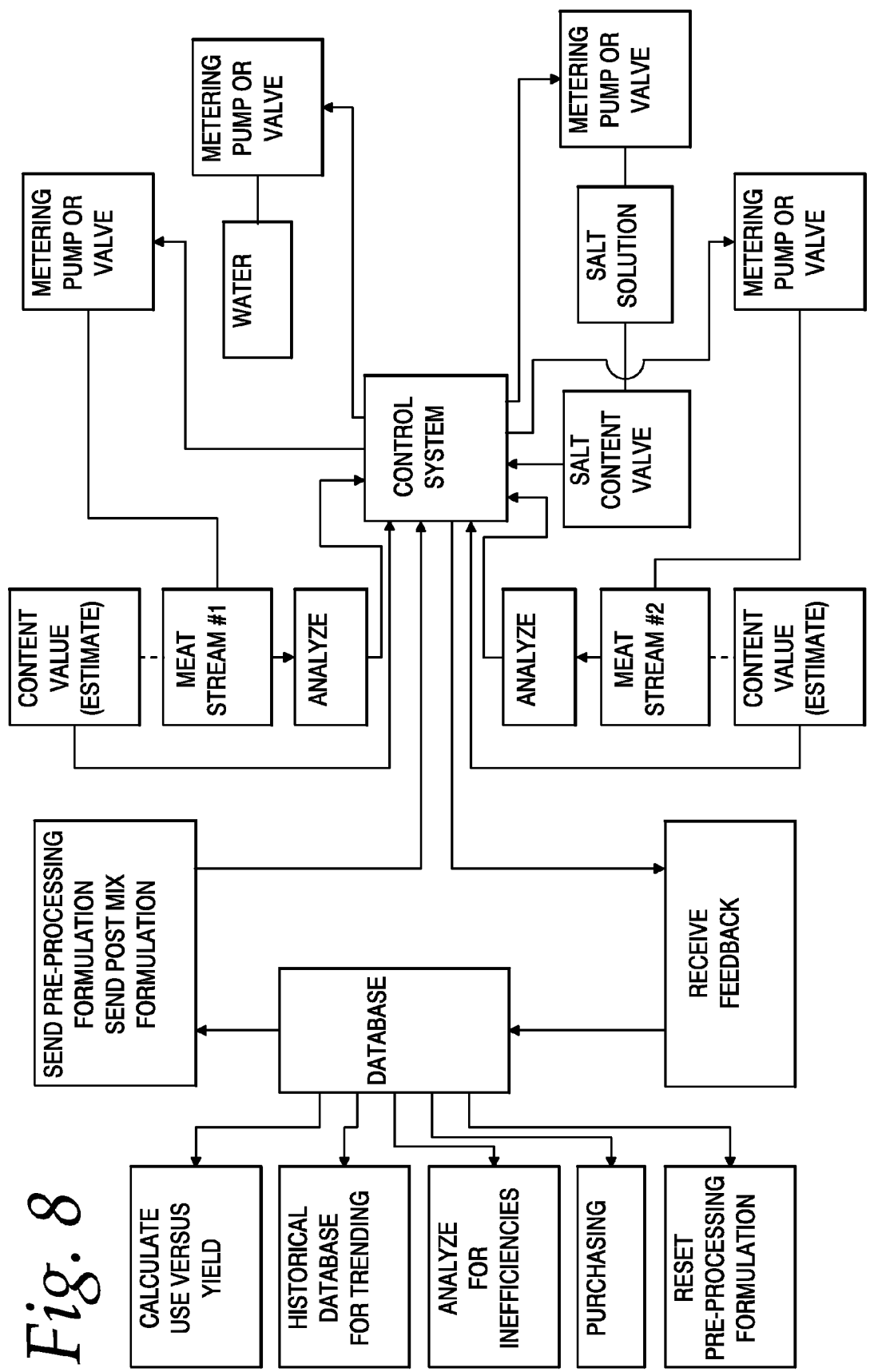
FIG. 8 comprises a flow diagram representing a process as configured in accordance with various embodiments of the invention.

While a single elongated screw as shown in FIG. 1 may be employed as a mixing device in some embodiments, other embodiments employ other types of mixing devices. The embodiment illustrated in FIG. 2 employs a twin shaft arrangement with a relatively short feed screw 17 used in combination with a longer array of mixing elements 18 on each shaft 19.

As the ingredients are forced through the housing 20, the rotating mixing elements 18, such as the sharp-edged ovate element of FIGS. 3 and 4, macerate and/or mix the ingredients. In this embodiment, the ingredients are subjected to high shear force by driving them between the mixing elements 18a, 18b, and between the mixing elements 18a, 18b and interior walls of the housing 20. The minimum gaps or clearances between the mixing elements 18a, 18b of one shaft 19 and the mixing elements of a second mixing device 16, as well as between the mixing elements 18a, 18b and the housing 20, are preferably between 0.06 in. and 0.12 in. In some embodiments, the gaps are 0.08 in. As the shafts rotate, the distance between mixing elements 18a, 18b on respective shafts will vary so that, for instance, whole muscle portions may be forced through without being chopped or ground. Forcing the mixture through these gaps applies high shear force and results in rapid protein extraction.

The meat, water, salt solution and other additives such as a spice slurry are simultaneously fed into the mixing device. Protein extraction herein involves an intimate contact between the salt solution and the salt-extractable proteins and breaking of the meat structure or rupturing of the membrane systems to separate protein strands, breaking the protein strands themselves, or unraveling of the proteins. In one embodiment, the mixing device applying the high shear force mechanically provides this intimate contact, as opposed to the diffusion utilized in typical batch processes.

One mechanism for this is simply by reducing the mass transfer or diffusion distance. By reducing the meat chunks to relatively small pieces, the salt solution needs to diffuse only over a short distance, if at all. In other words, the work applied to the meat in the presence of the salt or brine solution forces the salt solution into the structure of the meat pieces. This accelerates the process, thereby promoting the necessary chemical reactions wherein chloride ions or other ions occupy bonding sites of the protein strands.

Figure 9:
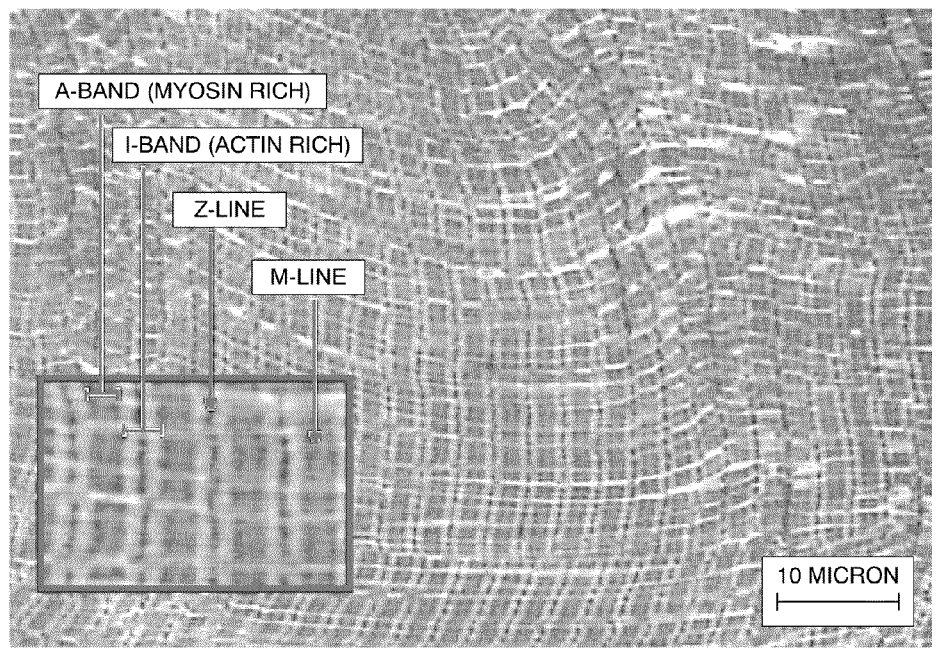
FIG. 9 comprises a magnified image of a piece of meat showing muscle protein striation.

Furthermore, to the degree that the protein strands remain intact, the process deforms the meat chunks, which promotes unraveling of the protein strands. FIG. 9 shows a representative unprocessed piece of meat under magnification. As can be seen, the meat shows a regular pattern of muscle protein striation, the high-density regions of protein being darker. The inset of FIG. 9 depicts a portion of the meat piece under greater magnification such that the high-protein regions can be seen distinctly separated by regions of low-protein density, or other material such as fat.

Figure 10:
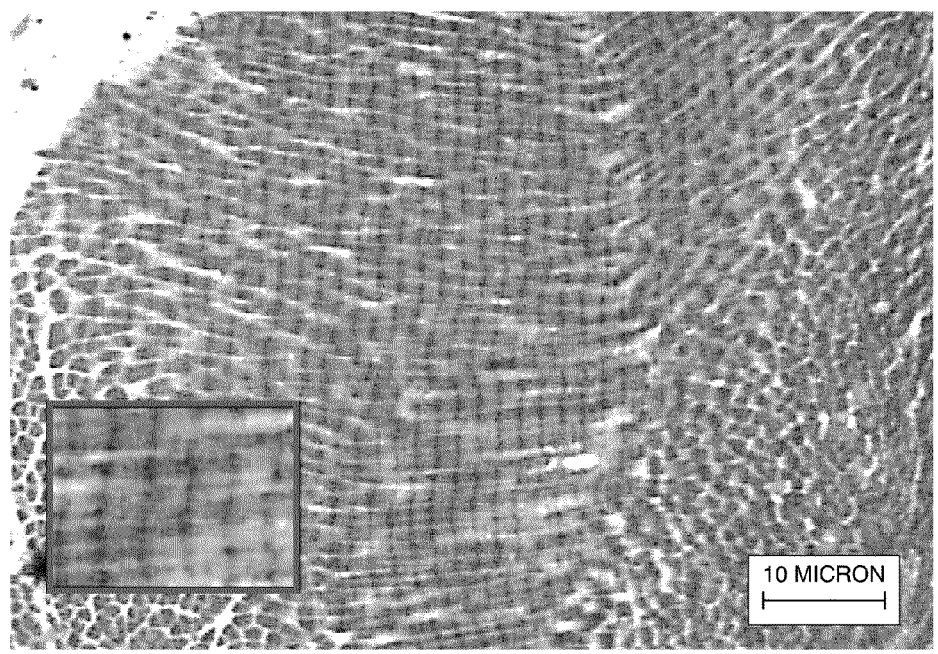
FIG. 10 comprises a magnified image of a piece of meat after a high shear processing step.

By applying shear force to a meat piece to deform or grind the meat, the protein strands are also deformed, flattened, stretched, and twisted. This opens up the protein structure, making them more porous, and promotes penetration of the ingredients, including the brine solution. As the dispersion is more thorough, uniform diffusion of the salt solution and other ingredients and additives, for instance, is significantly increased by use of the high shear force. Referring now to FIG. 10, a representative piece of meat that has been processed with an apparatus as described herein in the absence of other constituents or ingredients is shown. While still showing a regular pattern of striation, the meat piece has much smaller dark, high-protein-density regions, and much wider areas of lighter color. In addition, the striation pattern and the dark and light regions are less distinct, displaying a somewhat broken structure. In comparison with FIG. 9, it is clear that the application of shear force has opened up and made more porous the meat piece. Accordingly, the meat piece is more acceptable of or susceptible to diffusion of other ingredients thereinto.

This process causing rapid diffusion through the application of high shear force eliminates the need for curing, as has been described as the time for the salt solution to diffuse through the meat chunks. Because of the need for curing, typical processing methods are necessarily batch-oriented. That is, processing of certain meat products requires diffusion of salt solution into the meat for protein extraction to occur. After mixing or injection with salt solution, typical processes require a cure or diffusion time for the large meat chunks, during which time the meat is set aside to allow satisfactory diffusion. The curing stage required a significant backlog or meat inventory within the plant, which is eliminated to allow for just-in-time product usage and receipt, and reduced storage needs in the processing plant.

Figure 11:
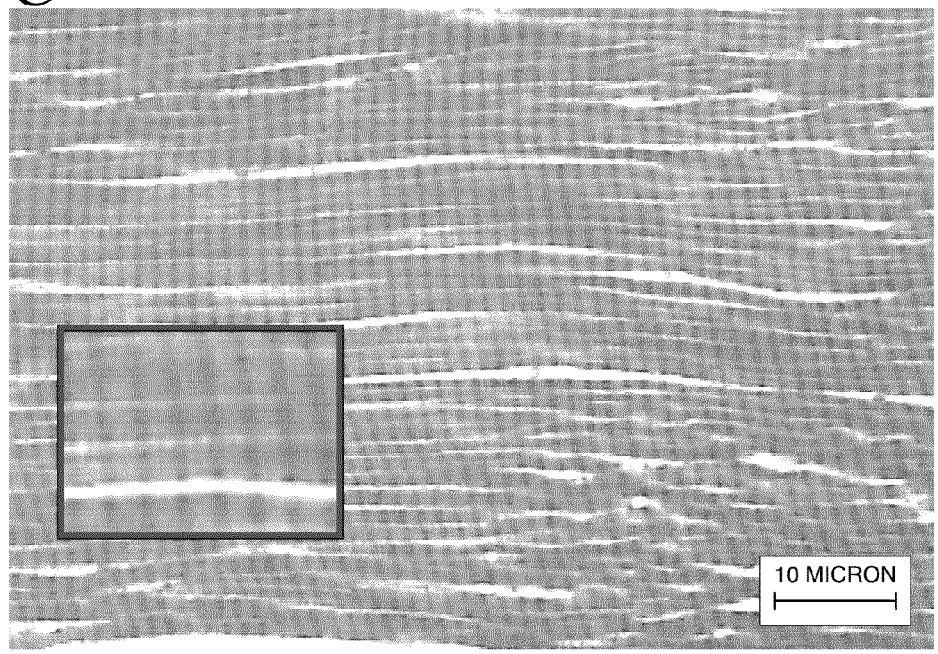
FIG. 11 comprises a magnified image of a piece of meat after a curing step in the presence of a salt solution FIG. 12 comprises a magnified image showing a piece of meat after the high shear processing step in the presence of salt solution.

A representative piece of meat that has undergone a static batch process curing period is shown in FIG. 11. The piece of meat was injected in conventional manner for batch processing with a solution of sodium chloride (NaCl) and allowed to cure for a sufficient period typical for the meat type. By comparing the meat piece of FIG. 11 to those of FIGS. 9 and 10, the cured piece of meat shows a striation pattern and colors similar to that of FIG. 10 wherein the dark regions are reduced in size from the unprocessed piece of meat of FIG. 9, and the light regions showing opened or unraveled protein with ingredients diffused thereinto.

Figure 12:
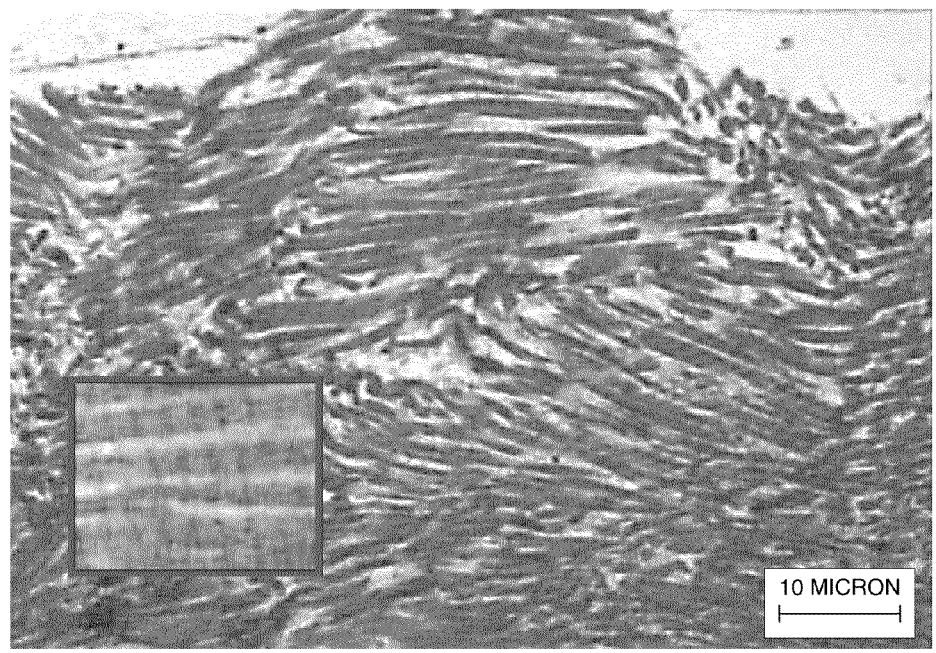

Through the application of high shear force in the presence of a salt solution, a meat piece displays a physical structure combining both the curing and the unraveling of the protein strands. FIG. 12 shows a meat piece is shown that has been processed with the apparatus in the presence of a sodium chloride solution. As can be seen, the patterns and colors are further distorted, indicating the unraveling and porosity of the protein strands, as well as the infusion and diffusion of the ingredients into and between the protein strands.

The apparatus 10 is capable of working meat ingredients and extracting protein therefrom much faster than prior art batch processes. Specifically, the processing time in one embodiment is reduced from a common 30-60 minutes to approximately 10-60 seconds and, preferably, 10-45 seconds. In general, this time period is related to the throughput rate. As discussed herein, the throughput rate is mostly dependent on the speed of pumps forcing the constituents or ingredients into the mixer.

Additionally, the mixing apparatus need not be used in conjunction with a vacuum environment. Though vacuum may be applied to the mixer, cooked final product made with constituents processed without an applied vacuum on the mixer does not display the visible air characteristics described above for meat that has been churned in a typical mixing vat, nor does it expand when cooked due to entrapped air. By one approach, during use, the interior of the mixer is generally filled with solid and liquid constituents, and is substantially devoid of air. Little or no air is forced into the constituents. Little or no air that may be present in the mixer is mixed in with the constituents because the mixture is not whipped, and because the mixing time is short. By eliminating the vacuum system for the mixer, the process may be simplified, equipment is eliminated with a concomitant cost savings, maintenance costs may be reduced, and product loss may be reduced. It should be noted that other processing steps, such as casing stuffing, may advantageously utilize a vacuum system.

Through the effective use of high shear force applied over a small area or volume of meat, a stable protein matrix is produced. Protein extraction is rapid and easily controlled, and the protein binds the mixed water and fat molecules. The protein is then able to bind with the water and fat to form a protein/water/fat matrix. The other additives may be bound, in suspension, or dissolved therein. This effectively reduces fat and water loss to either an irrelevant level or at least to an acceptable level. Thus, the mixing device and other apparatus do not suffer from fat being left in the equipment. The composition of the final product is more easily controlled without significant fat or water being lost. The texture of the final product is desirable. Testing methods, such as the Ronge Method utilizing a centrifuge to measure quantities of fat escaping from the mixture, will show that the stability of a mixture made by this method is equal to or exceeds the stability of conventional batch processed mixtures.

This system also controls protein matrix formation in emulsified products referred to as fat-free products having 1% or less fat, an example being bologna. These products are typically a meat/additive blend with water. In typical formulation, the blend lacks the fat which otherwise tends to break up the protein matrix. Proteins are able to form strong gel-like structures with long, cross-linked protein strands forming a large matrix, as has been mentioned. This results in a rubbery texture that is undesirable to consumers who expect a texture similar to that of full fat meat products.

Typically, this protein matrix problem in the fat-free products is dealt with by addition or selection of ingredients, though so-called fillers are generally not permitted. One method for breaking up the matrix formation is to add inert additives such as starch or non-functional proteins for instance. Though water binds with the protein to retard matrix formation, excessive water results in a soft product that does not hold together well, and that may allow excessive amounts of water to leech out. Furthermore, water may be driven off during the cook and post-cook stages.

Fat-free products, it is believed, suffer from this problem largely because of the mixing times of conventional batch processes. It is believed that batch processing requires such extensive mixing times that protein linking is able to occur, and the matrix structures begin to form during this time. Analysis of final cooked product using the present method and apparatus has demonstrated that there is a marked disruption in the matrix structure. It is further believed that the high shear of the present method and apparatus prevents or interferes with the ability of the proteins to link as such, and/or the stark reduction in mixing time of the present method and apparatus reduces or eliminates the ability for the proteins to form these long matrix links. In any event, bologna and other so-called no-fat or fat-free products produced using this method do not require any inert additives to reduce or avoid the large matrix formation while still producing a product with the desired texture characteristics of a full fat meat product.

For whole muscle and coarse ground products, another benefit of the present apparatus and method is the elimination of the commonly-known visible protein exudate that forms on the surface of the meats. More specifically, in certain batch processors, a combination of protein, salt solution, and water forms protein exudate, a sticky and viscous material, as the meats sit in the curing vat for the batch processing. This must be broken up prior to further processing steps, such as delivering through pumps. Because the present system utilizes continuous processing, this exudate does not have the opportunity to form.

It is believed that the protein exudate results from lengthy mixing time periods. That is, as a time period must elapse for the entirety of the constituents to have sufficient protein extraction, some portions of the constituents will allow excess protein to be extracted. By reducing and controlling the amount of protein extraction throughout the constituents, the exudate is reduced or eliminated. As the mixture discharged from the mixer is delivered relatively quickly to further processing, such as casing stuffing or thermal processing, the mixture does not continue to cure and extract additional proteins. In other words, the residence time within the mixer is less than is required for the formation of a visible protein exudate to form, and the protein extraction substantially ceases once discharged from the mixer. Though it has been suggested that the exudate is actually responsible for bonding of the meat product, elimination of the exudate has shown no deleterious effect on the final product created as described herein.

In some cases, it may be desirable to control the temperature of the mixer housing. For instance, it is believed that cooling the mixer housing is beneficial in forming coarse ground items. It is also believed that the internal temperature of the mixture during the mixing process optimally remains below a threshold level, or a maximum rise in internal temperature during processing. As it has been found that increased shear work in the mixer improves mixture stability, reducing the temperature of the mixture by cooling the mixer housing or inputting ingredients (such as cool water) at points along the length of the mixer may allow the residence time to increase, or allow the RPMs of the mixing elements to increase. More specifically, cooling the mixture may allow increased shear work while maintaining the temperature of the mixture below the threshold level.

It should be noted that varying the size of the outlet, in the form of a discharge gate opening, necessarily affects residence time for the mixture within the mixer. The opening may be in the range of ⅛ inch to two inches.

One example of a commercially available mixer such as that described is a Twin Shaft Continuous Processor manufactured by Readco Manufacturing, Inc., of York, Pa., having 5" diameter mixing elements 18a on counterrotating shafts 19, and throughput of about 6,000 lbs./hr. at about 200 rpm. In operation, the shafts may have adjustable speeds. Satisfactory operation of the system may be achieved with rotational velocities of, e.g., 100-600 RPM. For the present system, the rate of rotation determines the amount of work, including shearing, applied to the mixture. To drive the mixture through, the mixing elements 18 and/or the system pumps for inputting the constituents may be used. It should be noted that any pumping force is not what would be termed "high pressure" such that the structural integrity of the pumps, pipes, and other components are generally not in danger of failure. The pressure does not force the fat to separate from the mixture. In other embodiments, larger or smaller mixers may be used, e.g., 8 in. diameter mixers having throughput of at least 20,000 lbs/hr, and up to about 25,000 lbs./hr. The output may vary depending on the downstream processes, such as casing or form stuffing or cooking. Typically, the thermal processes of cooking or chilling determine the actual mixing device output rate than can be handled downstream.

As shown in FIGS. 2-5, each of the illustrated mixing elements 18 has a bore 200 through which a shaft may pass. To couple each mixing element to the shaft for rotation therewith, each mixing element has a noncircular bore therethrough and the shaft has a cross section of the same shape. In the illustrated embodiment, each mixing element has a generally square bore, and the shaft accordingly has a square cross section. More specifically, mixing element 18a (FIG. 3) has a square hole where two corners of the square are aligned with the points of the mixing element 18a itself. In contrast, mixing element 18b (FIG. 4) has a square hole where two sides are aligned with the mixing element points. The mixing element 18a is referred to as a "diamond" mixing element, while the mixing element 18b is referred to as a "square" mixing element. Thus, the bore in one mixing element may be rotated 45 degrees from a second mixing element that is otherwise identical.

Figures 20, 21:
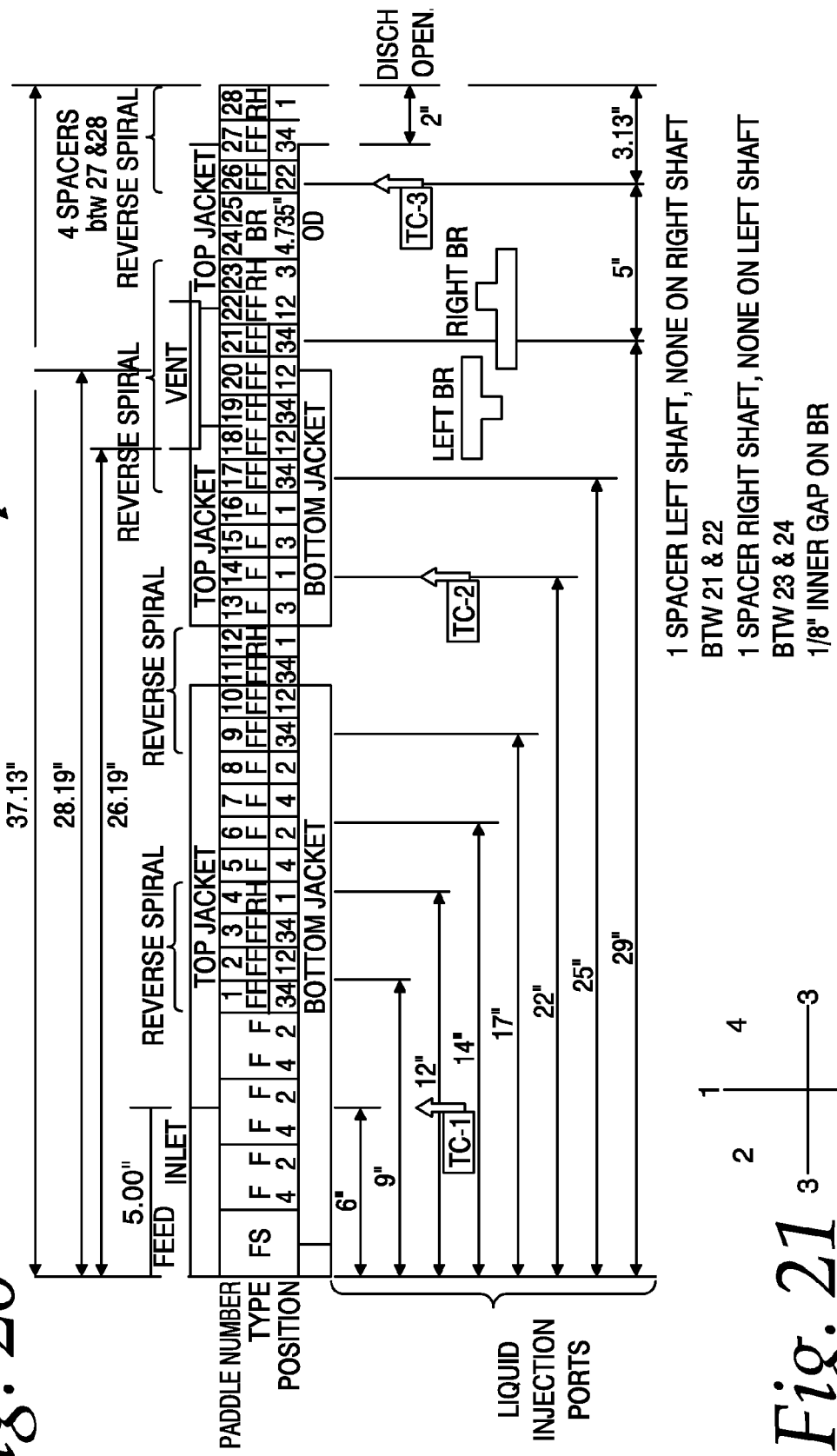
FIG. 21 comprises a geographical coordinate representation showing orientations of components within the apparatus.

As can be seen in FIG. 21, the mixing elements 18 can thus be oriented around the shaft with essentially four different initial positions or orientations when viewed from the output end of the mixer. A first orientation aligns the points of the mixing element through the vertically aligned positions labeled as "1." A second orientation aligns the points with the positions labeled "2," 45 degrees counter-clockwise from the first orientation, while the forth orientation aligns the points with the positions labeled "4," 45 degrees clockwise from the first orientation. The third orientation aligns the points through generally horizontal positions labeled as "3." However, it should be noted that the initial positions of the elements on the shaft may vary infinitely as desired around the axis of the shaft.

As described, the mixing elements may be placed in different rotational orientations and different orders, i.e., configurations to vary shear rate, throughput rate, and/or other process parameters. The mixing elements may also be interchanged with mixing elements of different configurations as discussed in more detail below. In other embodiments, to facilitate cleaning and sterilization of the apparatus, the mixing elements may be formed integrally with the shaft as a one-piece, unitary rotor, or may be otherwise supported for rotation therewith.

In one illustrated embodiments, mixing element 18a (FIG. 3) and mixing element 18b (FIG. 4) have a generally sharp-edged ovate profile shaped similar to that of an American football, with a point or very small radius of curvature at each end. The illustrated mixing elements 18a, 18b have flat, parallel faces 206 and arcuate peripheral edge surfaces 204. As illustrated in FIG. 3, the mixing elements 18a have the edge surface 204 perpendicular to the faces. For the mixing elements 18b, sometimes referred to as a helical element, illustrated in FIG. 4, the edge surface 204 is angled relative to the faces. The faces of element 18b are angularly offset slightly relative to each other, so that rotation of the mixing elements provides a forward or reverse motion in pumping the mixture through the housing 20. One or more of the mixing elements 18b may be provided to assist the screws 17 in pumping the mixture forward through the housing. Alternatively, one or more of the mixing elements 18b may be reversed so as to urge the mixture rearward. This may create regions of increased flow resistance or reverse flow so that the dwell or mix time for the mixture or for particular portions of the mixture is increased, and the work imparted by the mixing device is increased. Another mixing element 18c is illustrated in FIG. 5. This mixing element 18c has a generally circular or disc-like shape. The mixing elements 18a and 18b may have a width of ½ inch to 1 inch, and the mixing element 18c may have a width of 1 to 2 inches. Spacers may also be placed between each element. Additional mixing elements 18 are discussed further below.

On each shaft 19, each of the mixing elements 18 has a wiping action relative to one or more mixing elements on the opposite shaft to avoid build up of ingredients on the mixing elements by one approach. This self-cleaning characteristic helps to maintain flow of the ingredients through the mixer, and helps in maintaining good distribution of the ingredients. Shaft 19 is preferably a one piece unitary item that may be removed from the housing 20.

A modified screw element 30 that may be used in conjunction with or instead of one or both of the screw elements 17 and mixing elements 18 is shown in FIG. 6. The screw element 30 has a helical outer edge 34 disposed at a predetermined radius from the axis of the screw, and spaced from the interior of the housing by a narrow gap of, e.g., about 0.08 in. On the face 32 of the screw are provided a plurality of sharp-edged protrusions or blocks 40 for puncturing whole muscle meat components of the mixture to facilitate protein extraction. Each of the illustrated protrusions 40 has five exposed faces. Each of the illustrated protrusions comprises two pair of generally parallel quadrilateral side faces 41 and a quadrilateral end face 43. The end faces are rectangular, and in particular, square, and are perpendicular to the side faces. The end faces and side faces are substantially planar.

The arrangement of the mixing elements may be constructed in different manners for different amounts of dwell time, as well as for different amounts and types of work to be applied. For instance, an initial section may be spiral fluted or screw elements which may also be used for pumping through the housing and which may be used for initial size reduction of the incoming meat chunks. As the mixture passes through the mixing elements 18, a first group of mixing elements may be arranged to provide a first level of shear force application that is primarily for mixing or for allowing the described reactions to occur between the protein and salt solution, as examples. Then, the mixture may pass through a second group of mixing elements imparting a second, higher level of shear force application for the purposes described herein. There may be a further grouping for applying a shear force lower than the second level for additional mixing, followed by a final group of mixing elements for final high shear application, such as for final size reduction or comminution.

The utilization of the mixing device in this manner allows for continuous processing, as the mixture forms a stable mixture that is output at one end as new material to be processed enters at the input. Pre-input hoppers including one or more grinders may be used for feeding the meat input lines and for some amount of meat chunk size reduction to facilitate the pumping of the meat into the mixing device. In this manner, meats and other constituents may be simultaneously fed into a continuous processor so that size reduction, mixing, grinding, protein extraction, and/or emulsification may all occur continuously and in a single piece of equipment. Thus, the amount of equipment is reduced, the floor space required for that equipment is reduced, sanitation is simplified for the equipment, and the opportunity for contamination of the mixture is reduced.

The configuration of the rotating mixing elements such as the mixing elements may be adjusted depending on the type of product being mixed or being produced. For instance, finely chopped products resulting in a smooth and fine batter, such as bologna, may be produced. More coarsely chopped products such as salami may also be produced. In addition, whole muscle products such as turkey or ham may be processed as discussed below.

Figure 15:
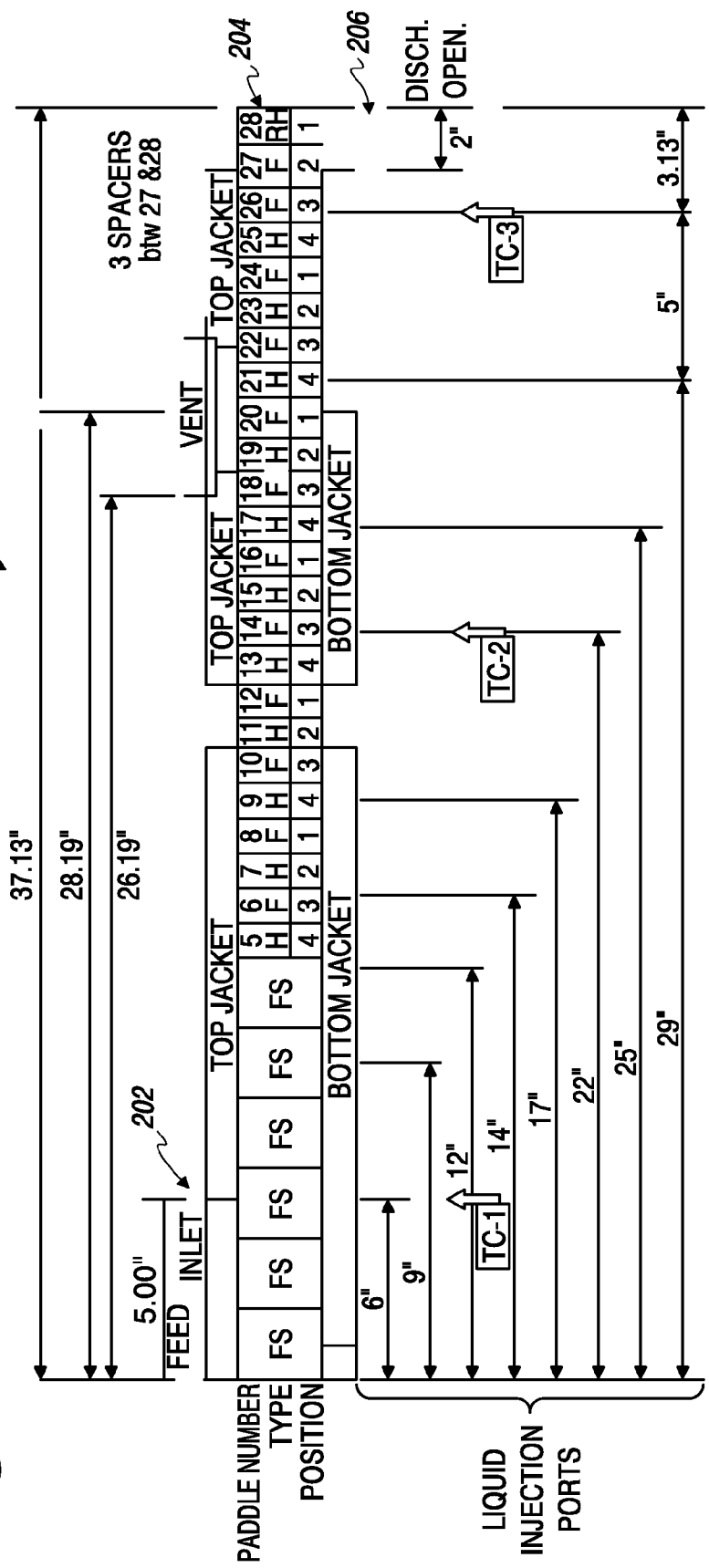
FIG. 15 to 20 comprise schematic representations of the configurations of FIG. 13.

FIGS. 15-20 show a series of configurations for arranged elements on shafts within the mixer housing 20. In FIG. 15, a mixer 200 is depicted having infeed screws FS arranged at an input end 202 of the mixer 200 and providing a mixing zone. Along a first shaft two series of mixing elements F, discussed earlier as flat mixing elements 18a, and mixing elements H, discussed earlier as helical mixing elements 18b, are arranged for providing a shear application zone. A second shaft (not shown) would be positioned parallel to the first shaft and carry screws FS and mixing elements H, F, the selection of which corresponds to those on the first shaft. As depicted, the mixing elements H and F are provided a first number 5-28 to indicate their position in the series, and the orientation of each mixing element H, F is designated by a second number corresponding to relative positions shown in FIG. 21. As shown, liquid injection ports may be provided along the length of the mixer for providing liquid streams therein. As discussed above, the infeed screws FS are primarily low-shear elements for forcing the constituents through the mixer 200, while the mixing elements H, F are high-shear elements for applying work to constituents within the mixer 200. In this configuration, each shaft has six feed screws FS, eleven helical mixing elements H, and twelve flat mixing elements F. A reverse helical mixing element RH is provided proximate the outlet to force the mixture away from an outlet wall 204 proximate a mixer outlet 206.

Figure 16:
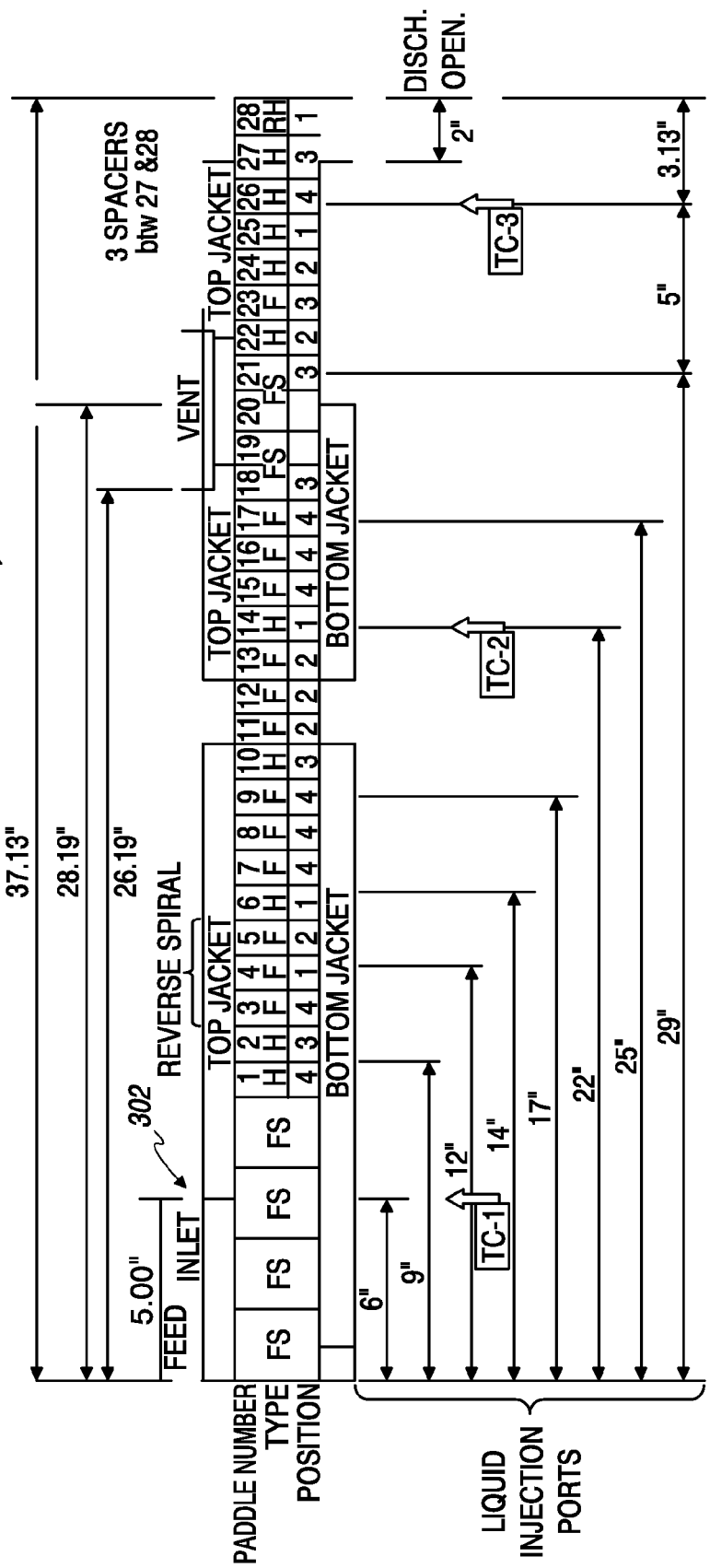

FIG. 16 shows a mixer 300 similar to that of the mixer 200. However, the mixer 300 shows a second series of screws FS downstream from a series of screws FS at an input end 302. In this manner, the mixer 300 provides two mixing zones corresponding to the screws FS, and provides two shear application zones. In addition, this configuration provides each shaft with six feed screws FS, ten helical mixing elements H, and thirteen flat mixing elements F. The helical mixing elements H promote the movement of the mixture through the mixer 300, as discussed above. By reducing the number of helical mixing elements H in the mixer 300 in comparison to the number in the mixer 200, the shear force applied in the configuration of mixer 300 is higher.

Figure 17:
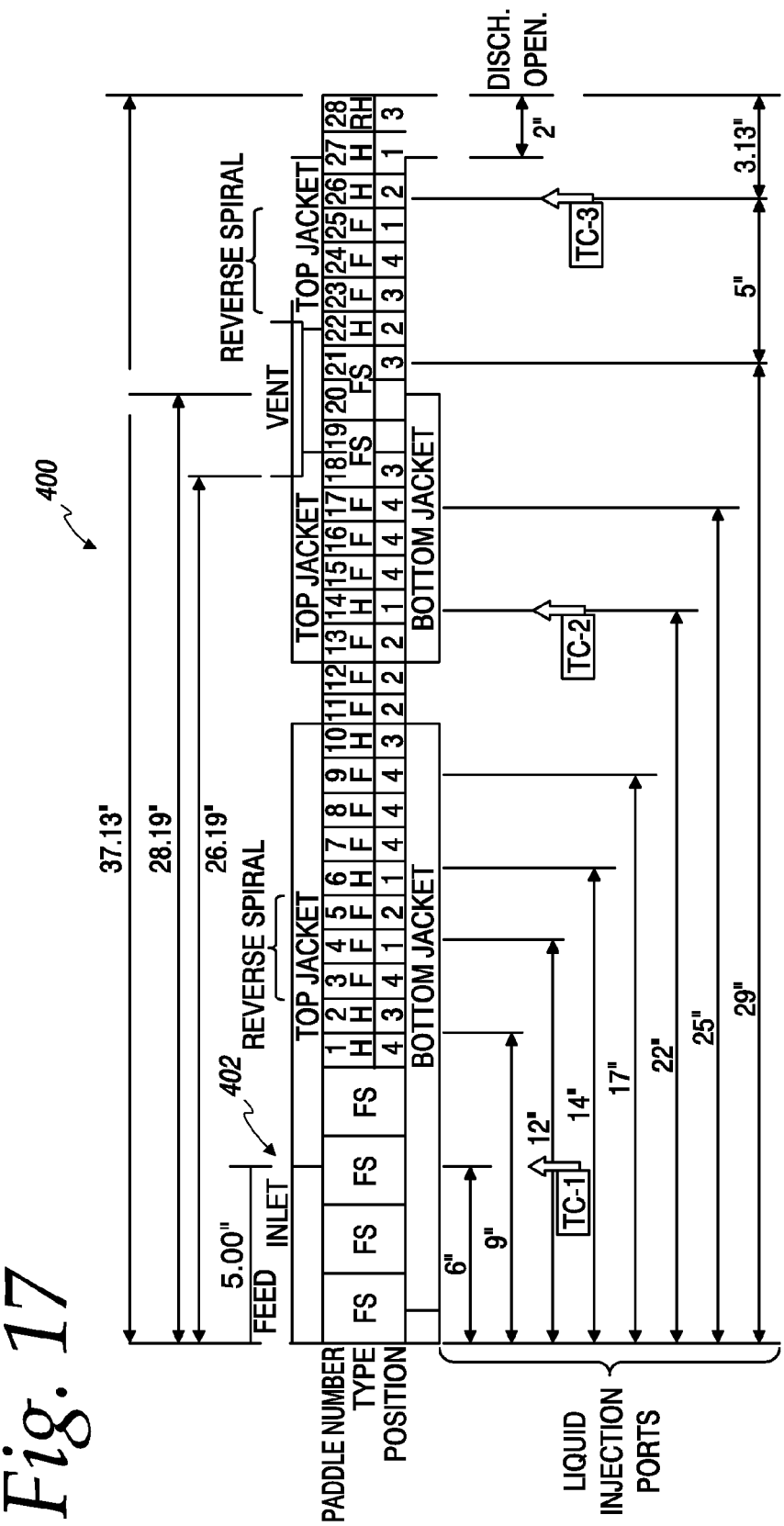

FIG. 17 shows a mixer 400 having two mixing zones, provided by the feed screws FS, and two shear application zones. The mixer 400 includes eight helical mixing elements H, and fifteen flat mixing elements F. Again, with a reduction in the number of helical mixing elements H in comparison to the mixers 200 and 300, the shear force applied in this configuration is increased.

Figure 18:
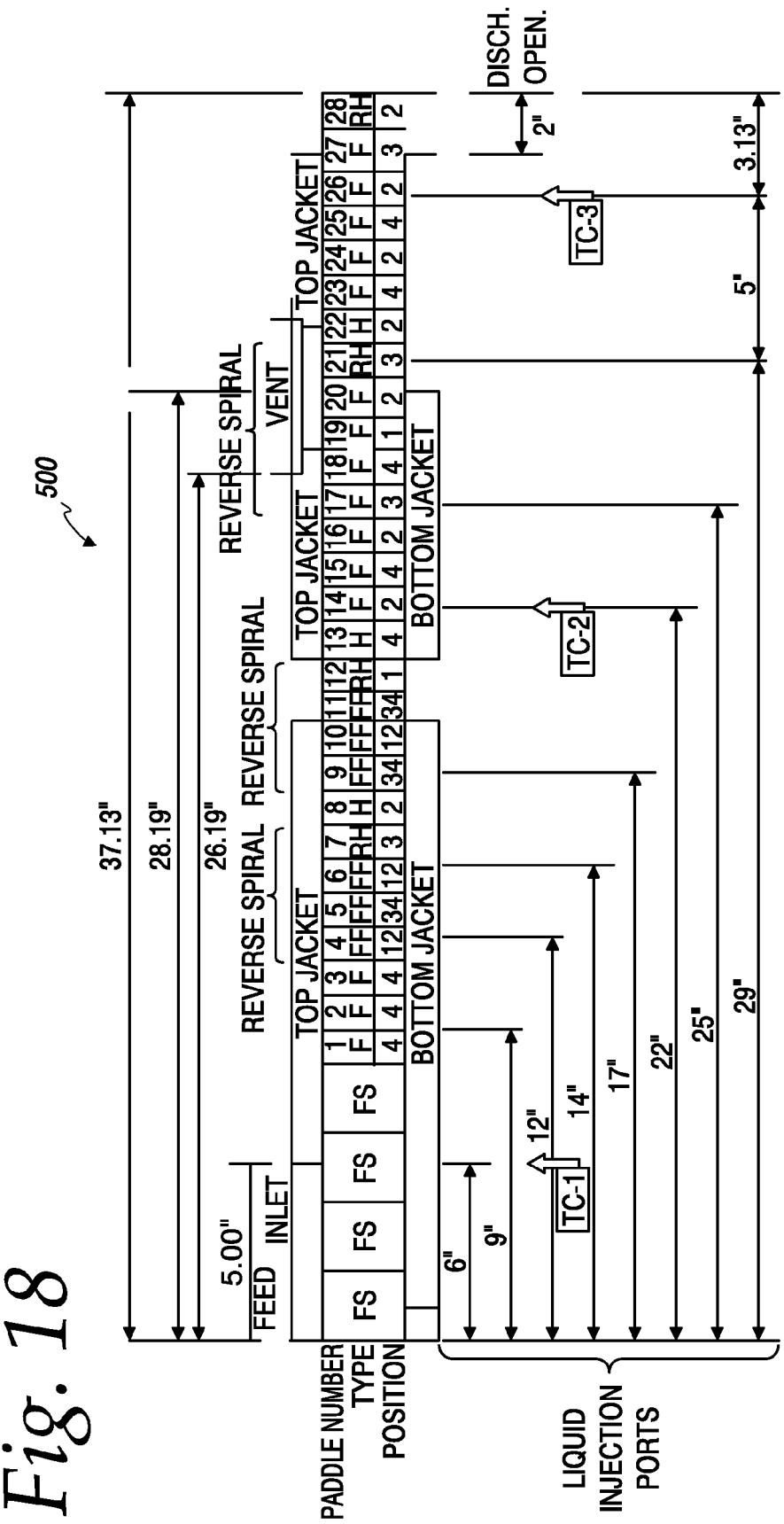

FIG. 18 shows a mixer 500 having a single mixing zone proximate the inlet 502, while the rest of the mixer applies shear force. In this configuration, elements numbered 4-6 and 9-11 are paired half-sized flat mixing elements F, where each of the pair is rotated 45 degrees from those mixing elements immediately adjacent thereto. This series allows more work, and thus more shear force, to be imparted to the mixture as it moves through such a region. Furthermore, three additional reverse helical mixing elements RH are provided. As the helical mixing elements H promote the mixture moving through the mixer, the reverse helical mixing elements RH retard this movement and provide a backward force to the mixture. This action alone increases the work applied in comparison to flat or helical mixing elements, but also increases residence time, thereby further increasing the applied work and shear force applied to the mixture. The number of feed screws FS is reduced to four, thereby allowing more high-shear elements to be placed on the shaft. This configuration utilizes only three helical mixing elements H, and 15 flat mixing elements F, in addition to the half-sized mixing elements and reverse helical mixing elements RH.

Figure 19:
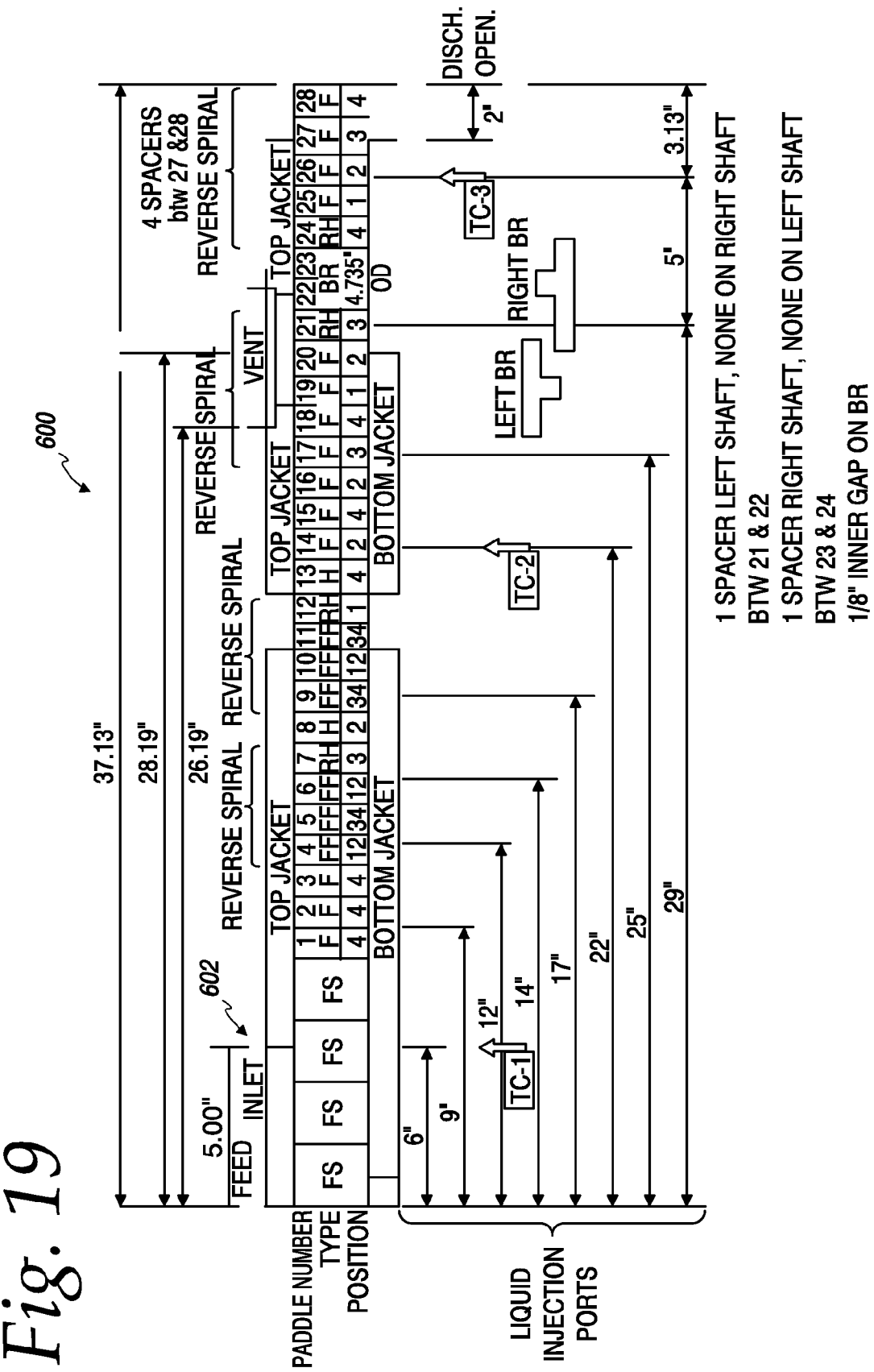

An even greater amount of shear force application is achieved with the configuration of FIG. 19. A mixer 600 is provided similar to that of the mixer 500. However, a blister ring BR is provided, discussed earlier as mixing element 18c. In order to accommodate the blister ring BR, there are only fourteen flat mixing elements F and two helical mixing elements H. The blister ring BR applies more shear than any of the helical, flat, or reverse helical mixing elements. To achieve this, the blister forces the mixture through an annular space and this annular space is a narrowed pathway through which the mixture passes.

FIG. 20 shows an even higher level of shear force application. For a mixer 700 depicted in FIG. 20, the helical mixing elements H have been removed, and a total of 4 reverse helical elements are provided. In comparison to each of the previous configurations depicted in FIGS. 15-19, the mixer 700 provides an even greater amount of shear force and work to the mixture.

Testing was performed to determine emulsion stability of various mixtures utilizing a product formula for beef franks. When the mixture leaves the mixer, whether batch processor or an apparatus as described herein, the mixture will be processed by other machinery and forces. Accordingly, the mixture must not lose stability during this downstream processing. As noted above, a stable emulsion is consider as being one that loses less than 2% of the final product due to fat cook-out during cooking. With reference to the table of FIG. 13, test results for a number of conditions corresponding to the configurations of FIGS. 15-20 are presented, and conditions 5 and 16 represent control batches made from a conventional batch mixing system. The testing was done such that mixture produced from each condition was placed in a separate piece of machinery that applied a shear force many times greater than the shear force of the apparatus as described herein. After every minute of the additional shear being applied, a sample was removed and cooked.

Figure 14:
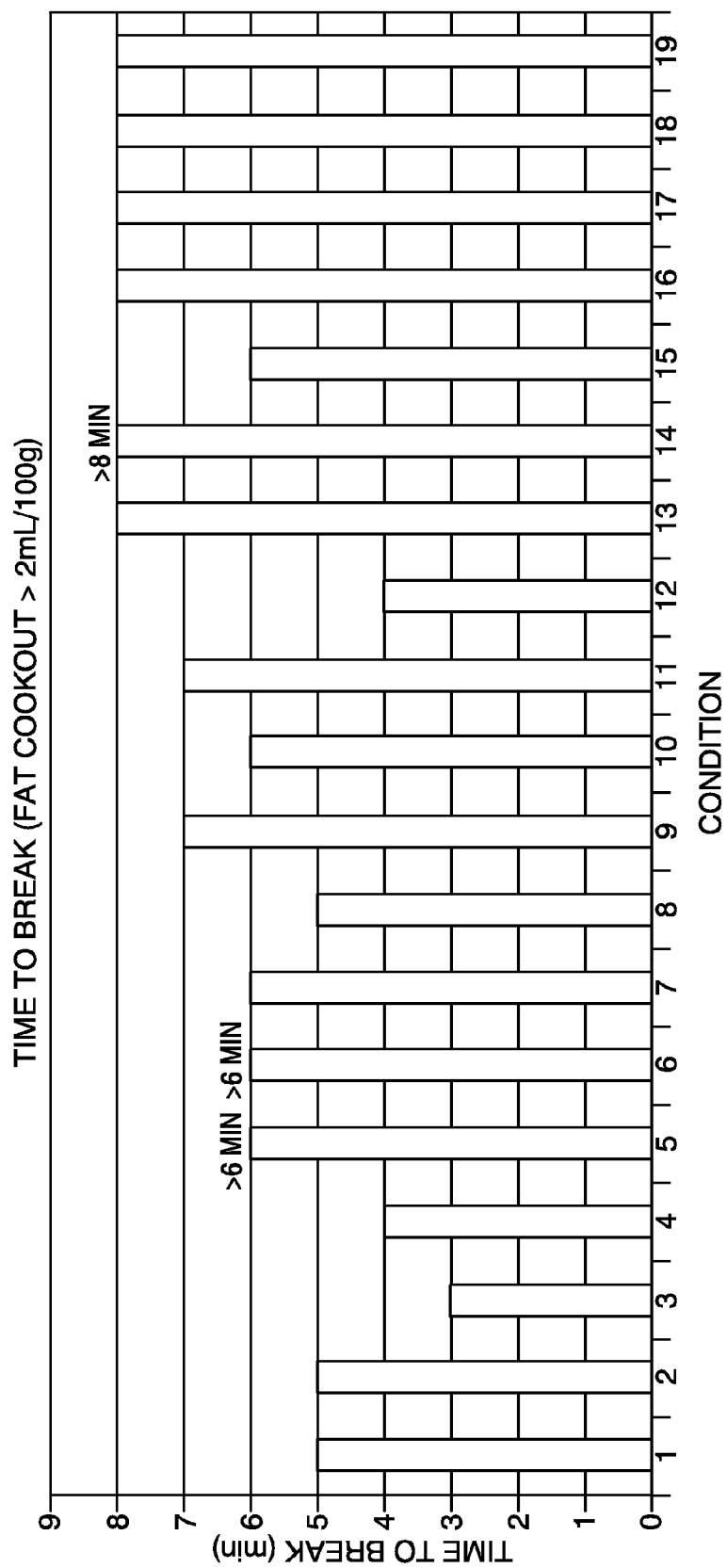
FIG. 14 comprises a graphical representation of a measure of emulsion stability for the configurations of FIG. 13.

It is generally considered that an emulsion is sufficiently stable if three minutes of additional shear do not result in the emulsion having cookout greater than 2% of the product, by weight, lost due to fat cook-out. The testing determined that the control mixtures withstood additional shear force for approximately 6-8 minutes before the additional work resulted in excessive fat and water cookout, and was unstable at greater time periods. As can be seen in FIG. 13, each of the other conditions resulted in a mixture that withstood at least three minutes of additional shear force application. For the mixers 500, 600 and 700, the emulsion stability was comparable or better than the emulsion stability of the batch processed mixture. The point at which the additional shear force application causes the emulsion to lose stability is referred to as Time to Break, and the results of this testing are presented graphically in FIG. 14 to show the Time to Break for each condition. It should also be noted that no significant differences were noted in the final appearance for the cooked product resulting from each condition.

The ingredients are preferably pumped through the input lines into the mixer, though an inlet hopper 62 may alternatively also be employed, as is shown in FIG. 1. As noted earlier, pre-input hoppers 68 may be provided as storage into which plant personnel load a quantity of materials. In addition, a grinder or pre-blending device 64 may be provided prior to or within the hopper 62 to provide an initial mixing, grinding, or blending action, and/or to assist in pumping the input streams downward through the hopper.

Ingredients are supplied as input streams by a plurality of input assemblies 66. The input streams may include a first stream comprising predominantly lean meat or muscle content, a second stream comprising predominantly fat content, a third stream comprising one or more salt solutions such as sodium chloride dissolved in water as well as any spices or flavorings, a fourth stream comprising an aqueous nitrite solution, and a fifth stream consisting essentially of water. Additional ingredients including flavorings such as spices, preservatives, and/or other ingredients may be introduced in additional streams, or may be incorporated in one of the five streams described above. Some meat products may utilize more than two meats, and in some of these instances the system may include additional input assemblies. In other cases, some meat products require small amounts (relative to the overall mixture, such as in the range of 2-5%) of a plurality of particular meats, and these may be pre-mixed and delivered to the mixer with a single input for metering them in at the relatively low rate. Each input line may be provided with the hopper 68 or tank which may hold a pre-mixed quantity of its respective constituent. For instance, a relatively low rate of nitrite solution is used, so a single, pre-mixed quantity in a vat metered through an input line is sufficient for the continuous processing. A left-over-batter line may also be provided to return batter to the mixer for reworking.

In the embodiment of FIG. 1, each of the input assemblies 66 includes a feed line 80 for carrying an ingredient to the inlet hopper 62, a content analyzer 82 on the feed line, and a metering pump 84 or valve downstream from the analyzer on the feed line. In other embodiments, e.g., the embodiment of FIG. 7, content analyzers are employed on some but not all of the input assemblies.

As an ingredient stream passes through an associated content analyzer 82, the stream is analyzed to determine, for example, fat, moisture and/or protein content. In order to achieve balance between the various ingredients in the desired ratio, a control system receives input from a plurality of analyzers, and regulates the throughput rates of the metering pumps 84 so that the ingredients flow into the inlet hopper 62 in the desired ratio, as specified by the product formula.

Various methods may be used for analyzing the fat, moisture, and protein content. Known methods include use of microwave energy or infrared light. Commercially available in-line analyzers may be programmed to analyze characteristics of a wide variety of substances ranging from, e.g., petrochemicals to processed cheese. Examples of such analyzers include in-line analyzers GMS#44 and GMS#46 manufactured by Weiler and Company, Inc., of Whitewater, Wis., and the Process Quantifier manufactured by ESE Inc. of Marshfield, Wis. These analyzers typically must be calibrated for each individual application, either by the manufacturer or by the end user.

FIG. 7 illustrates a process embodying the invention comprising a control system 100 balancing flow rates of a plurality of input streams to maintain compositional parameters within desired ranges using a feed forward analysis. In the process of FIG. 7, there are two meat input streams 102 and 104. In other embodiments, the process may employ only one meat input stream, or three or more meat input streams.

The process preferably employs one or more additional input streams to supply moisture, flavor enhancers, preservatives, and/or other ingredients. In the process of FIG. 7, there are three non-meat input streams comprising a spice/water blend input stream 106, a water input stream 107, and an aqueous nitrite solution input stream 109. Other embodiments may employ more or fewer non-meat input streams.

To produce a mixture with desired moisture, protein and fat content levels, the control system 100 regulates the flow rates of the input streams by adjusting the speed of a pump or valve associated with each input stream. In the embodiment of FIG. 6, metering pumps 110 and 112 regulate flow rates of the meat blend input streams, and additional pumps or valves 114, 115 and 117 are employed to regulate the flow rates of the other input streams.

Adjustments are made using a feed-forward method whereby the pumps and valves provide the proper relative amounts of the input streams based on upstream analysis. To determine the need for adjustments to the various flow rates, the control system 100 utilizes the content analyzers 82 to determine the protein, fat and/or moisture content levels of ingredient input streams 102, 104 upstream of the metering pumps 110 and 112. In some embodiments, for each input stream element that is analyzed, analysis is completed before the element reaches the metering pump associated with the input stream so that the flow rate of the associated input stream may be adjusted as needed to maintain the desired compositional parameters of the combined output stream continuously within the target range. In other embodiments, analysis may take place after the element has passed through the metering pump, and flow rates may be adjusted as necessary to account for the delay. Thus, the percentages of protein, moisture and fat entering the mixer are preferably regulated so that adjustments to variations in input stream characteristics are made as the input streams flow into the hopper, rather than being made in response to characteristics of the mixture measured downstream from the mixer 10.

More specifically, the control system 100 initially receives a prescribed formulation for the meat product, such as from a database. The control system 100 then receives information regarding the composition (i.e., fat content, water content, etc.) of the meats passing through the analyzers. The control system solves a set of mass balance simultaneous equations to determine whether the materials passing through the analyzers are in the proper ratios for the final meat product. To the degree that the materials are outside of a short-time-period average balance, the control system 100 will adjust the speed of one or more pumps to hold the mass balance within a tolerable range. These equations may be the same equations that would otherwise be solved by plant personnel in order to adjust the input materials based on the batch sheet, discussed above. By providing the control system 100 with standard known parameters for a mixture that will produce the desired final meat product, the control system 100 can automatically, continuously, and dynamically adjust the mixture so that the output is consistent and properly balanced. As also noted previously, in typical batch systems, the only sampling that can be done is from the mixing vat, at which point it is difficult and tedious to adjust the balances. The control system 100 and mixing device allow for a composition controlled mixture to be consistently and uniformly produced, and the tighter composition control may result in increased product yields and improved product quality.

By one approach, the mixer 10 includes an output port 122 for discharging the mixture, and may include an outlet hopper 124 to receive the mixture and channel it to a delivery pump 126. If it is desired to maintain the process at subatmospheric pressure, one or more vacuum lines may be in communication with the apparatus in one or more points. FIG. 1 illustrates a vacuum line 120 in communication with the inlet hopper 62. In other embodiments, vacuum lines may be connected to other locations in addition to or instead of the inlet hopper. For example, vacuum lines may be connected to the outlet hopper, to points between the inlet and outlet hoppers, and to points downstream from the outlet hopper.

As the protein extraction is a function of time and shear force in the presence of a salt solution, the power drive 12 may be a variable speed motor so that the constituents are contained within the housing 20 for mixing for a time necessary to allow both salt solution infusion and shearing action.

In connection with sensing fat, moisture and protein content of meat components, it has been found that moisture content may correlate to fat and protein content. It is believed that the correlation may be sufficient to enable moisture content of meat components from a known source to be used as a predictor of fat and/or protein content with sufficient accuracy that fat and/or protein content may effectively be measured simply by measuring moisture content. Accordingly, in certain embodiments of the invention, the step of measuring fat and/or protein content may consist of measuring moisture content after having calibrated the moisture meter appropriately. The control system can then control fat and/or protein input based on the moisture content readings of one or more input streams.

In utilizing the system described herein, plant personnel may receive a batch sheet from a database for the formulation of a particular meat product. The plant personnel may then select appropriate meats for inputting into the system based on fat, protein, and/or water content. However, the precision with which they are selected need not be as accurate, to the degree that the vendor-provided ratings may generally be relied upon. Furthermore, the system allows the meat chunks to be delivered directly into the pre-input hopper 68 which may or may not perform initial size reduction, thus eliminating the need for the injection and curing stages and their accompanying vats. At this point, the control system 100 takes over the processing of the meat and other constituents. The control system 100 itself receives or pulls automatically the batch sheet from the database and calculates the necessary mass balance equations. As described, the control system 100 monitors and adjusts the system including the pumps and mixing device to produce a generally uniform composition stable protein matrix. The output stream of meat product mixture from the mixing device may first proceed to a surge hopper to take into account minor breakdowns in the system, and may then be easily and simply conveyed to further processing steps, such as casing or form stuffing and cooking/thermal processes. The surge hopper fills from the bottom to the top, so there is very little mixing or aeration issues as a result of its use. The control system analyzes the composition needs and what is present, and adjusts accordingly. Thus, human interaction is reduced to providing the constituents, such as by loading meat into the hoppers 68, and responding to alarms or alerts from the system providing notice that there is a problem such as a constituent running out. The result is a reduction in labor, more accurate and higher yields (less yield loss), greater food safety and reduced likelihood of contamination due to the substantially closed system and lack of transfer, reduced space requirements from the elimination of the vats and coolers, improved product uniformity, and reduced maintenance due to the elimination of vat and transfer traffic, as well as savings from the elimination of the vats themselves and the injection stages.

The communication between the control system 100 and the corporate database is directed in both directions. That is, the control system 100 may receive the batch sheet of base formula, formulation rules (such as maximum fat content), and finished batter targets directly, as well as provide feedback to the database regarding the actual materials used. As the database may have a dated or inaccurate formulation, the information from the control system 100 may be uploaded to correct the formulation. In addition, the control system may provide information detailing the actual compositional rating in comparison with the vendor specific rating which is generally a small sample estimate. This allows a historical view of a specific vendor and can trend changes in meats provided by specific vendors. This feedback can be used by the database to assess materials on-hand and purchasing requirements, as well as compare the yield results to materials usage. The data collection enabled by this system can trend various aspects of the operation to search for inefficiencies and spot for improvements therein. In prior systems, the database tends to have a static formulation, while the present control system allows for dynamic repositioning of that formulation. The control system thus responds to changing materials, compensates for unavailable materials, and provides feedback for re-setting the formulation at the database.

While one approach employs breaking down the meat chunks to increase diffusion of the salt solution into the meat, in certain meat products such as whole-meat products, overly aggressive processing that breaks the meat into many small meat portions may negatively affect the integrity. Thus, it is desirable to increase diffusion of the salt solution without excessively breaking down the structure of the meat.

Conventional batch processing of certain whole muscle meat products, such as ham, corned beef, or turkey, involves the injection of cure, brine, and ingredients followed by about 45 minutes of mixing, forty hours of curing, and then stuffing and cooking of the cured meat. As mentioned above, the apparatus and the continuous method disclosed may be adapted to accommodate the processing of whole muscle meat products. Moving to a continuous process that reduces process and curing time, without negatively affecting the integrity of the final product, is desirable. Balancing the rapidity of the process with the integrity of the meat product produced is important for continuous whole muscle meat processing. The process should facilitate efficient ingredient diffusion and incorporation while retaining the whole muscle characteristics of the meat.

The apparatus 10 for continuously processing meat products disclosed herein is a twin shaft arrangement with a relatively short feed screw 17 used in combination with an array of mixing elements 18 on each shaft 19. The mixing elements 18 that perform the mechanical mixing action may be interchangeable. The particular mixing elements 18 employed, including their arrangement along the shaft 19, are chosen for the processing of whole muscle products based on their ability to efficiently process the meat without unnecessarily reducing the size of the muscle pieces or significantly tearing or cutting the meat pieces, as such destructive actions negatively affect the appearance and texture of the whole muscle products. Further, appearance and texture are considered an important factor for consumer satisfaction. As shown in FIG. 1, the ingredients may be fed into the housing 20 by hopper 62. The hopper 62, as illustrated, may be located adjacent one end of the housing. In another illustrative embodiment, the hopper 62 may be located near the center of the length of the housing 20. By yet another approach, the ingredients may be fed directly into the mixer through input lines without employing a hopper. Additional apparatus shown in FIG. 1, such as the content analyzer 82 or the pre-input hoppers 68 may also be used in the continuous processing of the whole muscle meat; however, it is also contemplated that the whole-muscle meat be processed without such additional apparatus. Further, if on-line compositional assessment is employed in the processing of whole muscle meat, the control stream may include the protein content as opposed to, or, in addition to, water.

Turning now to FIGS. 22A through 28B, mixing elements 18*d*, 18*e*, and 18*f* are illustrated alone and in combination with other mixing elements 18. The array or configuration of the rotating mixing elements 18, as mentioned, may be adjusted depending on the type of product being processed. FIGS. 22A-D illustrate a mixing element 18*d* having a frustoconical shape. FIGS. 23A-C illustrate a blocking mixing element 18*e*. FIGS. 24A-D illustrate an ellipsoid-shaped mixing element 18*f*. The mixing elements 18*d*, 18*e*, and 18*f* are well-suited for processing of whole muscle meat products as described below. More particularly, whole muscle products processed as described herein show good water binding and cook yield, somewhat similar to results produced in conventional batch processing but in significantly less time. In sum, the processed whole muscle shows extensive structural disruption and changes consistent with conventional processing without significant damage to the meat integrity, in significantly less time.

Figure 22A:
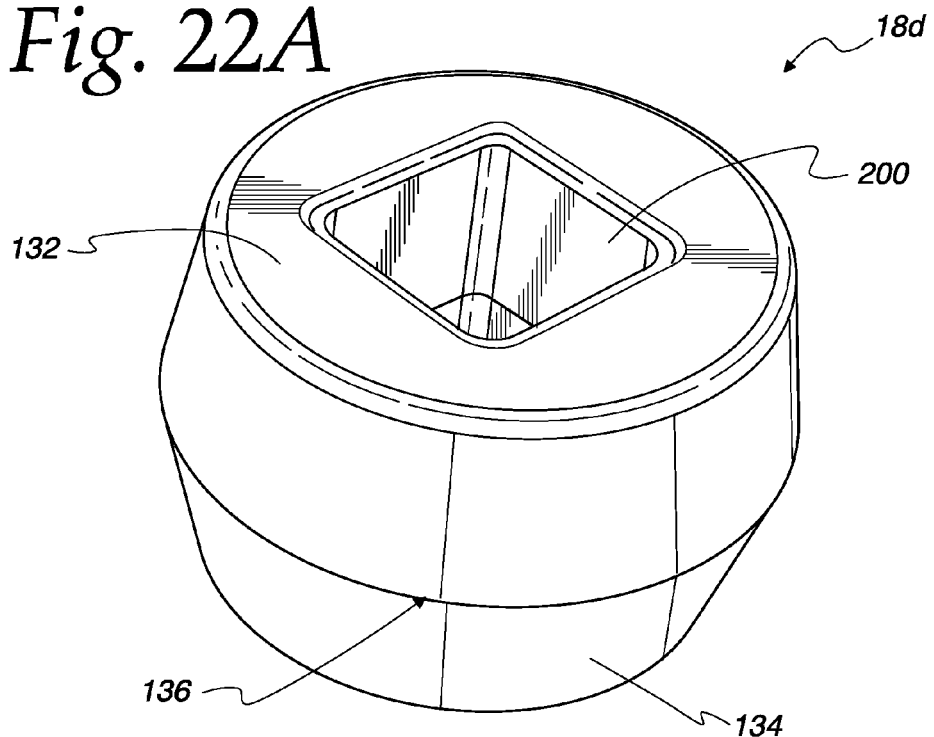
FIG. 22A to 22D comprise various views of an element of the mixing apparatus as configured in accordance with various embodiments of the invention.
Figure 22B:
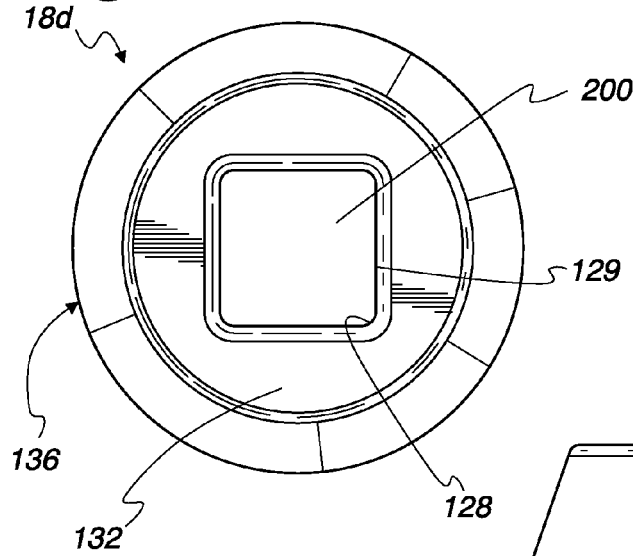
Figure 22C:
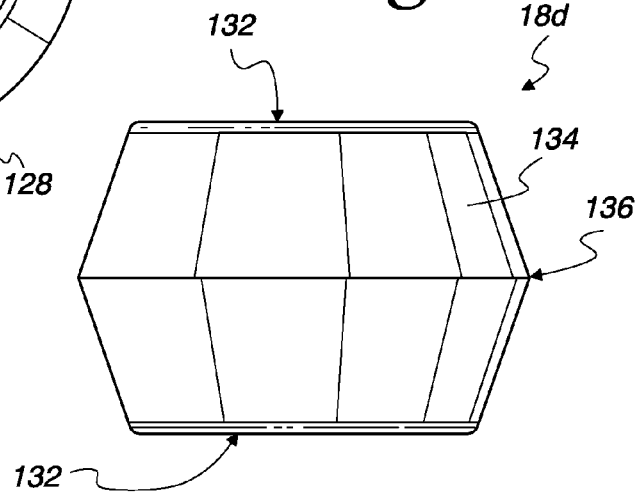
Figure 25A:
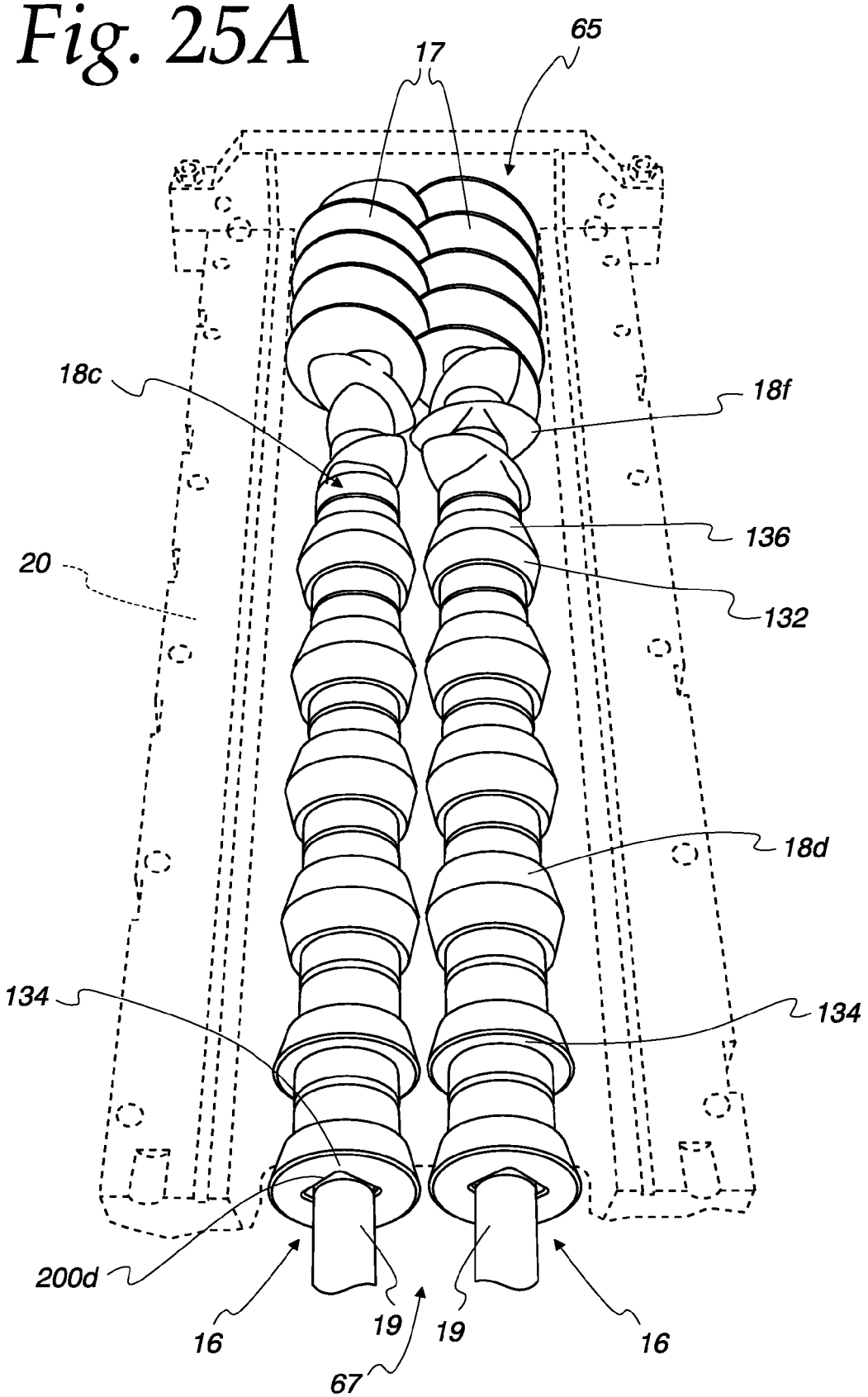
FIG. 25A comprises perspective view of a mixing apparatus as configured in accordance with various embodiments of the invention.

FIG. 25A illustrates a perspective view of a portion of the apparatus 10 with the top portion of the housing 20 removed. The parallel rotating shafts 19 have mixing elements 18 positioned thereon, including the frustoconical-shaped mixing element 18*d* and the ellipsoid-shaped elements 18*f*, which are discussed in detail below. The frustoconical mixing element 18*d* has a changing diameter or circumference about an axis parallel to the opening or bore 200*d*, which is similar to bore 200. As previously discussed, the bore 200 that extends through the mixing elements 18, including frustoconical element 18*d*, is non-circular. The shaft 19 also has a non-circular cross section such that once the element 18 is positioned on the shaft 19, the two parts are coupled together. The bore 200*d* is sized to fit the shaft 19. In the example of FIG. 22B, the bore 200*d* has a generally square shape with four straight sides 129 and corners 128 that are rounded. In another embodiment, the bore 200*d* has corners 128 that are beveled.

Figure 22D:
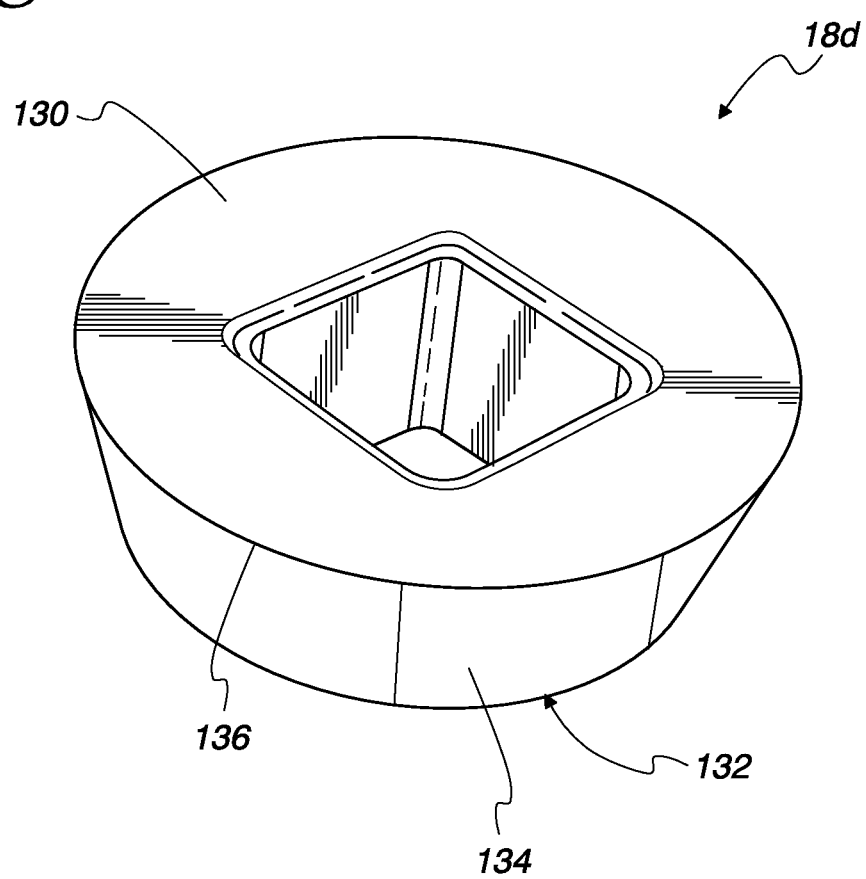

As shown in FIG. 22D, the single frustoconical element 18*d* has a larger diameter end face 130, a smaller diameter end face 132, and a side surface 134. The double frustoconical element 18*d*, shown in FIG. 22A, includes two frustoconical portions having the larger diameter end faces 130 abutting one another. The double frustoconical element 18*d* does not have an exposed larger diameter end face 130 but has two exposed smaller diameter end faces 132 and an outermost side edge 136, which is the widest section of the element 18*d*. By one approach, the double frustoconical elements 18*d* having expanding and contracting cross sections may be manufactured in a unitary configuration. Alternatively, each of the frustoconical mixing elements 18*d* may be individually manufactured with a smaller diameter end face 132, a larger diameter end face 134, and a side surface 134 that tapers in one direction such that the cross section either increases or decreases in size. These individual frustoconical mixing elements 18*d* may be combined together to create a double frustoconical mixing element 18*d*. To prevent unnecessary damage to the meat pieces, the frustoconical elements 18*d* do not have sharp shearing surfaces.

The frustoconical mixing element 18*d*, illustrated in FIGS. 22A to 22D, promotes efficient infusion of the salt solution and flavoring into the meat pieces in the continuous or inline meat processor as discussed above. The continuous meat processing saves significant time over the general batch processing. Using the frustoconical mixing element 18*d*, along with other mixing elements 18, permits quick processing of whole muscle meat in the continuous inline meat mixer. Various dimensions of the frustoconical mixing element 18*d* are discussed below with the prototype and configuration evaluation.

The shaft 19 typically includes a variety of mixing elements 18 as shown in FIGS. 25A-28B. At the input end 65 of the housing 20, which may be connected to the input hopper 64 and input lines or assemblies 66, the feed screw 17 or the modified screw element 30 is positioned to advance the ingredients in the housing 20. Opposite the input end 65, the housing 20 has an output end 67. As the ingredients are advanced through the housing 20, the mixing elements 18 work the meat chunks to increase incorporation of the salt solution, spices, and other additives into the meat chunks. The mixing elements 18 have paddle positions, such as 1, 2, 3, or 4, denoted underneath the specified element in FIGS. 25B, 26B, 27B, and 28B. That paddle position denotes the rotation of the element, which corresponds to the rotational positions shown in FIG. 21. By one approach illustrated in FIG. 25A, downstream from the feed screw 17 the shafts 19 include a plurality of ellipsoid-shaped elements 18*f* (described below) to subject the meat to a massaging action and then a plurality of frustoconical mixing elements 18*d* to work the ingredients and the circular-shaped or spacer element 18*c* as illustrated in FIG. 22A. More particularly, in one example, the parallel shafts 19 have a circular-shaped element 18*c* located downstream from the ellipsoid-shaped elements 18*f* followed by a frustoconical mixing element 18*d* with the smaller diameter end face 132 facing upstream and the larger diameter end face 134 facing downstream. The larger diameter end face 134 then abuts a larger diameter end face 134 of another frustoconical mixing element 18*d*. Thus, the diameter of the elements increases and decreases, then remains steady at the circular-shaped element 18*c* and the pattern repeats as illustrated in FIG. 22A. As discussed in more detail below with respect to FIG. 30, the element configuration of FIG. 25A-B provides a moderate amount of ingredient incorporation while retaining the meat in large pieces. Such a configuration of mixing elements 18 may be desired for a number of whole meat products.

A configuration of mixing elements may be viewed as a group of functional, processing zones. By one approach, the shafts 19 have an ingredient advancement zone, as illustrated by the feed screws 17 in FIG. 25A. Downstream from the ingredient advancement zone, the configuration may include a massaging zone, as illustrated by the ellipsoid-shaped mixing elements 18*f* in FIG. 25A. A series of frustoconical mixing elements 18*d* and circular-shaped elements 18*c* may be mounted on the shafts to provide a working zone downstream from the massaging zone, as illustrated in FIG. 25A. The series of mixing elements 18 may include a repeating sequence such as a circular-shaped element 18*c*, a frustoconical mixing element 18*d* with increasing diameter, a frustoconical mixing element 18*d* with decreasing diameter, (the two frustoconical mixing elements could be replaced by a double frustoconical mixing element), and another circular-shaped mixing element 18*c*. By viewing the elements as comprising a series of processing zones, one may more easily and quickly alter the element configuration to account for differences in the type of meat being processed. For example, if the desired type of product requires a bit more ingredient incorporation and the meat can handle a short period of moderate to high shear force, one of the processing zones or a portion thereof may be changed to include a plurality of sharp-edged ovate profile elements 18*a*, 18*b*. In the illustration of FIG. 25A, the massaging zone could be exchanged for a zone having increased shear.

The parallel shafts 19 and the mixing elements 18 thereon work together cooperatively to process the whole muscle meat. In choosing the mixing element and its rotation in an array, the configuration on the other parallel shaft 19 is examined. More particularly, the mixing elements 18 on one of the parallel shafts typically impact and work together with the adjacent mixing element 18 positioned on the other parallel shaft. For example, the feed screws 17 positioned at the input end 65 of both parallel shafts 19 work together to move the ingredients forward. With the configuration illustrated in FIG. 25A, for the zone with the ellipsoid mixing elements 18*f*, the position of the ellipsoid-shaped elements 18*f* on one shaft 19 is rotational offset from the position of the adjacent ellipsoid-shaped elements 18*f* on the other shaft such that both elements 18*f* may rotate with the shafts 19 to which they are coupled without interfering with the adjacent element 18*f*. Thus, while the configuration is similar, the two parallel shafts 19 do not have the same configuration and are not mirrors of one another. In addition, the mixing elements 18, such as the repeating series of elements found in FIG. 26, may be mounted in a laterally offset arrangement from one another along the shafts 19 as discussed below with respect to FIGS. 26A-B. However, as illustrated in FIG. 25A, the series of frustoconcial mixing elements 18*d* are not offset, instead the mixing element configuration on one of the shafts 19 in the frustoconical mixing zone mirrors the other shaft 19 along that same section of the shaft 19. More particularly, as one shaft 19 has a frustoconical element 18*d* with an increasing diameter, the other shaft 19 also has a frustoconical element 18*d* with an increasing diameter. Thus, the two shafts 19 have the same configuration of mixing elements 18 along one section of the shafts 19. Returning to FIG. 22A, the series of similar adjacent frustoconcial mixing elements 18*d* and circular-shaped elements 18*c* continues along both shafts 19. The simultaneous increasing and decreasing of the mixing elements 18*d* increases and decreases the size of the pathway for the meat and ingredients to pass through. This creates a working action, such as by compression and expansion of the pathway, working the meat pieces and ingredients together to increase the ingredient incorporation. Alternatively, as shown in FIGS. 26A-26B, the mixing elements, or a portion thereof, may be mounted in a laterally offset arrangement such that the increasing and decreasing diameters of the mixing elements is not simultaneous and the size of the pathway 149 for the meat and ingredients is defined by the laterally offset arrangement.

By working the meat with frustoconical mixing elements 18*d* and circular-shaped elements 18*c* arranged in series, the meat processing produces muscle pieces with increased ingredient incorporation, distribution and equilibrium throughout the highly organized cellular structure of the whole muscle meat quickly. The ingredient incorporation into the meat may occur by disrupting or rupturing the membranes of the meat while not destroying the overall integrity of the meat or fully severing the connections within the meat. Thus, without employing high shear or creating a protein exudate, the meat mixer may quickly process whole muscle meat. Reducing the cut-points of the mixing elements 18 assists with prevention of over-working the meat product. The frustoconical elements 18*d* do not have significant, sharp jutting edges or "cut points" that may work the meat pieces too severely thereby excessively tearing, bruising, shearing, abrading, macerating, or otherwise significantly damaging or changing the integrity of the meat.

Turning now to FIG. 26A, a portion of the housing 20 is illustrated showing a pair of parallel rotating shafts 19 having mixing elements 18 coupled thereto in another configuration. Similar to previous configurations, a pair of feed screws 17 are located at the beginning of the parallel shafts 19. Downstream from the feed screws 17, are a plurality of different mixing elements 18. At least some of the mixing elements 18 shown in the configuration of FIG. 26A having a blocking configuration. The blocking element 18*e* impedes the flow of mixture or product constituents such that the mixture remains upstream from the blocking element 18*e* for a longer period of time. More particularly, the residence time of the mixture upstream of the blocking element 18*e* is increased such that the upstream mixing elements 18 have addition time to process the mixtures.

As illustrated in FIGS. 23A-C, the blocking mixing element 18*e* has flat front and back surfaces 140 and a side surface 142 with a first U-shaped surface 144 and a second surface 146. The second surface 146 is convex and is configured such that its radius of curvature generally corresponds to the inner wall of the mixer housing. The first U-shape surface includes a pair of substantially parallel side surfaces 144*a* and a generally rounded surface 144b. The blocking mixing elements 18e has a bore 200; however, the bore 200e of mixing elements 18e is not centrally located between the two opposed end portions 145 and 147, illustrated in FIG. 23A. Instead, the bore 200e is offset away from the second surface 146 of the distal, housing-following end portion 147 and toward the generally rounded surface 144b of the shaft-mounted or shaft-engaging end portion 145 and the first U-shaped surface 144. As the blocking element 18e rotates, the second surface 146 follows the inner surface of the mixer housing, which is concave, and may rotate to within an ⅛ inch of the interior wall. The bore 200e shown in FIGS. 23A-23C is generally square in shape having four sides 148 and rounded corners. Two of the sides 148 of the bore 200e are substantially parallel to side surfaces 144a. However, it is contemplated that the bore 200e may be rotated with respect to the side surface 142, such as by 45 degrees. By one approach, the blocking element 18e has a somewhat rectangular shape with rounded edges nearest the bore 200e, though other shapes are contemplated. Various dimensions of the blocking element 18e are discussed below with the prototype and configuration evaluation.

The bore 200e is positioned within blocking element 18e such that as the blocking element 18e is rotated by the rotation of the shaft 19, the second surface 146 extends outwardly toward the wall of the housing 20. This provides minimal space for the ingredients to move past the blocking element 18e around the second surface 146. Thus, the ingredients are slowed from advancing, forced to find an alternative pathway such as around the first U-shaped surface 144 or continuing advancement once the blocking element 19e has rotated out of the pathway. The blocking element 18e may temporarily prevent the ingredients from proceeding downstream. By slowing the advancement of the meat pieces, the meat mixture remains just upstream from the blocking element 18e for a slightly longer period of time and whichever mixing element 18 is positioned just upstream from the blocking element 18e has additional time to work the mixture. In sum, the additional residence of the ingredients provides more exposure to the mixing element 18 and other conditions just upstream from the blocking element 18e. Further, if additional ingredients are desired or if the temperature of the mixture needs altering, an inlet may be positioned just upstream from a blocking element 18e. Thus, the blocking elements 18e work in conjunction with the surrounding mixing elements 18 or inputs.

Several illustrative blocking elements 18e are mounted to the shafts 19 in FIGS. 26A-B. Similar to previous configurations, the housing has an input end 65 and an output end 67. As the ingredients are advanced through the housing 20 from the input end 65 to the output end 67, the mixing elements 18 work the ingredients including the meat pieces to increase diffusion of the salt solution and other ingredient incorporation. By one approach illustrated in FIGS. 26A-B, a few of the blocking elements 18e are positioned just downstream from the sharp-edged ovate mixing elements 18a which impart a higher shear to the meat and other ingredients. By increasing the ingredients' exposure to the higher shear elements, fewer of these elements 18a may be required. The blocking elements 18e positioned on the adjacent parallel shaft 19 are shown rotated 90 degrees relative to one another such that the elements 18e may rotate with shafts 19 without interference from the adjacent element. It is anticipated that a variety of mixing elements 18 may be positioned upstream from a blocking element. The configuration of FIGS. 26A-B also illustrates a variety of frustoconical mixing elements 18d after a variety of elements 18a, 18b, 18c, and 18e. The frustoconical mixing elements 18d shown in FIGS. 26A-B have the smaller diameter end face 132 facing upstream and the larger diameter end face 134 facing downstream. The larger diameter end face 134 abuts the larger diameter end face 134 of another frustoconcial mixing element 18d, though as mentioned above, such a configuration may be combined into a double frustoconcial mixing element 18d. As mentioned, the mixing elements 18 may be offset from one another along the shafts 19. Thus, the frustoconical mixing elements 18d are positioned such that a first shaft has frustoconical mixing element 18d with an increasing diameter and then a frustoconical mixing elements 18d with a decreasing diameter, while the second shaft has two circular-shaped element 18c. Then, the first shaft has two circular-shaped elements 18c while the second shaft has two frustoconical mixing elements 18d, one with an increasing and another with a decreasing diameter. Such a configuration is repeated in the arrangement of FIGS. 26A-B followed by a helical sharp-edged ovate profile 18b, a circular-shaped element 18c and then frustoconical elements with an increasing diameter on both shafts 19.

As discussed above, the mixing elements can be evaluated as processing zones. For example, the configuration of FIGS. 26A-B has a zone with a plurality of sharp-edge ovate elements 18a and helical sharp-edge ovate elements 18b providing significant shear and then a zone having frustoconical elements 18d and circular-shaped elements 18c. As discussed below, the moderate amount of shear and ingredient incorporation provided by some configurations of mixing elements 18 may be increased slightly by adding blocking elements 18e to the configuration.

Figure 27A:
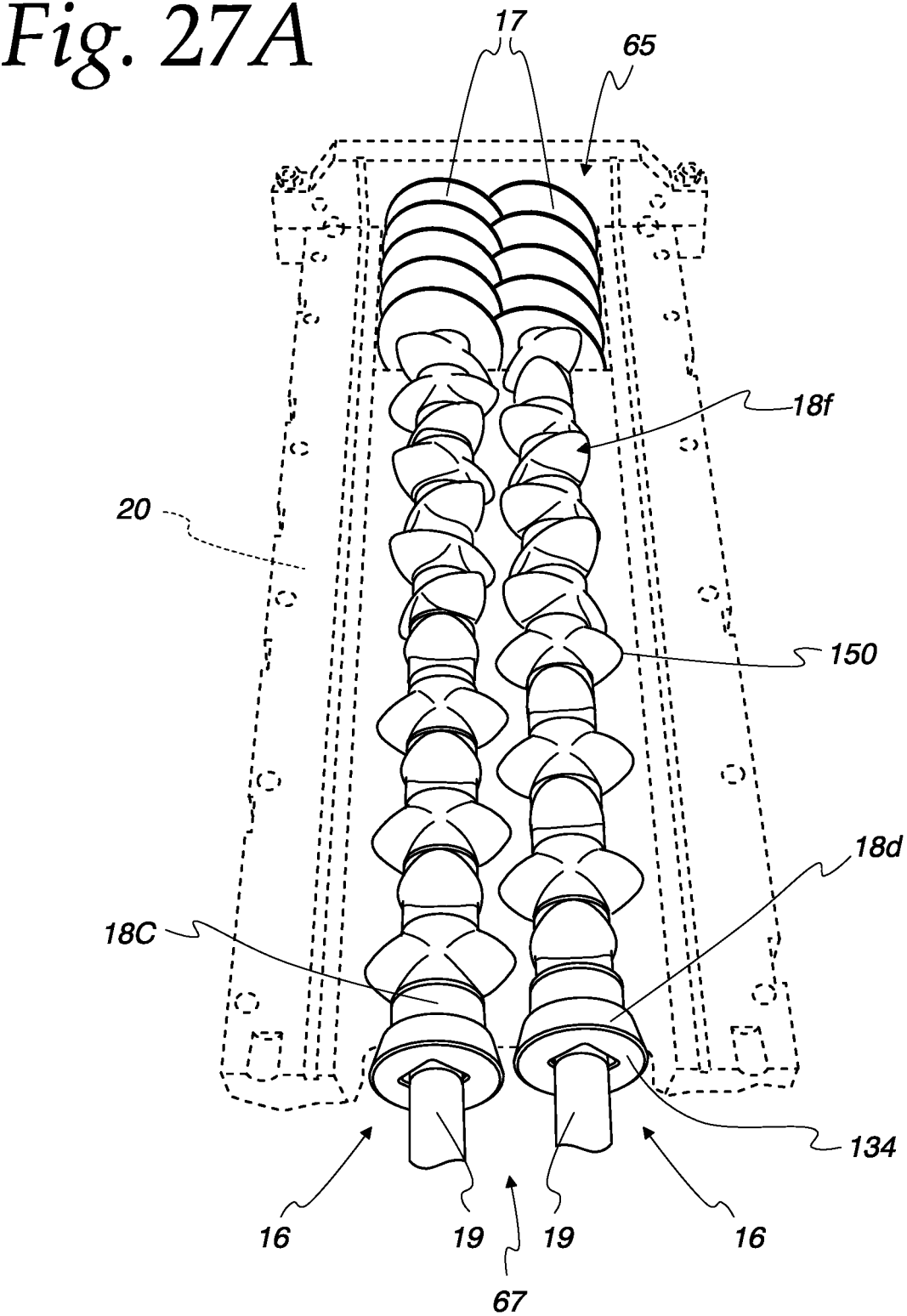
FIG. 27A comprises perspective view of a mixing apparatus as configured in accordance with various embodiments of the invention.

Turning now to FIG. 27A, a perspective view of a portion of the apparatus 10 is illustrated with two feed screws 17 and a plurality of generally ellipsoid-shaped mixing elements 18f positioned along two rotating shafts 19. The ellipsoid mixing elements 18f located on one shaft 19 are rotatably offset from the ellipsoid mixing elements 18f on the other rotating shaft 19, thus, allowing for unimpeded rotation of both parallel shafts 19. As shown in FIGS. 24A-D, the ellipsoid mixing elements 18f are generally egg-shaped and have a bore 200f extending therethrough. The generally ellipsoid-shaped mixing elements 18f have two rounded protuberances 151 with end points 150 and a first and second rim 152 on opposite portions of the egg-shaped body where the bore 200f meets the outer surfaces of the mixing element 18f. Similar to previous mixing elements 18, the bore 200f of the ellipsoid mixing element 18f is sized to accept the shaft 19 and couple the ellipsoid-shaped mixing element 18f thereto. The bore 200f may be positioned within the ellipsoid mixing element 18f such that two of the beveled corners 128 are positioned outwardly toward the rounded end points 150, as shown in FIG. 24B. By another approach, the bore 200f may be rotated such that two of the straight sides 129 may be outwardly positioned toward the rounded end points 150 as shown in FIG. 24C. A variety of sizes are contemplated for the ellipsoid-shaped mixing elements 18f as discussed below.

The configuration of mixing elements 18 shown in FIGS. 27A-B includes a plurality of ellipsoid mixing elements 18f followed by a spacer mixing element 18c and then an increasing diameter frustoconical mixing element having the larger diameter face 134 facing downstream, toward the output end 67. The plurality of ellipsoid mixing elements 18f are arranged such that one mixing element 18f mounted on the shaft 19 is rotated 90 degrees from the mounting orientation of the adjacent mixing element 18f so that the two adjacent mixing elements 18f may rotate without interference from other mixing elements.

Having a plurality of ellipsoid mixing elements 18f creates a region when the meat is subjected to a massaging action to increase diffusion and ingredient incorporation. While the ellipsoid elements 18f may be used as a larger zone or region of ellipsoid elements 18f, they may also be employed as a smaller processing area or zone along with other elements. The massaging action impacts the microstructure and membrane tissue of the meat, while maintaining the integrity and larger piece dimensions of the meat that are desired for certain whole muscle products. Depending on the configuration of the elements 18, the massaging region may increase ingredient incorporation or may prepare the meat pieces for further processing.

Figure 28A:
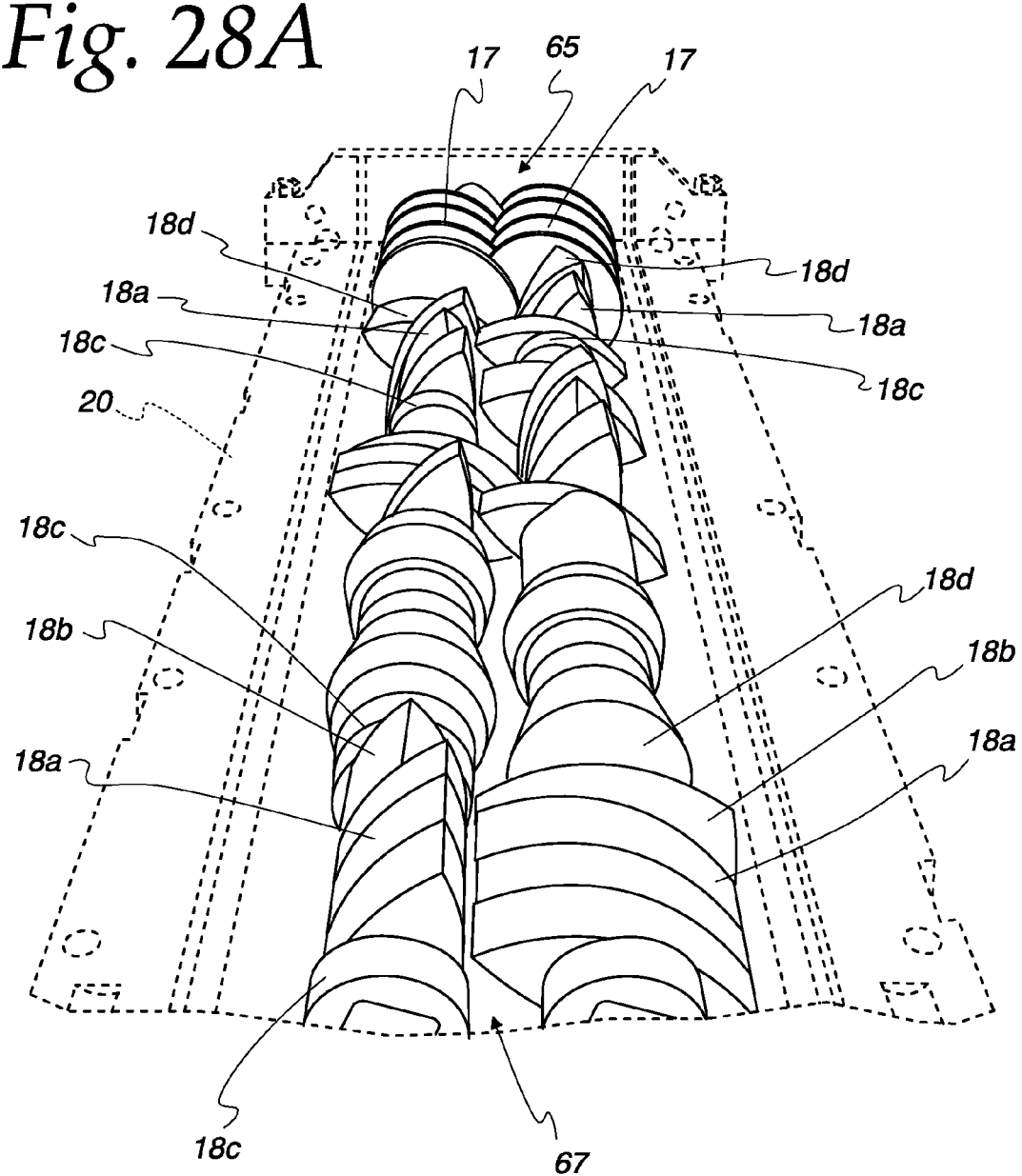
FIG. 28A comprises perspective view of a mixing apparatus as configured in accordance with various embodiments of the invention.

The configuration of elements illustrated in FIGS. 28A-B is similar to the configuration of FIGS. 26A-B, except that the configuration in FIGS. 28A-B lacks the blocking elements 18e and includes additional sharp-edged ovate profile elements 18b. Further, the second and third addition sharp-edged ovate profile elements 18a displace the proximate circular-shaped element 18c by one position. The configuration of FIGS. 28A-B also has sharp-edged ovate profile elements 18a near the discharge or output end 67, instead of frustoconical elements 18d as shown in FIGS. 26A-B.

As mentioned, the mixing elements 18d, 18e, and 18f are configured to work the meat while limiting or preventing unnecessary destruction, such that the integrity and appearance of the whole muscle meat is retained. The mixing elements 18d, 18e, and 18f may be employed with other mixing elements, such as higher shear elements 18a and 18b, to increase the level of processing done to the ingredients. Having an optimized selection of mixing elements 18 provides whole muscle meat with texture and flavor integrity through a process that efficiently and effectively incorporates the salt solution and other ingredients.

Figure 30:
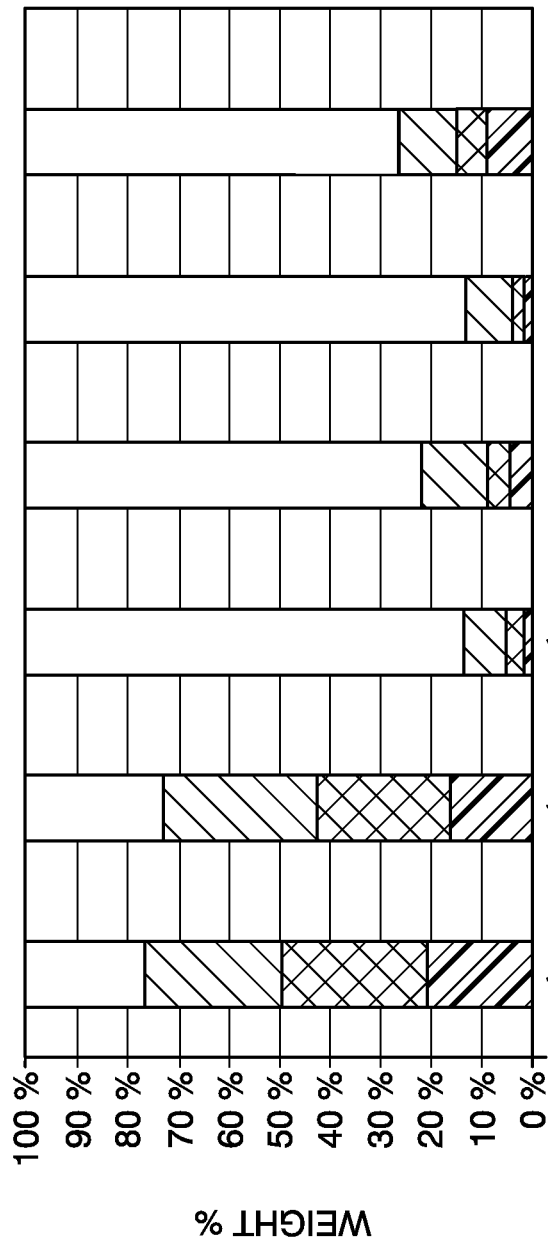
FIG. 30 comprises a graphical representation of meat piece size distribution.

Turning now to the graphical and tabular representations shown in FIGS. 29-30, the effects of the mixing elements 18d, 18e, and 18f on the whole muscle meat are illustrated. FIGS. 29-30 show the resulting meat piece distribution of a variety of mixing element configurations. FIG. 29 shows the results in tabular format, whereas FIG. 30 employs a graphical format. As detailed above it is desirable to have minimal reduction in the size of the meat pieces but also to have significant incorporation of the ingredients, such as having the salt solution diffused through the meat pieces. Thus, since FIGS. 29 and 30 illustrate meat piece size, these results illustrate only one of the factors to consider when determining which element configuration to employ. To evaluate the configuration's affect on the meat pieces, standard meat chunks were fed into a five inch diameter prototype (the diameter of the opening in the barrel is five inches across). After the meat chunks were processed in the five inch diameter prototype, the resulting meat pieces were divided up by their particle size. The resulting meat pieces were sorted into the following piece size categories: large, medium, small, and bit sizes. The large size was approximately 16.03 in$^2$ or bigger. A medium piece was between approximately 4.01 in$^2$ and 16.03 in$^2$. A small piece of meat measured between approximately 0.72 in$^2$ and 4.01 in$^2$. All meat pieces covering an area smaller than 0.72 in$^2$ were considered bit pieces. Once the meat pieces were divided into their respective sizes, the different size categories were weighed. The percentage of the different size categories are illustrated in FIGS. 29 and 30 for various configurations of the mixing elements.

As mentioned, the configuration evaluations were run on a five-inch diameter prototype and, thus, the distance form the center of the shaft to the barrel wall was 2.5 inches. In preparation, the various mixing elements 18 for each configuration were sized to the five-inch prototype to ensure movement of the mixture through the housing and encourage ingredient diffusion and incorporation into the meat. In the five-inch prototype, the mixing element 18a of FIG. 3 may have a distance from center to tip of between 2 to nearly 2.5 inches and a thickness between about 0.25 to 2.0 inches. By one approach, the distance from center to tip of the element 18a is 2.44 inches, with a thickness of 1 inch. The ellipsoidal element 18f manufactured for use in the five-inch prototype may have a distance from the center to the outer tip of between 1.7 to 2.3 inches and a thickness of between 1.5 to 2.5 inches. By one approach, the distance from center to tip of the ellipsoidal element 18f is 2.0 inches with a thickness of 2.0 inches. More particularly, the length of the ellipsoid mixing element 18f from one rounded end point 150 to the other rounded end point 150 may be between 3.4 and 4.6 inches, and in one illustrative embodiment is 4.02 inches. The width of the mixing element 18f from one rim 152 to the other rim 152 may be between 1.5 to 2.5 inches, and in one illustrative embodiment is 2.0 inches. For the five-inch prototype of the frustoconical element 18d, the larger diameter end face 130 may measure between 3.25 and 3.75 inches, whereas the smaller diameter end face 132 may measure between 2.75 and 3.25. The single frustoconical element 18d may have about a 1.0 inch thickness and the double frustoconical element 18d may have about a 2.0 inch thickness. In one illustrative embodiment, the frustoconical element 18d has a larger diameter end face 130 of 3.38 inches and a smaller diameter end face 132 of 3.0 inches. The blocking element 18e has a length from surface 144b to second surface 146 of between 3.25 and 3.75 inches and a width between the flat sides 144a of between 2 and 2.5 inches. By one approach, the blocking element has a length of 3.38 inches, a width of 2.25 inches and a distance from the center of the bore to the outside surface 146 of 2.19 inches.

In addition to the five-inch prototype, the barrel opening of a production-scale mixer may have approximately a 4.0 inch to a 10.0 inch diameter. By one approach, the production-scale mixer will have approximately an 8.0 inch diameter shaft, with a distance from the center of the shaft to the barrel wall of 3.94 inches. The elements to be used in an eight-inch production-scale mixer will be sized to ensure movement of the mixture through the housing and encourage ingredient diffusion and incorporation in to the meat, similarly to the five-inch prototype. For example, in the eight-inch diameter shaft, the distance from the center of the mixing element 18a to the tip of the element is 3.88 inches, and the distance from the center of the ellipsoidal element 18f to the outer tip is 3.38 inches.

While the results illustrated in FIGS. 29 and 30 show the affects of different element configurations, the results may vary slightly in a larger-scale mixer, such as the eight-inch production-scale mixer. Since the testing apparatus was smaller than the production-scale might be, a portion of the reduction in the size of the meat pieces may be addressed by using a larger scale process. Nonetheless, the results obtained from the five-inch prototype provide a comparison of the different mixing elements 18 affects on particle size reduction.

The first column 160 of FIGS. 29 and 30 shows the results of whole muscle meat processed in the configuration of FIG. 28. The whole muscle meat input into the system was not injected with brine or salt solution. The resulting meat chunks sizes are shown. The second column 162 shows the results of whole muscle meat processed in the configuration of FIG. 26 and the meat processed was injected with salt solution. While both configurations had a significant amount of reduction in the size of the meat chunks, the configuration of FIG. 26 did show a bit less particle size reduction. Thus, including the blocking elements 18e and removing some of the sharp-edged ovate elements 18a and 18b appears to lessen the amount of piece size reduction. In addition, the whole muscle product used with the configuration of FIG. 26 (column 162) was injected with brine or a salt solution prior to processing. The salt solution softened the muscle pieces such that they were less rigid during the processing and may have been able to more easily navigate through the mixer without as much decrease in the size of the meat pieces.

The third column 164 and fourth column 166 are results obtained from the configuration illustrated in FIG. 27. However, the results in column 166 were passed through the mixer housing 20 twice. Thus, while the results of column 166 shown some additional reduction in the size of the meat chunks, the meat underwent additional ingredient incorporation. Further, while the 13.57% of the meat chunks were reduced in size from the larger chunks after the first pass, only an additional 5.51% of the larger chunks were reduced in size during the second pass. Thus, while the meat product underwent approximately twice the processing, the meat chunks did not continue to decrease in size at the same rate. Further, the mixing element configuration of FIG. 27 caused significantly less reduction in the size of the meat pieces than the configurations of FIGS. 26 and 28.

As shown in FIGS. 29 and 30, the mixing element configuration of FIG. 25 caused the least reduction in the size of the meat pieces, though only slightly less than the mixing element configuration of FIG. 27. More particularly, as shown in column 168, the FIG. 25 configuration resulted in 86.90% of the meat pieces being large, whereas the FIG. 27 configuration resulted in 86.43% of the meat pieces being large. However, similar to the single pass of the FIG. 27 configuration, the resulting meat product from the FIG. 25 configuration did not undergo optimal cure distribution and protein extraction. Further, the configuration of FIG. 25 resulted in a less than optimal flow rate that is required to effectively and efficiently push the meat product through the mixer housing 20.

As mentioned, the need for sufficient cure distribution and protein extraction must be balanced with muscle piece integrity. Some of the configurations tested were either too aggressive or were not aggressive enough and thus, the element configurations may be adjusted accordingly. For example, meat pieces processed by the configuration of FIG. 28, illustrated in column 160, underwent significant piece size reduction and the configuration of FIG. 28 could be adjusted to lessen the amount of high shear force applied to the meat pieces. Alternatively, whole muscle meat process in the configuration of FIG. 25 underwent very little piece size reduction; however, the meat product produced had not been sufficiently worked such that the resulting meat product had insufficient cure distribution and protein extraction. The configuration of FIG. 25 may be adjusted to provide more cure distribution and protein extraction. In sum, depending on the whole muscle meat being processed and the desired ingredient incorporation, an optimal mixing element configuration may incorporate aspects of the FIG. 25 configuration and the FIG. 28 configuration.

The mixer 10 including the shafts 19 may be manufactured in a variety of manners. By one approach, the shaft 19 and the mixing elements 18 are produced of stainless steel and specifically milled in a unitary construction from a large piece of material. Such a unitary construction may permit the mixer to be more easily cleaned. By another approach, the shaft 19 and mixing elements 18 are produced individually as single elements. Such a construction allows for increased flexibility such that the configuration may be easily adapted to a different configuration. These individually produced elements may also be constructed of stainless steel. By yet another approach, the construction may facilitate the use of zones or groupings such that the shaft 19 and mixing elements 18 may be constructed in a few sections. For example, the entire shaft 19 and mixing elements 18 may be constructed in four or five sections. The chosen mixer construction may depend on the type and variety of meat products that will be processed, and the conditions in the plant, to note but a few considerations.

The embodiments described above relate to continuous processing, i.e., processes in which ingredients are input during discharge of a combined output. In these processes, the input and/or the output steps may be interrupted periodically or may be intermittent.

From the foregoing, it should be appreciated that the invention provides a new and improved method for effecting protein extraction and mixing of meat components for certain processed meat products. The term "meat" is used broadly herein to refer to meat such as beef, pork, poultry, fish and meat byproducts, including cuts or pieces that are all or primarily all fat, as well as lean cuts or pieces that have relatively higher protein content. The terms "meat product" and "meat ingredient" are used broadly herein to refer to products or ingredients that contain meat, alone or in combination with other components.

The above-described embodiments of the invention are believed to be effective for achieving rapid protein extraction and mixing of food components in a much smaller apparatus than that used in certain prior art batch mixing processes. In addition to reducing floor space requirements, the preferred embodiments of the invention also may reduce cost and cleanup time as compared with these prior art processes and apparatus. The invention may also result in significant cost savings by enabling more precise control of the composition of the combined output stream.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A continuous processing mixer for continuous production of a whole meat product, the mixer including:
a housing having a pair of rotatable shafts therein;
an input configured to receive ingredients of a whole meat product, the ingredients including at least whole meat pieces and a salt solution;
an output configured to discharge a whole meat product; and
a plurality of processing elements located within the housing and mounted on the pair of rotatable shafts, the plurality of processing elements positioned between the input and the output and arranged to provide a series of processing zones, the plurality of processing elements including a massaging element disposed on one of the rotatable shafts, the massaging element having a body disposed on the one rotatable shaft and a three-dimensional ellipsoid-shaped portion of the body extending generally perpendicular to the one rotatable shaft.

2. The mixer of claim 1 wherein the series of processing zones includes an initial zone having a pair of substantially fluted spiral elements for directing the constituents into subsequent processing zones.

3. The mixer of claim 1 wherein the series of processing zones includes a working zone having a mixing element with a generally frustoconical body, the frustoconical body having a gradually increasing diameter.

4. The mixer of claim 3 wherein the working zone further comprises a mixing element having a generally frustoconical body with a gradually decreasing diameter.

5. The mixer of claim 4 wherein the series of processing zones includes a massaging zone upstream from the working zone.

6. The mixer of claim 5 wherein the mixing elements in the massaging zone include a three-dimensional ellipsoid-shaped elements.

7. The mixer of claim 4 wherein the series of processing zones includes a high shear force zone upstream from the working zone.

8. The mixer of claim 1 wherein the plurality of mixing elements are configured to force the ingredients through the mixer housing from the input to the output.

9. A system for continuous production of whole-muscle meat product, the system including:
a mixer housing having an inner surface;
a rotatable shaft disposed in the mixer housing;
an input located at one portion of the mixer housing, the input configured to receive meat ingredients, the meat ingredients including at least whole-muscle meat pieces and a salt solution;
an output located at a second portion of the mixer housing and separated at least a distance from the input, the output configured to discharge whole-muscle meat product from the housing; and
a plurality of mixing elements located within the mixer housing and positioned to provide a series of processing zones, the mixing elements including at least one partial obstruction element to impede flow of the meat ingredients from the input to the output and increase residence of the meat ingredients in the processing zones, the at least one partial obstruction element having an elongate body with a pair of opposed end portions, the opposed end portions including a distal end portion disposed adjacent the inner surface of the mixer housing and a proximal shaft-engaging end portion having an opening with the shaft extending therethrough, the elongate body of the at least one partial obstruction element extending radially outward from the proximal shaft-engaging end portion toward the distal end portion such that rotation of the shaft moves the distal end portion of the obstruction element along a path adjacent the inner surface of the mixer housing.

10. The system of claim 9 wherein the series of processing zones include a non-high shear force zone for increasing incorporation of the salt solution into the whole-muscle meat without sacrificing the integrity of the whole-muscle meat.

11. The system of claim 9 wherein the at least one partial obstruction element has a maximum width at the one end portion adjacent the mixer housing.

12. The system of claim 9 wherein the at least one partial obstruction element has a pair of parallel, straight sides extending between the opposed end portions of the partial obstruction element.

13. The system of claim 9 wherein the mixer housing has a curved inner surface that is concave and the distal end portion of the at least one partial obstruction element includes a convex surface facing the curved inner surface of the mixer housing.

14. A system for continuous production of whole-muscle meat product, the system including:
a mixer housing;
an input located at one portion of the mixer housing, the input configured to receive meat ingredients, the meat ingredients including at least whole muscle-meat pieces and a salt solution;
an output located at a second portion of the mixer housing and separated at least a distance from the input, the output configured to discharge whole-muscle meat product from the housing; and
a plurality of mixing elements located within the mixer housing and positioned between the input and the output, the mixing elements arranged to provide a series of processing zones, the plurality of mixing elements including a mixing element having a pair of rounded protuberances without edges, the pair of rounded protuberances being configured to contact and massage the whole muscle meat pieces without subjecting the whole muscle meat pieces to excessive shear forces that would tear the whole muscle meat pieces.

15. The system of claim 14 further comprising a pair of parallel rotatable shafts disposed in the mixer housing to which the plurality of mixing elements are mounted.

16. The system of claim 14 wherein the series of processing zones include a non-high shear force zone for massaging at least the salt solution into the whole muscle-meat pieces without high shear.

17. The system of claim 14 wherein the mixer housing includes an inner surface and a clearance between the inner surface of the mixer housing and the mixing elements is greater than 0.12 in.

18. A system for continuous production of whole muscle meat product, the system including:
a mixer housing;
a pair of rotatable shafts disposed in the mixer housing;
an input located at one portion of the mixer housing;
an output located at a second portion of the mixer housing; and
a plurality of mixing elements located in the mixer housing and positioned to provide a series of processing zones for processing meat product ingredients including at least whole muscle meat pieces and a salt solution, the plurality of mixing elements including a first pair of mixing elements disposed on one of the rotatable shafts and a second pair of mixing elements disposed on the other of the rotatable shafts, the first and second pairs of mixing elements defining a pathway for the meat ingredients to pass through along a portion of the mixer housing,
the first and second pairs of mixing elements each including a frustoconical mixing element and a cylindrical mixing element adjacent the frustoconical mixing element, the first and second pairs of mixing elements being offset along the rotatable shafts from each other with the frustoconical element of each pair of mixing elements being aligned with the cylindrical mixing element of the other pair of mixing elements such that the pathway is formed by an offset arrangement of the mixing elements along the portion of the mixer housing and the meat ingredients undergo a lesser amount of working action as the meat ingredients pass through the pathway than if the first and second pairs of mixing elements were aligned along the rotatable shafts.

19. A system for continuous production of whole-muscle meat product, the system including:
a mixer housing having an inner surface;
a rotatable shaft disposed in the mixer housing;

an input located at one portion of the mixer housing, the input configured to receive meat ingredients, the meat ingredients including at least whole-muscle meat pieces and a salt solution;

an output located at a second portion of the mixer housing and separated at least a distance from the input, the output configured to discharge whole-muscle meat product from the housing; and a plurality of mixing elements located within the mixer housing and positioned to provide a series of processing zones, the mixing elements including:

at least one partial obstruction element to impede flow of the meat ingredients from the input to the output and increase residence of the meat ingredients in the processing zones, the at least one partial obstruction element having a pair of opposed end portions with one of the end portions disposed adjacent the inner surface of the mixer housing and the other end portion having an opening with the shaft extending therethrough such that rotation of the shaft moves the one end portion of the obstruction element along a path adjacent the inner surface of the mixer housing; and an upstream mixing element disposed directly upstream of the partial obstruction element, the at least one partial obstruction element configured to increase dwell time of the meat ingredients at the upstream mixing element, the upstream element including one of a sharp-edged ovate mixing element with two pointed ends, a helical sharp-edged ovate mixing element, a frustoconical mixing element, a circular-shaped element, or a three dimensional ellipsoid-shaped mixing element.

* * * * *